(12) United States Patent
Chao et al.

(10) Patent No.: US 11,962,002 B2
(45) Date of Patent: Apr. 16, 2024

(54) CATHODE MATERIALS HAVING OXIDE SURFACE SPECIES

(71) Applicant: QUANTUMSCAPE BATTERY, INC., San Jose, CA (US)

(72) Inventors: Cheng-Chieh Chao, San Jose, CA (US); Sarah Chavez, San Jose, CA (US); Hyeseung Chung, San Jose, CA (US); Seitaro Ito, San Jose, CA (US); Yuki Katoh, San Jose, CA (US); Konstantin Lokshin, San Jose, CA (US); Akinari Ohash, San Jose, CA (US); Jessa Silver, San Jose, CA (US); Yaosen Tian, San Jose, CA (US); Virgil Xu, San Jose, CA (US); Zhenfeng Yu, San Jose, CA (US)

(73) Assignee: QuantumScape Battery, Inc., San Jose, CA (US)

( * ) Notice: Subject to any disclaimer, the term of this patent is extended or adjusted under 35 U.S.C. 154(b) by 0 days.

(21) Appl. No.: 18/463,208

(22) Filed: Sep. 7, 2023

(65) Prior Publication Data
US 2023/0420662 A1 Dec. 28, 2023

Related U.S. Application Data

(63) Continuation of application No. PCT/US2022/053080, filed on Dec. 15, 2022.
(Continued)

(51) Int. Cl.
*H01M 4/36* (2006.01)
*C01G 53/00* (2006.01)
(Continued)

(52) U.S. Cl.
CPC ............ *H01M 4/366* (2013.01); *C01G 53/50* (2013.01); *H01M 4/525* (2013.01);
(Continued)

(58) Field of Classification Search
CPC ..... H01M 4/366; C01G 53/50; C01P 2004/80
See application file for complete search history.

(56) References Cited

U.S. PATENT DOCUMENTS

| 3,839,306 A | 10/1974 | Emerson et al. |
| 4,567,031 A | 1/1986 | Riley |

(Continued)

FOREIGN PATENT DOCUMENTS

| CN | 1 547 277 A | 11/2004 |
| CN | 1 218 422 C | 9/2005 |

(Continued)

OTHER PUBLICATIONS

Yang et al,Pushing Lithium Cobalt Oxides to 4.7 V by Lattice-Matched Interfacial Engineering, Advanced Energy Materials, 12, 2200197 (2022) (Year: 2022).*

(Continued)

*Primary Examiner* — Amanda C. Walke
(74) *Attorney, Agent, or Firm* — Squire Patton Boggs (US) LLP

(57) ABSTRACT

The present disclosure concerns lithium zirconium phosphate (LZP) chemical oxides for coated cathode active materials, which are useful in cathodes (i.e., positive electrodes) of rechargeable lithium-batteries for reversibly storing lithium ions ($Li^+$).

19 Claims, 6 Drawing Sheets

Related U.S. Application Data

(60) Provisional application No. 63/291,209, filed on Dec. 17, 2021, provisional application No. 63/299,732, filed on Jan. 14, 2022.

(51) Int. Cl.
  *H01M 4/525* (2010.01)
  *H01M 4/58* (2010.01)
  *H01M 4/02* (2006.01)

(52) U.S. Cl.
  CPC ....... *H01M 4/5825* (2013.01); *C01P 2002/02* (2013.01); *C01P 2002/50* (2013.01); *C01P 2002/85* (2013.01); *C01P 2004/04* (2013.01); *C01P 2004/80* (2013.01); *C01P 2006/40* (2013.01); *H01M 2004/028* (2013.01)

(56) References Cited

U.S. PATENT DOCUMENTS

| | | | |
|---|---|---|---|
| 5,738,957 | A | 4/1998 | Amine et al. |
| 5,783,332 | A | 7/1998 | Amine et al. |
| 6,204,219 | B1 | 3/2001 | Brezny et al. |
| 6,333,128 | B1 | 12/2001 | Takuya et al. |
| 6,420,069 | B2 | 7/2002 | Amine et al. |
| 6,589,299 | B2 | 7/2003 | Missling et al. |
| 6,613,478 | B2 | 9/2003 | Munakata et al. |
| 6,613,479 | B2 | 9/2003 | Fukuzawa et al. |
| 6,623,890 | B2 | 9/2003 | Munakata et al. |
| 6,677,082 | B2 | 1/2004 | Thackeray et al. |
| 6,680,143 | B2 | 1/2004 | Thackeray et al. |
| 6,939,383 | B2 | 9/2005 | Eastin et al. |
| 6,964,828 | B2 | 11/2005 | Lu et al. |
| 7,078,128 | B2 | 7/2006 | Lu et al. |
| 7,135,252 | B2 | 11/2006 | Thackeray et al. |
| 7,205,073 | B2 | 4/2007 | Kim et al. |
| 7,314,684 | B2 | 1/2008 | Kang et al. |
| 7,468,223 | B2 | 12/2008 | Thackeray et al. |
| 7,517,613 | B2 | 4/2009 | Yuasa et al. |
| 7,709,149 | B2 | 5/2010 | Paulsen et al. |
| 7,968,235 | B2 | 6/2011 | Amine et al. |
| 8,241,791 | B2 | 8/2012 | Lu et al. |
| 8,268,198 | B2 | 9/2012 | Shin et al. |
| 8,277,683 | B2 | 10/2012 | Deng et al. |
| 8,465,556 | B2 | 6/2013 | Oladeji |
| 8,492,030 | B2 | 7/2013 | Park et al. |
| 8,591,774 | B2 | 11/2013 | Koenig et al. |
| 8,685,565 | B2 | 4/2014 | Lu et al. |
| 8,808,405 | B2 | 8/2014 | Oladeji |
| 8,865,348 | B2 | 10/2014 | Sun et al. |
| 9,190,660 | B2 | 11/2015 | Takemoto et al. |
| 9,692,041 | B2 | 6/2017 | Aihara et al. |
| 10,141,567 | B2 | 11/2018 | Choi et al. |
| 10,199,649 | B2 | 2/2019 | Beck et al. |
| 10,923,295 | B2 | 2/2021 | Raman et al. |
| 11,342,630 | B2 | 5/2022 | Roberts et al. |
| 11,430,613 | B2 | 8/2022 | Mitchell et al. |
| 11,545,666 | B2 | 1/2023 | Wang et al. |
| 11,545,667 | B2 | 1/2023 | Saidi |
| 11,581,526 | B2 | 2/2023 | Wurm et al. |
| 11,587,741 | B2 | 2/2023 | Raman et al. |
| 2003/0042473 | A1 | 3/2003 | Kloeppner et al. |
| 2005/0164084 | A1 | 7/2005 | Adamson et al. |
| 2008/0314482 | A1 | 12/2008 | Suzuki et al. |
| 2010/0014215 | A1 | 1/2010 | Zhong et al. |
| 2010/0068376 | A1 | 3/2010 | Chen et al. |
| 2010/0151332 | A1 | 6/2010 | Lopez et al. |
| 2011/0039155 | A1 | 2/2011 | Deguchi |
| 2011/0111298 | A1 | 5/2011 | Lopez et al. |
| 2011/0260099 | A1 | 10/2011 | Paulsen et al. |
| 2012/0064395 | A1 | 3/2012 | Chang et al. |
| 2012/0129045 | A1 | 5/2012 | Gin et al. |
| 2012/0282522 | A1 | 11/2012 | Axelbaum et al. |
| 2013/0157141 | A1 | 6/2013 | Zhong et al. |
| 2013/0202502 | A1 | 8/2013 | Schulz-Dobrick et al. |
| 2014/0193714 | A1 | 7/2014 | Kim et al. |
| 2015/0050522 | A1 | 2/2015 | Manthiram et al. |
| 2015/0099169 | A1 | 4/2015 | Dudney et al. |
| 2016/0156021 | A1 | 6/2016 | Aihara et al. |
| 2016/0268586 | A1* | 9/2016 | Kawakami ............ H01M 4/62 |
| 2016/0276658 | A1* | 9/2016 | Choi ................... H01M 4/502 |
| 2017/0162901 | A1 | 6/2017 | Chen et al. |
| 2017/0179484 | A1* | 6/2017 | Park .................... H01M 4/62 |
| 2017/0321083 | A1 | 11/2017 | Fenn et al. |
| 2018/0034101 | A1 | 2/2018 | Lee et al. |
| 2018/0076446 | A1 | 3/2018 | Glock et al. |
| 2019/0044146 | A1 | 2/2019 | Ito et al. |
| 2020/0066463 | A1 | 2/2020 | Kinoshita et al. |
| 2021/0193398 | A1 | 6/2021 | Raman et al. |
| 2021/0249647 | A1 | 8/2021 | Wurm et al. |
| 2021/0399338 | A1 | 12/2021 | Arnold et al. |
| 2022/0029166 | A1 | 1/2022 | Hippauf et al. |
| 2022/0029242 | A1 | 1/2022 | Hippauf et al. |
| 2022/0246977 | A1* | 8/2022 | Brezesinski ......... H01M 4/525 |
| 2022/0278362 | A1 | 9/2022 | Finsy et al. |
| 2022/0293952 | A1 | 9/2022 | Brown |
| 2023/0042207 | A1 | 2/2023 | Kang et al. |
| 2023/0343954 | A1* | 10/2023 | Yu .................... H01M 10/0525 |

FOREIGN PATENT DOCUMENTS

| | | | | |
|---|---|---|---|---|
| CN | 102 255 069 | A | | 11/2011 |
| CN | 105 006 594 | A | | 10/2015 |
| CN | 110 137 561 | A | | 8/2019 |
| CN | 111 952 562 | A | | 11/2020 |
| JP | 2003-059492 | A | | 2/2003 |
| JP | 2004-047448 | A | | 2/2004 |
| JP | 2004-193115 | A | | 7/2004 |
| JP | 2010-015959 | A | | 1/2010 |
| JP | 2013-149586 | A | | 8/2013 |
| JP | 2013149586 | A | * | 8/2013 |
| JP | 2013-218838 | A | | 10/2013 |
| JP | 2016-85843 | A | | 5/2016 |
| KR | 2021129841 | A | * | 10/2021 ............ C01D 15/02 |
| KR | 20210129841 | A | | 10/2021 |
| WO | WO 2018/044952 | | | 3/2018 |
| WO | WO 2019/213159 | | | 11/2019 |
| WO | WO 2019/245461 | A1 | | 12/2019 |
| WO | WO 2020/097018 | A1 | | 5/2020 |
| WO | WO 2022/056039 | A1 | | 3/2022 |
| WO | WO-2022056039 | A1 | * | 3/2022 |

OTHER PUBLICATIONS

Zhan et al, Influence of annealing atmosphere on Li2ZrO3-coated LiNi0.6Co0.2Mn0.2O2 and its high-voltage cycling performance, Electrochimica Acta, 300, 36-44 (2019) (Year: 2019).*
Written Opinion of the PCT (PCTUSWOSA) no date. (Year: 0000).*
U.S. Appl. No. 90/012,243, filed Jul. 19, 2013, Thackeray et al.
International Search report and written opinion of PCT/US2022/051433 dated May 15, 2023; 16 pages.
International Search Report and written opinion of PCT/US2023/019468 dated Aug. 11, 2023; 14 pages.
Non-Final Office Action of U.S. Appl. No. 18/463,208 dated Nov. 6, 2023; 7 pages.
Written Opinion of the PCT/US2022/053080 dated Mar. 30, 2023; 9 pages.
Aiken et al., "A Survey of In Situ Gas Evolution during High Voltage Formation in Li-Ion Pouch Cells", Journal of The Electrochemical Society, 162 (4) A760-A767 (2015).
Amaresh, S. et al., "Facile synthesis of $ZrO_2$ coated $Li_2CoPO_4F$ cathode materials for lithium secondary batteries with improved electrochemical properties," Journal of Power Sources, 244, 2013, pp. 395-402.
Amatucci, Glenn et al., "Fluoride based electrode materials for advanced energy storage devices," Journal of Fluorine Chemistry, vol. 128, Issue 4, Apr. 2007, pp. 243-262.
Amine, K. et al., "A New Three-Volt Spinel $Li_{1+x}Mn_{1.5}Ni_{0.5}O_4$ for Secondary Lithium Batteries," J. Electrochem. Soc., vol. 143, No. 5, May 1996, pp. 1607-1613.

(56) References Cited

OTHER PUBLICATIONS

Ariyoshi, Kingo et al., "Structural change of $LiNi_{1/2}Mn_{1/2}O_2$ during charge and discharge in nonaqueous lithium cells," Journal of Physics and Chemistry of Solids, 69, 2008, pp. 1238-1241.

Armstrong, A. Robert et al., "Demonstrating Oxygen Loss and Associated Structural Reorganization in the Lithium Battery Cathode $Li[Ni_{0.2}Li_{0.2}Mn_{0.6}]O_2$," J. Am. Chem. Soc., 2006, vol. 128, pp. 8694-8698.

Armstrong, A. Robert et al., "Synthesis of layered $LiMnO_2$ as an electrode for rechargeable lithiu batteries," Nature, vol. 381, Jun. 6, 1996, pp. 499-500.

Armstrong, A. Robert et al., "The Layered Intercalation Compounds $Li(Mn_{1-y}, Co_y)O_2$: Positive Electrode Materials for Lithium-Ion Batteries," Journal of Solid State Chemistry, 145, 1999, pp. 549-556.

Ates, Mehmet Nurullah et al., "A Li-Rich Layered Cathode Material with Enhanced Structural Stability and Rate Capability for Li-on Batteries," Journal of The Electrochemical Society, 161 (3), 2014, pp. A355-A363.

Ates, Mehmet Nurullah et al., "Mitigation of Layered to Spinel Conversion of a Li-Rich Layered Metal Oxide Cathode Material for Li-Ion Batteries," Journal of The Electrochemical Society, 161 (3), 2014, pp. A290-A301.

Aurbach, Doron et al., "Studies of Aluminum-Doped $LiNi_{0.5}Co_{0.2}Mn_{0.3}O_2$: Electrochemical Behavior, Aging, Structural Transformations, and Thermal Characteristics," Journal of The Electrochemical Society, 162 (6), 2015, pp. A1014-A1027.

Bains, J. et al., "$Li(Ni_{0.40}Mn_{0.40}Co_{0.15}Al_{0.05})O_2$: A promising positive electrode material for high-power and safe lithium-ion batteries," Journal of Power Sources, 196, 2011, pp. 8625-8631.

Bareno et al., "Local Structure of Layered Oxide Electrode Materials for Lithium-Ion Batteries," Adv. Mater., 2010, 22, pp. 1122-1127.

Bareno et al., "Long-Range and Local Structure in the Layered Oxide $Li_{1.2}Co_{0.4}Mn_{0.4}O_2$," Chem. Mater., 2011, 23, pp. 2039-2050.

Benedek, R. et al., "Theory of Overlithiation Reaction in $LiMO_2$ Battery Electrodes," Chem. Mater., 2006, 18, pp. 1296-1302.

Bettge, Martin et al., "Improving high-capacity $Li_{1.2}Ni_{0.15}Mn_{0.55}Co_{0.1}O_2$-based lithium-ion cells by modifying the positive electrode with alumina," Journal of Power Sources, 233, 2013, pp. 346-357.

Borkowska et al., "Composite polyether electrolytes with Lewis acid type additives", Electrochimica Acta, vol. 46, No. 10-11, Mar. 15, 2001, pp. 1737-1746, XP004231591, ISSN: 0013-4686, DOI: 10.1016/S0013-4686.

Burns et al., "Impedance Reducing Additives and Their Effect on Cell Performance", Journal of The Electrochemical Society, 159 (7) A1105-A1113 (2012).

Burns et al., "The Impact of Varying the Concentration of Vinylene Carbonate Electrolyte Additive in Wound Li-Ion Cells", Journal of The Electrochemical Society, 159 (2) A85-A90 (2012).

Busche et al., "Dynamic formation of a solid-liquid electrolyte interphase and its consequences for hybrid-battery concepts", Nature Chemistry, vol. 8, May 2016, pp. 426-434; DOI: 10.1038/NCHEM.2470.

Bhattacharya, Jishnu et al., "Prediction b1 Quaternary Spinel Oxides a Li-Battery Cathodes: Cation Site Preference, Metal Mixing, Voltage an Phase Stability," Journal of The Electrochemical Society, 161 (9), 2014, pp. A1440-A1446.

Caldin, E.F. et al., "Kinetics and Thermodynamics of the Complex-formation of Nickel(II) and Cobalt(II) Ions with Ammonia and Pyridine-2-azodimethylaniline in Water, at Pressures from 1 bar to 2 kbar," Journal of The Chemical Society, Farady Transactions 1, vol. 68, 1972, pp. 2247-2258.

Camardese, J. et al., "Synthesis of Spherical Core-Shell $Ni(OH)_2$-$Ni_{1/2}Mn_{1/2}(OH)_2$ Particles via a Continuously Stirred Tank Reactor," Journal of The Electrochemical Society, 161 (6), 2014, pp. A890-A895.

Cheng, Ho-Ming et al., "Enhanced Cycleabity in Lithium Ion Batteries: Resulting from Atomic Layer Depostion of $Al_2O_3$ or $TiO_2$ on $LiCoO_2$ Electrodes," J. Phys. Chem. C, 2012, 116, pp. 7629-7637.

Chiang, Yet-Ming et al., "High Capacity, Temperature-Stable Lithium Aluminum Manganese Oxide Cathodes for Rechargeable Batteries," Electrochemical and Solid-State Letters, 2 (3) (1999) pp. 107-110.

Chiba, Kazuki et al., "$Na_xLi_{0.7-x}Ni_{1-y}Mn_yO_2$ as a new positive electrode material for lithiumion batteries," Journal of Power Sources, 311, 2016, pp. 103-110.

Cho, Jaephil et al., "A Breakthrough in the Safety of Lithium Secondary Batteries by Coating the Cathode Material with $AlPO_4$ Nanoparticles," Angew. Chem. Int. Ed., 2003, 42, pp. 1618-1621.

Cho, Woosuk et al., "Improved electrochemical and thermal properties of nickel rich $LiNi_{0.6}Co_{0.2}Mn_{0.2}O_2$ cathode materials by $SiO_2$ coating," Journal of Power Sources, 282, 2015, pp. 45-50.

Cho, Yonghyun et al., "A New Type of Protective Surface Layer for High-Capacity Ni-Based Cathode Materials: Nanoscaled Surface Pillaring Layer," Nano Lett., 2013, 13, pp. 1145-1152.

Cho, Yonghyun et al., *Supporting Information* "A New Type of Protective Surface Layer for High-Capacity Ni-Based Cathode Materials: Nanoscaled Surface Pillaring Layer," Nano Lett., 2013, 13, 16 pages.

Choi et al., "Recent advances in the electrolytes for interfacial stability of high-voltage cathodes in lithium-ion Batteries", The Royal Society of Chemistry 2015, 5, 2732-2748.

Choi, J. et al., "Investigation of the Irreversible Capacity Loss in the Layered $LiNi_{1/3}Mn_{1/3}Co_{1/3}O_2$ Cathodes," Electrochemical and Solid-State Letters, 8 (8), 2005, pp. C102-C105.

Choi, S. et al., "Factors Influencing the Layered to Spinel-like Phase Transition in Layered Oxide Cathodes," Journal of The Electrochemical Society, 2002, 149 (9), pp. A1157-A1163.

Chung, Kyung Yoon et al., "Comparative studies between oxygen-deficient $LiMn_2O_4$ and Al-doped $LiMn_2O_4$," Journal of Power Sources, 146, 2005, pp. 226-231.

Clause, O. et al., "Preparation and Characterization of Nickel-Aluminum Mixed Oxides Obtained by Thermal Decomposition of Hydrotalcite-Type Precursors," Journal of Catalysis, 133, 1992, pp. 231-246.

Conry, Thomas E. et al., "Structural Underpinnings of the Enhanced Cycling Stability upon Al-Substitution in $LiNi_{0.45}Mn_{0.45}Co_{0.1-y}AlO_2$ Positive Electrode Materials for Li-ion Batteries," Chem. Mater. 2012, 24, pp. 3307-3317.

Delmas, C. et al. "Layered Li(Ni, M)$O_2$ Systems as the Cathode Material in Lithium-Ion Batteries," MRS Bulletin, Aug. 2002, pp. 608-612.

Delp et al., "Importance of Reduction and Oxidation Stability of High Voltage Electrolytes and Additives", Electrochimica Acta 209 (2016) 498-510.

Deng, Haixia et al., "Nanostructured Lithium Nickel Manganese Oxides for Lithium-Ion Batteries," Journal of The Electrochemical Society, 157 (4), 2010, pp. A447-A452.

Deng, Z.Q. et al., "Influence of Cationic Substitutions on the Oxygen Loss and Reversible Capacity of Lithium-Rich Layered Oxide Cathodes," J. Phys. Chem. C, 2011, 115, pp. 7097-7103.

Doan, The Nam Long et al., "Recent developments in synthesis of $xLi_2MnO_3 \cdot (1-x)LiMO_2$ (M=Ni, Co, Mn) cathode powders for high-energy lithium rechargeable batteries," Frontiers in Energy Research, Energy Storage Sep. 2014, vol. 2, Article 36, pp. 1-7.

Dou, Shumei, "Review and prospect of layered lithium nickel manganese oxide as cathode materials for Li-ion batteries," J Solid State Electrochem (2013) 17, pp. 911-926.

Dyatkin, B.L. et al., "The Acidic Properties Of Fluorine-Containing Alcohols, Hydroxylamines And Oximes," Tetrahedron, 1965, vol. 21, pp. 2991-2995.

El Mofid, Wassima et al., "A high performance layered transition metal oxide cathode material obtained by simultaneous aluminum and iron cationic substitution," Journal of Power Sources, 268, 2014, pp. 414-422.

Eom, Junho et al., "Dependence of Electrochemical Behavior on Concentration and Annealing Temperature of $Li_xCoPO_4$ Phase-

(56) References Cited

OTHER PUBLICATIONS

Grown $LiNi_{0.8}Co_{0.16}Al_{00.4}O_2$ Cathode Materials," Journal of The Electrochemical Society, 155 (3), 2008, pp. A228-A233.
Fathi et al., "Ultra High-Precision Studies of Degradation Mechanisms in Aged $LiCoO_2$/Graphite Li-Ion Cells", Journal of The Electrochemical Society, 161 (10) A1572-A1579 (2014).
Fu, Chaochao et al., "Nickel-Rich Layered Microspheres Cathodes: Lithium/Nickel Disordering and Electrochemical Performance," ACS Appl Mater Interfaces, Sep. 24, 2014, 6(18), 15822-15831.
Fu, Xian-Zhu et al., "Nickel oxyhydroxides with various oxidation states prepared by chemicaloxidation of spherical $\beta$-$Ni(OH)_2$," Solid State Ionics, 178, 2007, pp. 987-993.
Gallagher, Kevin G. et al., "Correlating hysteresis and voltage fade in lithium- and manganese-rich layered transition-metal oxide electrodes," Electrochemistry Communications, 33, 2013, pp. 96-98.
Glaeser, Hans H. et al., "The Kinetics of Ammonia Exchange between Nickel Ammine Complexes and Ammonia in Aqueous and Anhydrous Ammonia Solutions Measured by Nuclear Magnetic Resonance of Nitrogen-14." Inorganic Chemistry, vol. 4, No. 2, Feb. 1965, pp. 206-208.
Gopalakrishnan, J., "Chimie Douce Approaches to the Synthesis of Metastable Oxide Materials," Chemistry of Materials, vol. 7, No. 7, Jul. 1995, pp. 1265-1275.
Gummow, R J et al., "Lithium Extraction from Orthorhombic Lithium Manganese Oxide and the Phase Transformation to Spinel," Mat. Res. Bull., vol. 28, 1993, pp. 1249-1256.
Gummow, R.J. et al., "Improved capacity retention in rechargeable 4 V lithium/lithiummanganese oxide (spinel) cells," Solid State Ionics, 69, 1994, pp. 59-67.
Gutierrez, A. et al., "Understanding the Effects of Cationic and Anionic Substitutions in Spinel Cathodes of Lithium-Ion Batteries," Journal of The Electrochemical Society, 160 (6), 2013, pp. A901-A905.
Han et al., "Distinct Reaction Characteristics of Electrolyte Additives for High-Voltage Lithium-Ion Batteries: Tris(trimethylsilyl) Phosphite, Borate, and Phosphate", Electrochimica Acta 215 (2016) 455-465.
Han, Ah Reum et al., "Soft Chemical Dehydration Route to Carbon Coating of Metal Oxides: Its Application for Spinel Lithium Manganate," J. Phys. Chem. C, 2007, 111, pp. 11347-11352.
Hayashi, N. et al., "Cathode of $LiMg_yMn_{2-y}O_4$ and $LiMg_yMn_{2-y}O_4$, Spinel Phases for Lithium Secondary Batteries," Journal of The Electrochemical Society, 146 (4), 1999, pp. 1351-1354.
Hong, Jihyun et al., "Critical Role of Oxygen Evolved from Layered Li-Excess Metal Oxides in Lithium Rechargeable Batteries," Chem. Mater. 2012, 24, pp. 2692-2697.
Hou, Peiyu et al., "A high energy density Li-rich positive-electrode material with superior performances via a dual chelating agent co-precipitation route," J. Mater. Chem. A, 2015, 3, 9427-9431.
Hou, Peiyu et al., Supporting Information "A high energy density Li-rich positive-electrode material with superior performances via a dual chelating agent co-precipitation route," J. Mater. Chem. A, 2015, 3, 11 pages.
Hua, Chuanshan et al., "Study of full concentration-gradient $Li(Ni_{0.8}Co_{0.1}Mn_{0.1})O_2$ cathode material for lithium ion batteries," Journal of Alloys and Compounds, 614, 2014, pp. 264-270.
Hua, Weibo et al., "Na-doped Ni-rich $LiNi_{0.5}Co_{0.2}Mn_{0.3}O_2$ cathode material with both high rate capability and high tap density for lithium ion batteries," Dalton Trans., 2014, 43, pp. 14824-14832.
Hwang et al. (J. Mater. Chem., 2003, 13, 1962-1968).
Hwang, Sooyeon et al., "Investigation of Changes in the Surface Structure of $Li_xNi_{0.8}Co_{0.15}Al_{0.05}O_2$ Cathode Materials Induced by the Initial Charge," Chem. Mater. 2014, 26, pp. 1084-1092.
Hwang, Sooyeon et al., "Using Real-Time Electron Microscopy To Explore the Effects of Transition-Metal Composition on the Local Thermal Stability in Charged $Li_xNi_yMn_zCo_{1-y-z}O_2$ Cathode Materials," Chem. Mater., 2015, 27 (11), pp. 3927-3935.
Hy, Sunny et al., "Understanding the Role of Ni in Stabilizing the Lithium-Rich High-Capacity Cathode Material $Li[Ni_xLi_{(1-2x)/3}Mn_{(2-3x)/3}]O_2$ ($0 \leq x \leq 0.5$)," Chem. Mater. 2014, 26, pp. 6919-6927.

Irving, H. et al., "The Stability of Transition-metal Complexes," Journal of the Chemical Society, Issue 0, 1953, pp. 3192-3210.
Ito et al., "A rocking chair type all-solid-state lithium ion battery adopting $Li_2O$—$ZrO_2$ coated $LiNi_{0.8}Co_{0.15}Al_{0.05}O_2$ and a sulfide based electrolyte", Journal of Power Sources, vol. 248, 2014, pp. 943-950.
Jarvis, Karalee A. et al., "Atomic Structure of a Lithium-Rich Layered Oxide Material for Lithium-Ion Batteries: Evidence of a Solid Solution," Chem. Mater., 2011, 23 (16), pp. 3614-3621.
Johnson, C.S. et al. "Structural and electrochemical studies of a-manganese dioxide($\alpha$-$MnO_2$)", Journal of Power Sources 68 (1997) pp. 570-577.
Johnson, Christopher S. et al., "Structural Characterization of Layered $Li_xNi_{0.5}Mn_{0.5}O_2$ ($0 \leq x \leq 2$) Oxide Electrodes for Li Batteries," Chem. Mater. 2003, 15, pp. 2313-2322.
Johnson, Christopher S. et al., "Synthesis, Characterization and Electrochemistry of Lithium Battery Electrodes: $xLi_2MnO_3 \cdot (1-x)LiMn_{0.333}Ni_{0.333}Co_{0.333}O_2$ ($0 \leq x \leq 7$))," Chem. Mater. 2008, 20, pp. 6095-6106.
Johnson, Christopher S. et al., "The role of $Li_2MO_2$ structures (M=metal ion) in the electrochemistry of $(x)LiMn_{0.5}Ni_{0.5}O_2 \cdot (1-x)Li_2TiO_3$ electrodes for lithium-ion batteries," Electrochemistry Communications, 4, 2002, pp. 492-498.
Jouanneau, S. et al., "Preparation, Structure, an Thermal Stability of New $Ni_xCo_{1-2x}Mn_x(OH)_2$ ($0 \leq x \leq 1/2$) Phases," Chem.Mater., vol. 15, No. 2, 2003, pp. 495-499.
Ju, Jin-Wook et al., "Optimization of Layered Cathode Material with Full Concentration Gradient for Lithium-Ion Batteries," J. Phys. Chem. C, 2014, 118, pp. 175-182.
Jung et al., "$Li_3BO_3$-$Li_2CO_3$: Rationally Designed Buffering Phase for Sulfide All-Solid-State Li-Ion Batteries", Chemistry of Materials, DOI: 10.1021/acs.chemmater.8b03321 •Publication Date (Web): Oct. 19, 2018.
Kam, Kinson C. et al., "Aliovalent titanium substitution in layered mixed Li Ni—Mn—Co oxides for lithium battery applications," J. Mater. Chem., 2011, 21, pp. 9991-9993.
Kam, Kinson C. et al., "Electrochemical and Physical Properties of Ti-Substituted Layered Nickel Manganese Cobalt Oxide (NMC) Cathode Materials," Journal of The Electrochemical Society, 159 (8), 2012, pp. A1383-A1392.
Kang, Kisuk et al., "Electrodes with High Power and High Capacity for Rechargeable Lithium Batteries," Science, vol. 311, Feb. 17, 2006, pp. 977-980.
Kang, Kisuk et al., "Factors that affect Li mobility in layered lithium transition metal oxides," Physical Review B, 74, 2006, pp. 094105-1-094195-7.
Kang, S.-H. et al., "The Effects of Acid Treatment on the Electrochemical Properties of 0.5 $Li_2MnO_3 \cdot 0.5$ $LiNi_{0.44}Co_{0.25}Mn_{0.31}O_2$ Electrodes in Lithium Cells," Journal of The Electrochemical Society, 153 (6), 2006, pp. A1186-A1192.
Kang, Sun-Ho et al., "Enhancing the rate capability of high capacity $xLi_2MnO_3 \cdot (1-x)LiMO_2$ (M=Mn, Ni, Co) electrodes by Li—Ni—$PO_4$ treatment," Electrochemistry Communications, 11, 2009, pp. 748-751.
Kang, Sun-Ho et al., "First-cycle irreversibility of layered Li—Ni—Co—Mn oxide cathode in Li-ion batteries," Electrochimica Acta, 54, 2008, pp. 684-689.
Kang, Sun-Ho et al., "Investigating the first-cycle irreversibility of lithium metal oxide cathodes for Li batteries," J Mater Sci (2008) 43, pp. 4701-4706.
Kang, Sun-Ho et al., "Effects of Li Content on Structure an Electrochemical Properties of 0.5 $Li_2MnO_3$ Electrodes in Lithium Cell15 (1.0-4.8 V)," Journal of The Electrochemical Society, 154 (4), 2007, pp. A268-A274.
Kim, Chunjoong et al., "Stabilization of Battery Electrode/Electrolyte Interfaces Employing Nanocrystals with Passivating Epitaxial Shells," Chem. Mater. 2015, 27, pp. 394-399.
Kim, Duho et al., "Design of Nickel-rich Layered Oxides Using d Electronic Donor for Redox Reactions," Chem. Mater. 2015, 27, pp. 6450-6456.

(56) References Cited

OTHER PUBLICATIONS

Kim, H.-J. et al., "Coprecipitation and Characterization of Nickel-Cobalt-Manganese Hydroxides Precursor for Battery Cathode Materials," Abstract #849, 224th ECS Meeting, 2013 The Electrochemical Society, 1 page.

Kim, Hyun-Soo et al., "Enhanced electrochemical properties of $LiNi_{1/3}Co_{1/3}Mn_{1/3}O_2$ cathode material by coating with $LiAlO_2$ nanoparticles," Journal of Power Sources, 161, 2006, pp. 623-627.

Kim, Jeom-Soo et al., "Electrochemical and Structural Properties of $xLi_2M'O_3$ $(1-x)LiMn_{0.5}Ni_{0.5}O_2$ Electrodes for Lithium Batteries (M'=Ti, Mn, Zr; $0 \leq v \leq 0.3$)," Chem. Mater. 2004, 16, pp. 1996-2006.

Kim, Ji Woo et al., "Unexpected high power performance of atomic layer deposition coated $Li[Ni_{1/3}Mn_{1/3}Co_{1/3}]O_2$ cathodes," Journal of Power Sources, 254, 2014, pp. 190-197.

Kong, Fantai et al., "Multivalent Li-Site Doping of Mn Oxides for Li-Ion Batteries," J. Phys. Chem. C, 2015, 119, pp. 21904-21912.

Koo et al., "Vinylene carbonate and tris(trimethylsilyl) phosphite hybrid additives to improve the electrochemical performance of spinel lithium manganese oxide/graphite cells at 60 °C.", Electrochimica Acta 173 (2015) 750-756.

Kosova, N.V. et al., "Mixed layered Ni—Mn—Co hydroxides: Crystal structure, electronic state of ions, and thermal decomposition," Journal of Power Sources 174, 2007, pp. 735-740.

Kosova, N.V. et al., "Optimization of $Ni^{2+}/Ni^{3+}$ ratio in layered $Li(Ni, Mn, Co)O_2$ cathodes for better electrochemistry," Journal of Power Sources, 174, 2007, pp. 965-969.

Kovanda, Frantisek et al., "Mixed oxides obtained from Co and Mn containing layered double hydroxides: Preparation, characterization, and catalytic properties," Journal of Solid State Chemistry, 179, 2006, pp. 812-823.

Kovanda, Frantisek et al., "Thermal behaviour of Ni—Mn layered double hydroxide and characterization of formed oxides," Solid State Sciences, 5, 2003, pp. 1019-1026.

Koyama, Yukinori et al., "Crystal and electronic structures of superstructural $Li_{1-x}[Co_{1/3}Ni_{1/3}Mn_{1/3}]O_2$ ($0 \leq x \leq 1$)," Journal of Power Sources 119-121, 2003, pp. 644-648.

Lee, D.-K. et al., "High capacity $Li[Li_{0.2}Ni_{0.2}Mn_{0.6}]O_2$ cathode materials via a carbonate co-precipitation method," Journal of Power Sources 162, 2006, pp. 1346-1350.

Lee, Jyh-Tsung et al., "Low-temperature atomic layer deposited $Al_2O_3$ thin film on layer structure cathode for enhanced cycleability in lithium-ion batteries," Electrochimica Acta 55, 2010, pp. 4002-4006.

Lee, M.-H. et al., "Synthetic optimization of $Li[Ni_{1/3}Co_{1/3}Mn_{1/3}]O_2$ via co-precipitation," Electrochimica Acta, 50, 2004, pp. 939-948.

Levasseur et al., "Oxygen Vacancies and Intermediate Spin Trivalent Cobalt Ions in Lithium-Overstoichiometric $LiCoO_2$", Chemistry of Materials, Jan. 1, 2003, vol. 15, No. 1, pp. 348-354, XP055474666.

Li et al., "Hybrid Polymer/Garnet Electrolyte with a Small Interfacial Resistance for Lithium-Ion Batteries", Angew. Chem. 2017, 129, 771-774; DOI: 10.1002/ange.201608924.

Li et al., "New electrolytes for lithium ion batteries using LiF salt and boron based anion receptors", Journal of Power Sources 184 (2008) 517-521; doi:10.1016/j.jpowsour.2008.03.016.

Li, Jinfeng et al., "Improve First-Cycle Efficiency and Rate Performance of Layered-Layered $Li_{1.2}Mn_{0.6}Ni_{0.2}O_2$ Using Oxygen Stabilizing Dopant," ACS Appl. Mater. Interfaces, 2015, 7, pp. 16040-16045.

Li, Jing et al., "Synthesis and Characterization of the Lithium-Rich Core-Shell Cathodes with Low Irreversible Capacity and Mitigated Voltage Fade," Chem. Mater. 2015, 27, pp. 3366-3377.

Li, Y. et al., "Understanding Long-Term Cycling Performance of $Li_{1.2}Ni_{0.15}Mn_{0.55}Co_{0.1}O_2$-Graphite Lithium-Ion Cells," Journal of The Electrochemical Society, 160 (5), 2013, pp. A3006-A3019.

Li, Zheng et al., "Stability and Rate Capability of Al Substituted Lithium-Rich High-Manganese Content Oxide Materials for Li-Ion Batteries," Journal of The Electrochemical Society, 159 (2), 2012, pp. A116-A120.

Liao, Jin-Yun et al., "Surface-modified concentration-gradient Ni-rich layered oxide cathodes for high-energy lithium-ion batteries," Journal of Power Sources, 282, 2015, pp. 429-436.

Lim, Jae-Hwan et al., "Electrochemical characterization of $Li_2MnO_3$—$Li[Ni_{1/3}Co_{1/3}Mn_{1/3}]O_2$—$LiNiO_2$ cathode synthesized via co-precipitation for lithium secondary batteries," Journal of Power Sources, 189, 2009, pp. 571-575.

Lin, Feng et al., "Surface reconstruction and chemical evolution of stoichiometric layered cathode materials for lithium-ion batteries," Nature Communications, Mar. 27, 2014, pp. 1-9.

Liu et al., "Achieving high capacity in bulk-type solid-state lithium-ion battery based on $Li_{6.75}La_3Zr_{1.75}Ta_{0.25}O_{12}$ electrolyte: Interfacial resistance", journal of Power Sources 324 (2016) pp. 349-357.

Liu, H. et al., "Electrochemical performance of $LiFePO_4$ cathode material coated with $ZrO_2$ nanolayer," Electrochemistry Communications 10 (2008), pp. 165-169.

Liu, Hao-Han et al., "Structure Evolution and Electrochemical Performance of $Al_2O_3$-coated $LiNi_{0.4}Co_{0.2}Mn_{0.4}O_2$ During Charge-discharge Cycling," Chem. Res. Chinese Universities 2012, 28(4), pp. 686-690.

Liu, Jun et al. "Spherical nanoporous $LiCoPO_4/C$ composites as high performance cathode materials for rechargeable lithium-ion batteries," J. Mater. Chem., 2011, 21, pp. 9984-9987.

Liu, Jun et al., "Carbon-coated high capacity layered $Li[Li_{0.2}Mn_{0.54}Ni_{0.13}Co_{0.13}]O_2$ cathodes," Electrochemistry Communications 12 (2010), pp. 750-753.

Liu, Jun et al., "Conductive Surface Modification with Aluminum of High Capacity Layered $Li[Li_{0.2}Mn_{0.54}Ni_{0.13}Co_{0.13}]O_2$ Cathodes," J. Phys. Chem. C 2010, 114, pp. 9528-9533.

Liu, Jun et al., "Understanding the Improvement in the Electrochemical Properties of Surface Modified 5 V $LiMn_{142}Ni_{042}Co_{016}O_4$ Spinel Cathodes in Lithium-ion Cells," Chem. Mater. 2009, 21, pp. 1695-1707.

Liu, Lijun et al., "Electrochemical and In Situ Synchrotron XRD Studies on $Al_2O_3$-Coated $LiCoO_2$ Cathode Material," Journal of The Electrochemical Society, 2014, 151 (9), A1344-A1351.

Liu, Shuang et al., "Long cycle life lithium ion battery with lithium nickel cobalt manganese oxide (NCM) cathode," Journal of Power Sources, 261, 2014, pp. 285-291.

Liu, Wen et al., "Nickel-Rich Layered Lithium Transitional-Metal Oxide for High-Energy Lithium-Ion Batteries," Angew. Chem. Int. Ed. 2015, 54, pp. 4440-4458.

Liu, Xizheng et al., "Study on the capacity fading of pristine and $FePO_4$ coated $LiNi_{1/3}Co_{1/3}Mn_{1/3}O_2$ by Electrochemical and Magnetical techniques," Electrochimica Acta 148, 2014, pp. 26-32.

Liu, Zhaoping et al., "Synthesis, Anion Exchange, and Delamination of Co—Al Layered Double Hydroxide: Assembly of the Exfoliated Nanosheet/Polyanion Composite Films and Magneto-Optical Studies," J. Am. Chem. Soc., 2006, 128, pp. 4872-4880.

Liu, Yi et et al., "$Li_3V_2(PO_4)_3$-coated $Li_{1.17}Ni_{0.2}Co_{0.05}Mn_{0.58}O_2$ as the cathode materials with high rate capability for Lithium ion batteries," Electrochimica Acta 147, 2014, pp. 696-703.

Luo, Wenbin et al., "Can Zr be Substituted for Co in $Co_{1-z}Zr_z(OH)_2$ and $LiCo_{1-z}Zr_zO_2$?," Journal of The Electrochemical Society, 158, (2), 2011, pp. A110-A114.

Luo, Wenbin et al., "Preparation of $Co_{1-z}Al_z(OH)_2(NO_3)_z$ Layered Double Hydroxides and $Li(Co_{1-z}Al_z)O_2$," Chem. Mater. 2009, 21, pp. 56-82.

Luo, Wenbin et al., "Synthesis, Characterization, and Thermal Stability of $LiNi_{1/3}Mn_{1/3}Co_{1/3-z}MgzO_2$, $LiNi_{1/3-z}Mn_{1/3}Co_{1/3}MgzO_2$, and $LiNi_{1/3}Mn_{1/3-z}Co_{1/3}MgzO_2$," Chem. Mater., 2010, 22, pp. 1164-1172.

Luo, Wenbin et al., "The Impact of Zr Substitution on the Structure, Electrochemical Performance and Thermal Stability of $Li[Ni_{1/3}Mn_{1/3-z}Co_{1/3}Zr_z]O_2$," Journal of The Electrochemical Society, 158 (4), 2011, pp. A428-A433.

Ma et al., "Ternary and Quaternary Electrolyte Additive Mixtures for Li-Ion Cells That Promote Long Lifetime, High Discharge Rate and Better Safety", Journal of The Electrochemical Society, 161 (9) A1261-A1265 (2014).

Ma et al., "Ternary Electrolyte Additive Mixtures for Li-Ion Cells that Promote Long Lifetime and Less Reactivity with Charged

(56) References Cited

OTHER PUBLICATIONS

Electrodes at Elevated Temperatures", Journal of The Electrochemical Society, 162 (7) A1170-A1174 (2015).
Ma, Jin et al., "A highly homogeneous nanocoating strategy for Li-rich Mn-based layered oxides based on chemical conversion," Journal of Power Sources, 277, 2015, pp. 393-402.
Ma, Miaomiao et al., "Structural and electrochemical behavior of $LiMn_{0.4}Ni_{0.4}Co_{0.2}O_2$," Journal of Power Sources, 165, 2007, pp. 517-534.
Makimura, Yoshinari et al., "Lithium insertion material of $LiNi_{1/2}Mn_{1/2}O_2$ for advanced lithium-ion batteries," Journal of Power Sources, 119-121, 2003, pp. 156-160.
Manthiram, Arumugam, "Materials Challenges and Opportunities of Lithium-Ion Batteries," J. Phys. Chem. Lett., 2011, 2, pp. 176-184.
Markus, Isaac M. et al., "Computational and Experimental Investigation of Ti Substitution in $Li_1(Ni_xMn_xCo_{1-2x-y}Ti_y)O_2$ for Lithium Ion Batteries," J. Phys. Chem. Lett. 2014, 5, pp. 3649-3655.
McCalla, E. et al., "Formation of Layered-Layered Composites in the Li—Co—Mn Oxide Pseudoternary System during Slow Cooling," Chem. Mater. 2013, 25, pp. 912-918.
McCalla, E. et al., "How Phase Transformations during Cooling Affect Li—Mn—Ni—O Positive Electrodes in Lithium Ion Batteries," Journal of The Electrochemical Society, 160 (8), 2013, pp. A1134-A1138.
McCalla, E. et al., "Lithium loss mechanisms during synthesis of layered $Li_{x}Ni_{2-x}O_2$ for lithium-ion batteries," Solid State Ionics 219, 2012, pp. 11-19.
McCalla, E. et al., "Structural Study of the Li—Mn—Ni Oxide Pseudoternary System of Interest for Positive Electrodes of Li-Ion Batteries," Chem. Mater., 2013, 25, pp. 989-999.
McCalla, E. et al., "The Role of Metal Site Vacancies in Promoting Li—Mn—Ni-0 Layered Solid Solutions," Chem. Mater., 2013, 25, pp. 2716-2721.
McCalla, E. et al., "The spinel and cubic rocksalt solid-solutions in the Li—Mn—Ni oxide pseudo-ternary system," Solid State Ionics, 242, 2013, pp. 1-9.
Meng, Ying S. et al., "Combining Ab Initio Computation with Experiments for Designing New Electrode Materials for Advanced Lithium Batteries: $LiNi_{1/3}Fe_{1/6}Co_{1/6}Mm_{1/3}O_2$," Journal of The Electrochemical Society, 151 (8), 2004, pp. A1134-A1140.
Mohanty, Debasish et al., "Structural transformation of a lithium rich Li1.2Co0.1Mn0.55Ni0.15O2 cathode during hig voltage cycling resolved by in situ X-ray diffraction," Journal of Power Sources, 229, 2013, pp. 239-248.
Mueller-Neuhaus, J.R. et al., "Understanding Irreversible Capacity in $Li_xNi_{1-y}Fe_yO_2$ Cathode Materials," Journal of The Electrochemical Society, 147 (10), 2000, pp. 3598-3605.
Mulder, Grietus et al., "Comparison of commercial battery cells in relation to material properties," Electrochimica Acta, 87, 2013, pp. 473-488.
Myung, Seung-Taek et al., "Progress in High-Capacity Core-Shell Cathode Materials for Rechargeable Lithium Batteries," J. Phys. Chem. Lett., 5, 2014, pp. 671-679.
Nagash, A.R. et al., "Effect of oxygen non-stoichiometry on the electrochemical performance of lithium manganese oxide spinels," Journal of Power Sources, 102, 2001, pp. 68-73.
Nie et al., "Some Lewis acid-base adducts involving boron trifluoride as electrolyte additives for lithium ion cells", Journal Of Power Sources, vol. 328, Aug. 17, 2016, pp. 433-442; DOI: 10.1016/J.JPOWSOUR.2016.08.048.
Noh, Hyung-Joo et al., "Cathode Material with Nanorod Structure—An Application for Advanced High-Energy and Safe Lithium Batteries," Chem. Mater., 2013, 25, pp. 2109-2115.
Noh, Hyung-Joo et al., "Comparison of the structural and electrochemical properties of layered $Li[Ni_xCo_yMn_z]O_2$ (x=1/3, 0.5, 0.6, 0.7, 0.8 and 0.85) cathode material for lithium-ion batteries," Journal of Power Sources, 233, 2013, pp. 121-130.
Noh, Hyung-Joo et al., "Formation of a Continuous Solid-Solution Particle and its Application to Rechargeable Lithium Batteries," Adv. Funct. Mater., 2013, 23, pp. 1028-1036.
Notice of Preliminary Rejection for the Korean Patent Application No. 10-2022-7044508 dated Mar. 21, 2023, and its English translation.
Oh, Pilgun et al., "Superior Long-Term Energy Retention and Volumetric Energy Density for Li-Rich Cathode Materials," Nano Lett., 2014, 14, pp. 5965-5972.
Oh, Pilgun et al., *Supporting Information* "Superior Long-Term Energy Retention and Volumetric Energy Density for Li-Rich Cathode Materials," Nano Lett. 2014, 14, 12 pages.
Ohzuku, Tsutomo et al., "Electrochemistry and Structural Chemistry of $LiNiO_2$ (R3m) for 4 Volt Secondary Lithium Cells," J. Electrochem. Soc. 140(7), 1993, pp. 1862-1870.
Ohzuku, Tsutomo et al., "High-capacity lithium insertion materials of lithium nickel manganese oxides for advanced lithium-ion batteries: toward rechargeable capacity more than 300 mA h $g^{-1}$" J. Mater. Chem., 2011, 21, pp. 10179-101888.
Ohzuku, Tsutomu et al., "Synthesis and Characterization of $Li[Ni_{1/2}Mn_{3/2}]O_4$ by Two-Step Solid State Reaction," Journal of the Ceramic Society of Japan, 110 [5], 2002, pp. 501-505.
Oishi, Masatsugu et al., "Direct observation of reversible charge compensation by oxygen ion in Li-rich manganese layered oxide positive electrode material, $Li_{1.16}Ni_{0.15}Co_{0.19}Mn_{0.50}O_2$," Journal of Power Sources, 276, 2015, pp. 89-94.
Oka, Y. et al., "High-Temperature Cycling Performance of $LiNi_{1/3}Co_{1/3}Mn_{1/2}O_2$ Cathode with DLC Protective Film," Journal of The Electrochemical Society, 162 (2), 2015, pp. A3032-A3037.
Okada, Shigeto et al., "Fluoride Phosphate Li2COPO4F as a High Voltage Cathode in Li-ion Batteries," Journal of Power Sources, 146, 2005, pp. 565-569.
Okamoto, Kaoru et al., "X-Ray Absorption Fine Structure Study on Layered $LIMO_2$ (M=Ni, Mn, Co) Cathode Materials," Journal of The Electrochemical Society, 153(6), 2006, pp. A1120-A1127.
Paik, Younkee et al., "Lithium and Deuterium NMR Studies of Acid-Leached Layered Lithium Manganese Oxides," Chem. Mater., 2002, 14, pp. 5109-5115.
Palacin, M.R. et al., "Electrochemical and structural study of the 3.3 V reduction step in defective $Li_xMn_2O_4$ and $LiMn_2O_{(4-y)}F_y$ compounds," Journal of Power Sources 81-82, 1999, pp. 627-631.
Palacin, M.R. et al., "On the role of defects in decreasing the extra 3.3/3.95 and 4.5 V redox steps in Li—Mn—O spinels," Journal of Power Sources, 97-98, 2001, pp. 398-401.
Pan, Cheng-chi et al., "Recent development of $LiNi_xCo_yMn_zO_2$: Impact of micro/nano structures for imparting improvements in lithium batteries," Trans. Nonferrous Met. Soc. China, 23, 2013, pp. 108-119.
Park, B.-C., et al., "Improvement of structural and electrochemical properties of $AlF_3$-coated $Li[Ni_{1/3}Co_{1/3}Mn_{1/3}]O_2$ cathode materials on high voltage region," Journal of Power Sources, 178, 2008, pp. 826-831.
Park, Joong Sun et al., "Amorphous Metal Fluoride Passivation Coatings Prepared by Atomic Layer Deposition on $LiCoO_2$ for Li-Ion Batteries," Chem. Mater. 2015, 27, pp. 1917-1920.
Park, S.-H. et al., "Lithium-manganese-nickel-oxide electrodes with integrated layered-spinel structures for lithium batteries," Electrochemistry Communications, 9, 2007, pp. 262-268.
Paulsen, J. et al., "Layered Li—Mn-Oxide with the O2 Structure: A Cathode Material for Li-Ion Cells Which Does Not Convert to Spinel", Journal of The Electrochemical Society, 146 (10), 1991, pp. 3560-3565.
Pires et al., "Tris(2,2,2-trifluoroethyl) phosphite as an electrolyte additive for high-voltage lithium-ion batteries using lithium-rich layered oxide cathode", Journal of Power Sources 296 (2015) 413-425; http://dx.doi.org/10.1016/j.jpowsour.2015.07.065.
Pouillerie, C. et al., "The $Li_xNi_{1-y}Mg_yO_2$ (y=0.05, 0.10) system: structural modifications observed upon cycling," Solid State Ionics, 132, 2000, pp. 15-29.
Prasad, R. et al., "Dopant-induced stabilization of rhombohedral $LiMnO_2$ against Jahn-Teller distortion," Physical Review B 71, 2005, 134111-1-134111-11.

(56) References Cited

OTHER PUBLICATIONS

Qi et al., "Lifetime limit of tris(trimethylsilyl) phosphite as electrolyte additive for high voltage lithium-ion batteries", J. Name, 2013, 00, 1-3.

Qian, Danna et al., "Uncovering the roles of oxygen vacancies cation migration in lithium excess layered oxides," Phys. Chem. Chem. Phys., 2014, 16, pp. 14665-14668.

Rashid, Muhammad et al., "Effect of Relaxation Periods over Cycling Performance of a Li-Ion Battery," Journal of The Electrochemical Society, 162 (2), 2015, pp. A3145-A3153.

Riley, Leah A., "Electrochemical effects of ALD surface modification on combustion synthesized $LiNi_{1/3}Mn_{1/3}Co_{1/3}O_2$ as a layered-cathode material," Journal of Power Sourcesm, 196, 2011, pp. 3317-3324.

Robert, Rosa et al., "Enhancement of the high potential specific charge in layered electrode materials for lithium-ion batteries," J. Mater. Chem. A, 2014, 2, pp. 8589-8598.

Rowe, Aaron W. et al., "Positive Electrode Materials in the Li—Mn—Ni—O System Exhibiting Anomalous Capacity Growth during Extended Cycling," Journal of The Electrochemical Society, 161 (3), 2014, pp. A308-A317.

Saavedra-Arias, Jose J. et al., "Synthesis and electrochemical properties of $Li(Ni_{0.8}Co_{0.1}Mn_{0.1})O_2$ cathode material: Ex situ structural analysis by Raman scattering and X-ray diffraction at various stages of charge-discharge process," Journal of Power Sources, 183, 2008, pp. 761-765.

Schleutker et al., "On the interfacial charge transfer between solid and liquid Li+ electrolytes", Phys. Chem. Chem. Phys., 2017, 19, 26596-26605.

Sekizawa, Oki et al., "Crystal and electronic structure change determined by various method for delithiation process of $Li_x(Ni,Mn)O_2$-based cathode material," Journal of Power Sources, 196, 2011, pp. 6651-6656.

Shen, Chong-Heng et al., "Facile Synthesis of The U-Rich Layered Oxide $Li_{1.23}Ni_{0.009}Co_{0.12}Mn_{0.56}O_2$ with Superior Lithium Storage Performance and New Insights into Structural Transformation of the Layered Oxide Material during Charge-Discharge Cycle: In Situ XRD Characterization," ACS Appl. Mater. Interfaces, 2014, 6, pp. 5516-5524.

Shunmugasundaram, Ramesh et al., "High Capacity Li-Rich Positive Electrode Materials with Reduced First-Cycle Irreversible Capacity Loss," Chem. Mater. 2015, 27, pp. 757-767.

Son, Hyuk et al., "Self-Terminated Artificial SEI Layer for Nickel-Rich Layered Cathode Material via Mixed Gas Chemical Vapor Deposition," Chem. Mater. 2015, 27, pp. 7370-7379.

Song et al., "A multifunctional phosphite-containing electrolyte for 5 V-class $LiNi_{0.5}Mn_{1.5}O_4$ cathodes with superior electrochemical performance", J. Mater. Chem. A, 2014, 2, 9506-9513.

Song et al., "Exploiting chemically and electrochemically reactive phosphite derivatives for high-voltage spinel $LiNi_{0.5}Mn_{1.5}O_4$ cathodes", Journal of Power Sources 302 (2016) 22-30.

Song, Jie et al., "Role of Oxygen Vacancies on the Performance of $Li[Ni_{0.5-x}Mn_{1.5+x}]O_4$ (x=0, 0.05, and 0.08) Spinel Cathodes for Lithium-Ion Batteries," Chem. Mater., 2012, 24 (15), pp. 3101-3109.

Sun, Yang-Kook et al., "High-energy cathode material for long-life and safe lithium batteries," Nature Materials, vol. 8, Apr. 2009, pp. 320-324.

Sun, Yang-Kook et al., "Nanostructured high-energy cathode materials for advanced lithium batteries," Nature Materials, vol. 11, 2012, pp. 942-947.

Sun, Yang-Kook et al., "Synthesis and Characterization of $Li[(Ni_{0.8}Co_{0.1}Mn_{0.1})_{0.8}(Ni_{0.5}Mn_{0.5})_{0.2}]O_2$ with the Microscale Core-Shell Structure as the Positive Electrode Material for Lithium Batteries," J. Am. Chem. Soc., 2005, 127, pp. 13411-13418.

Sun Yang-Kook et al., "The Role of $AlF_3$ Coatings in Improving Electrochemical Cycling of Li-Enriched Nickel-Manganese Oxide Electrodes for Li-Ion Batteries," Adv. Mater. 2012, 24, pp. 1192-1196.

Sun, Yang-Kook, "Concentration-Gradient Materials," Energy Storage & Conversion Material Laboratory, Hanyang University, (0305-30), 14 pages.

Tan, ShuangYuan et al., "Highly enhanced low temperature discharge capacity of $LiNi_{1/3}Co_{1/3}Mn_{1/3}O_2$ with lithium boron oxide glass modification," Journal of Power Sources, 277, 2015, pp. 139-146.

Tarascon, J.M. et al., "Synthesis Conditions and Oxygen Stoichiometry Effects on Li Insertion into the Spinel $LiMn_2O_4$," J. Electrochem. Soc., vol. 141, No. 6, Jun. 1994, pp. 1421-1431.

Tarascon, J.M. et al., "The Spinel Phase of $LiMn_2O_4$ as a Cathode in Secondary Lithium Cells," J. Electrochem. Soc., vol. 138, No. 10, Oct. 1991, pp. 2859-2864.

Thackeray, M. M. et al., "Advances in manganese-oxide 'composite' electrodes for lithium-ion batteries," J. Mater. Chem., 2005, 15, pp. 2257-2267.

Thackeray, M. M. et al., "$ZrO_2$- and $Li_2ZrO_3$-stabilized spinel and layered electrodes for lithium batteries," Electrochemistry Communications, 5, 2003, pp. 752-758.

Thackeray, M. M., "Structural Considerations of Layered and Spinel Lithiated Oxides for Lithium Ion Batteries," J. Electrochem. Soc., vol. 142, No. 8, Aug. 1995, pp. 2558-2563.

Thackeray, M.M. et al., "Comments on the structural complexity of lithium-rich $Li_{1+x}M_{1-x}O_2$ electrodes (M=Mn, Ni, Co) for lithium batteries," Electrochemistry Communications 8 (2006), pp. 1531-1538.

Thackeray, Michael M. et al., "$Li_2MnO_3$-stabilized $LiMO_2$ (M=Mn, Ni, Co) electrodes for lithium-ion batteries," J. Mater. Chem., 2007, 17, pp. 3112-3125.

Van Bommel, Andrew et al., "Analysis of the Growth Mechanism of Coprecipitated Spherical and Dense Nickel, Manganese, and Cobalt-Containing Hydroxides in the Presence of Aqueous Ammonia," Chem. Mater., 2009, 21, pp. 1500-1503.

Van Bommel, Andrew et al., "Synthesis of Spherical and Dense Particles of the Pure Hydroxide Phase $Ni_{1/3}Mn_{1/3}Co_{1/3}(OH)_2$," Journal of The Electrochemical Society, 156 (5), 2009, pp. A362-A365.

Van der Ven, A., et al. "Lithium Diffusion in Layered $Li_xCoO_2$," Electrochemical and Solid-State Letters, 3 (7) (2000), pp. 301-304.

Wang et al., "A comparative study of Si-containing electrolyte additives for lithium-ion battery: Which one is better and why is it better", Journal of Power Sources 342 (2017) 677-684.

Wang et al., "A Systematic Study of Electrolyte Additives in $Li[Ni_{1/3}Mn_{1/3}Co_{1/3}]O_2$ (NMC)/Graphite Pouch Cells", Journal of The Electrochemical Society, 161 (12) A1818-A1827 (2014).

Wang et al., "Trimethyl borate as an electrolyte additive for high potential layered cathode with concurrent improvement of rate capability and cyclic stability", Electrochimica Acta 184 (2015) 40-46.

Wang, Dapeng et al., "Synthesis of high capacity cathodes for lithium-ion batteries by morphology-tailored hydroxide co-precipitation, "Journal of Power Sources, 274, 2015, pp. 451-457.

Wang, Dapeng et al., "Synthesis of Lithium and Manganese-Rich Cathode Materials via an Oxalate Co-Precipitation Method," Journal of The Electrochemical Society, 160 (5), 2013, pp. A3108-A3112.

Wang, Q. Y. et al., "High capacity double-layer surface modified $Li[Li_{0.2}Mn_{0.54}Ni_{0.13}Co_{0.13}]O_2$ cathode with improved rate capability," J. Mater. Chem., 2009, 19, pp. 4965-4972.

Wang, Tao et al., "Synthesis optimization of $Li_{1+x}[Mn_{0.45}Co_{0.40}Ni_{0.15}]O_2$ with different spherical sizes via co-precipitation," Powder Technology, 187, 2008, pp. 124-129.

Wei et al. "Improved electrochemical performances of nanocrystalline $Li[Li_{0.2}Mn_{0.54}Ni_{0.13}Co_{0.13}]O_2$ cathode material for Li-ion batteries", RSC Advances, 2012, 2, pp. 3423-3429.

Wei, Yi et al., "Kinetics Tuning of Li-ion Diffusion in Layered $U(Ni_xMn_yCo_z)O_2$," J. Am. Chem. Soc., 2015, 137, pp. 8364-8367, together with Supporting Information, 48 pages.

Wilcox, James et al., "Structure and Electrochemistry of $LiNi_{1/3}Co_{1/3-y}MyMn_{1/3}O_2$ (M=Ti, Al, Fe) Positive Electrode Materials," Journal of The Electrochemical Society, 156 (3), 2009, pp. A192-A198.

(56) References Cited

OTHER PUBLICATIONS

Wilcox, James et al., "The Impact of Aluminum and Iron Substitution on the Structure and Electrochemistry of Li(Ni$_{0.4}$Co$_{0.2-y}$M$_y$Mn$_{0.4}$)O$_2$ Materials," Journal of The Electrochemical Society, 156 (12) 2009, pp. A1011-A1018.
Wolf-Goodrich, Silas et al., "Tailoring the surface properties of LiNi$_{0.4}$Mn$_{0.4}$Co$_{0.2}$O$_2$ by titanium substitution for improved high voltage cycling performance," Phys. Chem.Chem.Phys., 2015, 17, pp. 21778-21781.
Woo, S-W, et al. "Improvement of electrochemical and thermal properties of Li[Ni$_{0.8}$Co$_{0.1}$Mn$_{0.1}$]O$_2$ positive electrode materials by multiple metal (Al, Mg) substitution," Electrochimica Acta, 54, 2009, pp. 3851-3856.
Wu, Feng et al., "Effect of Ni$^{2+}$Content on Lithium/Nickel Disorder for Ni-Rich Cathode Materials," ACS Appl. Mater. Interfaces 2015, 7, pp. 7702-7708.
Wu, Kuichen et al., "Effect of precursor and synthesis temperature on the structural and electrochemical properties of Li(Ni$_{0.5}$Co$_{0.2}$Mn$_{0.3}$)O$_2$," Electrochimica Acta, 75, 2012, pp. 393-398.
Wu, Xiaobiao et al., "Sol-gel Synthesis of Li$_2$CoPO$_4$F/C Nanocomposite as a High-Power Cathode Material for Lithium-Ion Batteries," Journal of Power Sources, 220, 2012, pp. 122-129.
Wu, Y. et al. "Structural stability of chemically delithiated layered (1-z)Li[Li$_{1/3}$Mn$_{2/3}$]O$_2$-zLi[Mn$_{0.5-y}$Ni$_{0.5-y}$Co$_{2y}$]O$_2$ solid solution cathodes," Journal of Power Sources, 183, 2008, pp. 749-754.
Xia et al., "Fluorinated electrolyte for 4.5 V Li(Ni$_{0.4}$Mn$_{0.4}$Co$_{0.2}$)O$_2$/ graphite Li-ion Cells", Journal of Power Sources 307 (2016) 340-350; http://dx.doi.org/10.1016/j.jpowsour.2015.12.132.
Xia et al., "Improving sulfolane-based electrolyte for high voltage Li-ion cells with electrolyte additives", Journal of Power Sources 324 (2016) 704-711.
Xiang, Xingde et al., "Understanding the Effect of Co$^{3+}$Substitution on the Electrochemical Properties of Lithium-Rich Layered Oxide Cathodes for Lithium-Ion Batteries," J. Phys. Chem. C, 2014, 118, pp. 21826-21833.
Xiong, Xunhui et al., "A modified LiF coating process to enhance the electrochemical performance characteristics of LiNi$_{0.8}$Co$_{0.1}$Mn$_{0.1}$O$_2$ cathode materials," Materials Letters, 110, 2013, pp. 4-9.
Xu, Bo et al., "Identifying surface structural changes in layered Li-excess nickel manganese oxides in high voltage lithium-ion batteries: A joint experimental and theoretical study," Energy Environ. Sci., May 3, 20133, 11 pages.
Yabuuchi, Naoaki et al., "Novel lithium insertion material of LiCo$_{1/3}$Ni$_{1/3}$Mn$_{1/3}$O$_2$ for advanced lithium-ion batteries," Journal of Power Sources 119-121, 2003, pp. 171-174.
Yabuuchi, Naoki et al., "High-capacity electrode materials for rechargeable lithium batteries: Li$_3$NbO$_4$-based system with cation-disordered rocksalt structure," PNAS, vol. 112, No. 25, Jun. 23, 2015, pp. 7650-7655.
Yan, Jianhua et al., "Recent progress in Li-rich layered oxides as cathode materials for Li-ion batteries," RSC Adv., 2014, 4, pp. 63268-63284.
Yan, Pengfei et al., "Atomic-Resolution Visualization of Distinctive Chemical Mixing Behavior of Ni, Co, and Mn with Li in Layered Lithium Transition-Metal Oxide Cathode Materials," Chem. Mater., 2015, 27 (15), pp. 5393-5401.
Yang et al., "Pushing Lithium Cobalt Oxides to 4.7 V by Lattice-Matched Interfacial Engineering", Advanced Energy Materials 2022, 12, 2200197; 12 pages.
Yang, Feifei et al., "Nanoscale Morphological and Chemical Changes of High Voltage Lithium-Manganese Rich NMC Composite Cathodes with Cycling," Nano Lett., 2014, 14, pp. 4334-4341.
Yang, Xiao-Qing et al., "Crystal structure changes of LiMn$_{0.5}$Ni$_{0.5}$O$_2$ cathode materials during charge and discharge studied by synchrotron based in situ XRD," Electrochemistry Communications, 4, 2002, pp. 649-654.
Yang, Yuan et al., "A membrane-free lithium/polysulfide semi-liquid battery for large-scale energy storage," Energy Environ. Sci., 2013, 6, pp. 1552-1558.
Yano, Akira et al., "Surface Structure and High-Voltage Charge/Discharge Characteristics of Al-Oxide Coated LiNi$_{1/3}$Co$_{1/3}$Mn$_{1/3}$O$_2$ Cathodes," Journal of The Electrochemical Society, 162 (2), 2015, pp. A3137-A3144.
Ye, Delai et al., "Ni-induced stepwise capacity increase in Ni-less Li-rich cathode materials for high performance lithium-ion batteries," Nano Research, 8(3), Feb. 2014, pp. 808-820.
Yin, S -C et al. X-ray/Neutron Diffraction and Electrochemical Studies of Lithium De/Re-Intercalation in Li$_{1-x}$Co1/3Ni$_{1/3}$Mn1/3 O$_2$ (x=0 -->1), Chem. Mater. 2006, 18, pp. 1901-1910.
Yoon, Sung-Jun et al., "Improved Performances of Li[Ni$_{0.65}$Co$_{0.08}$Mn$0.27$]O$_2$ Cathode Material with Full Concentration Gradient for Li-Ion Batteries," Journal of The Electrochemical Society, 162 (2), 2015, pp. A3059-A3063.
Yoon, Won-Sub et al. "Investigation of the Charge Compensation Mechanism on the Electrochemically Li-Ion Deintercalated Li$_{1-x}$Co$_{1/3}$Ni$_{1/3}$Mn$_{1/3}$O$_2$ Electrode System by Combination of Soft and Hard X-ray Absorption Spectroscopy," J. Am. Chem. Soc., 2005, 127, pp. 17479-17487.
Yoon, Won-Sub et al., "Electronic structural changes of the electrochemically Li-ion deintercalated LiNi$_{0.8}$Co$_{0.15}$Al$_{0.05}$O$_2$ cathode material investigated by X-ray absorption spectroscopy," Journal of Power Sources, 174, 2007, pp. 1015-1020.
Yoon, Won-Sub et al., "In Situ X-ray Absorption Spectroscopic Study on LiNi0.5Mn0.5O2 Cathode Material during Electrochemical Cycling," Chem. Mater. 2003, 15, pp. 3161-3169.
Yoon, Won-Sub et al., "Investigation of the Local Structure of the LiNi$_{05}$Mn$_{05}$0$_2$ Cathode Material during Electrochemical Cycling by X-Ray Absorption and NMR Spectroscopy," Electrochemical and Solid-State Letters, 5 (11), 2002, pp. A263-A266.
Yoon, Won-Sub et al., "Li MAS NMR and in situ X-ray studies of lithium nickel manganese oxides," Journal of Power Sources 119-121, 2003, pp. 649-653.
Yu, Haijun et al., "Study of the lithium/nickel ions exchange in the layered LiNi$_{0.42}$Mn$_{0.42}$Co$_{0.16}$O$_2$ cathode material For lithium ion batteries: experimental and first-principles calculations," Energy Environ. Sci., 2014, 11 pages.
Yue, Peng et al., "A low temperature fluorine substitution on the electrochemical performance of layered LiNi$_{0.8}$Co$_{0.1}$Mn$_{0.1}$O$_{2-z}$F$_z$ cathode materials," Electrochimica Acta, 92, 2013, pp. 1-8.
Yue, Peng et al., "Effect of fluorine on the electrochemical performance of spherical LiNi$_{0.8}$Co$_{0.1}$Mn$_{0.1}$O$_2$ cathode materials via a low temperature method," Powder Technology, 237, 2013 pp. 623-626.
Yue, Yang et al., "Growth mechanisms for spherical mixed hydroxide agglomerates prepared by co-precipitation method: A case of Ni$_{1/3}$Co$_{1/3}$Mn$_{1/3}$(OH)$_2$," Journal of Alloys and Compounds, 619, 2015, pp. 846-853.
Zhan et al., "Influence of annealing atmosphere on Li$_2$ZrO$_3$-coated LiNi$_{0.6}$Co$_{0.2}$Mn$_{0.2}$O$_2$ and its high-voltage cycling performance", Electrochimica Acta, vol. 300, Jan. 18, 2019, pp. 36-44.
Zhang et al., "Surface nitridation of Li-rich layered Li(Li$_{0.17}$Ni$_{0.25}$Mn$_{0.58}$)O$_2$ oxide as cathode material for lithium-ion battery," J. Mater. Chem., 2012, 22, pp. 13104-13109.
Zhang et al., "Artificial Interface Deriving from Sacrificial Tris(trimethylsilyl)phosphate Additive for Lithium Rich Cathode Materials", Electrochimica Acta 117 (2014) 99-104.
Zhang et al., "Direct Visualization of the Interfacial Degradation of Cathode Coatings in Solid State Batteries: A Combined Experimental and Computational Study", Adv. Energy Mater. 2020, 1903778 (9 pages); DOI: 10.1002/aenm.201903779.
Zhang, Shengmao et al., "Self-Assembled Hollow Spheres of l3-Ni(OH)$_2$ and Their Derived Nanomaterials," Chem. Mater., 2009, 21, pp. 871-883.
Zhao et al., "Robust and sulfur-containing ingredient surface film to improve the electrochemical performance of LiDFOB-based high-voltage electrolyte", Electrochimica Ada 260 (2018) 536-548.
Zhao, Yujuan et al., "Enhanced Electrochemical Performance of Li[Li$_{0.2}$Ni$_{0.2}$Mn$_{0.6}$]O$_2$ Modified by Manganese Oxide Coating for Lithium-Ion Batteries," Electrochemical and Solid-State Letters, 14 (1), 2011, pp. A1-A5.
Zheng et al., "Interface modifications by anion receptors for high energy lithium ion batteries", Journal of Power Sources 250 (2014) 313-318.

(56) References Cited

OTHER PUBLICATIONS

Zhou, Fu et al., "Advantages of Simultaneous Substitution of Co in Li[Ni$_{1/3}$Mn$_{1/3}$Co$_{1/3}$]O$_2$ by Ni and Al," Electrochemical and Solid-State Letters, 12 (4), 2009, pp. A81-A83.
Zhou, Fu et al., "Coprecipitation Synthesis of Ni$_x$Mm1-x(OH)$_2$ Mixed Hydroxides," Chem. Mater., vol. 22, No. 3, 2010, pp. 1015-1021.
Zhou, Fu et al., "Solid-State Synthesis as a Method for the Substitution of Al for Co in LiNi$_{1/3}$Mn$_{1/3}$Co$_{(1/3-z)}$Al$_z$O$_2$," Journal of The Electrochemical Society, 156 (10), 2009, pp. A796-A801.
Zhou, Fu et al., "The effect of Al substitution on the reactivity of delithiated LiNi$_{1/3}$Mn$_{1/3}$Co$_{(1/3-z)}$Al$_z$O$_2$ with non-aqueous electrolyte," Electrochemistry Communications 10 (2008), pp. 1168-1171.
Zhou, Hongming et al., "Enhanced performance of the electrolytes based on sulfolane and lithium difluoro(oxalate)borate with enhanced interfacial stability for Li Ni$_{0.5}$Mn$_{1.5}$O$_4$ cathode", Journal of Electroanalytical Chemistry, vol. 808, 2018, pp. 293-302; DOI: 10.1016/J.JELECHEM.2017.12.040.
Zhu, Ye et al., "Positive Electrode Passivation by LiDFOB Electrolyte Additive in High-Capacity Lithium-Ion Cells," Journal of The Electrochemical Society, 159 (12), 2012, pp. A2109-A2117.
Communication pursuant to Article 94(3) EPC for EP application No. 22851184.6 dated Jan. 25, 2024; 9 pages.
N.N.: "Wikipedia—Crystal strcuture", 2024, XP093120949, URL: https://en.wikipedia.org/wiki/Crystal structure.

\* cited by examiner

CATHODE MATERIALS HAVING OXIDE SURFACE SPECIES

CROSS-REFERENCE TO RELATED APPLICATIONS

This application is a continuation of International Patent Application No. PCT/US2022/053080 filed Dec. 15, 2022, which claims the benefit of, and priority to, U.S. Provisional Application No. 63/291,209, filed Dec. 17, 2021, and U.S. Provisional Application No. 63/299,732, filed Jan. 14, 2022. Both These applications are incorporated by reference in their entirety for all purposes.

FIELD

The present disclosure concerns chemical oxides for coated cathode active materials, which are useful in cathodes (i.e., positive electrodes) of rechargeable lithium-batteries for reversibly storing lithium ions ($Li^+$).

BACKGROUND

There is currently an unmet need in the rechargeable lithium battery field directed to cathode active materials which are stable at high voltage (e.g., 4.2 V versus lithium metal) and/or high temperature (e.g., 60° C.). The instability tends to result in increases in internal resistance in the battery, when the battery is stored or when the battery is used, or both.

Solid electrolyte materials tend not to be stable at high voltage or high temperature. Solid electrolyte materials may react with cathode active materials. Cathode active materials may also oxidize when exposed to high voltage or high temperature. These are a few of the reasons for battery performance degradation. Some researchers have tried to coat cathode active materials with $LiNbO_3$, $Li_2ZrO_3$, and $LiTaO_3$ to prevent this oxidative. See for example, US 2016/0156021 A1; US 2019/0044146 A1; and U.S. Pat. No. 9,692,041 B2. See also Chem. Mater. 2018, 30, 22, 8190-8200, (doi.org/10.1021/acs.chemmater.8b03321); *Adv. Energy Mater.* 2020, 10, 1903778 (doi.org/10.1002/aenm.201903778); and *Journal of Power Sources* Volume 248, 15 Feb. 2014, Pages 943-950, (doi.org/10.1016/j.jpowsour.2013.10.005). However, these previously reported coatings had poor stability and/or suffered from other disadvantages. For example, at potentials as high as 4.2V (vs $Li/Li^+$), the internal resistance of these coatings increased rapidly when in a charged state. For these and other reasons, these previously reported coatings were inferior in several regards.

Set forth herein are solutions to this and other problems in the relevant field.

SUMMARY

Set forth herein is a composition comprising: a cathode active material; and at least one oxide bonded to the cathode active material; wherein the at least one oxide bonded to the cathode active material comprises lithium (Li), oxygen (O), and, optionally zirconium (Zr) and phosphorus (P); wherein the molar ratios of Li, Zr, P, and O are represented by the formula $Li_xZr_yP_aO_d$, wherein $0.05 \leq x \leq 7.0$, $0 \leq y \leq 3.0$, $0 \leq a \leq 6.0$; and $2.0 \leq d \leq 20.0$; and wherein subscripts x, y, a, and d are selected so the at least one oxide is charge neutral.

In one embodiment, the composition comprises a cathode active material; and at least one oxide bonded to the cathode active material; wherein the at least one oxide bonded to the cathode active material comprises lithium (Li), oxygen (O), and at least one of zirconium (Zr) and phosphorus (P); wherein the molar ratios of Li, Zr, P, and O are represented by the formula $Li_xZr_yP_aO_d$, wherein $0.05 \leq x \leq 25.0$, $0 \leq y \leq 5.0$, $0 \leq a \leq 16.0$; and $2.0 \leq d \leq 55.0$; and wherein subscripts x, y, a, and d are selected so the at least one oxide is charge neutral and y and a are not both zero. In a further embodiment, the composition has a ratio of Zr:Ni, as measured by x-ray photoelectron spectroscopy (XPS) of 0.3 to 3.2. In one embodiment, the molar ratios of Li, Zr, P, and O are represented by the formula $Li_xZr_yP_aO_d$, wherein $0.05 \leq x \leq 7.0$, $0 \leq y \leq 3.0$, $0 \leq a \leq 6.0$; and $2.0 \leq d \leq 20.0$; and, wherein subscripts x, y, a, and d are selected so the at least one oxide is charge neutral and y and a are not both zero and the composition has a ratio of Zr:Ni, as measured by x-ray photoelectron spectroscopy (XPS) of 0.3 to 3.2.

Set forth herein is a composition comprising: a cathode active material; and an oxide bonded to the cathode active material, wherein: the oxide comprises a compound of the formula $Li_xZr_yP_aO_d$, wherein $0.05 \leq x \leq 8.0$, $0 \leq y \leq 3.0$, $0 \leq a \leq 6.0$; and $2.0 \leq d \leq 20.0$ and wherein the formula is charge neutral. In one embodiment, the oxide comprises a compound of the formula $Li_xZr_yP_aO_d$, wherein $0.05 \leq x \leq 1.5$, $1.0 \leq y \leq 3.0$, $1.0 \leq a \leq 6.0$; and $2.0 \leq d \leq 20.0$ and wherein the formula is charge neutral. In one embodiment, the oxide comprises a compound of the formula $Li_xZr_yP_aO_d$, wherein $20.0 \leq x \leq 25.0$, $2.0 \leq y \leq 5.0$, $10.0 \leq a \leq 16.0$; and $50.0 \leq d \leq 55.0$ and wherein the formula is charge neutral. In one embodiment, the oxide is amorphous based on x-ray diffraction pattern analysis. In one embodiment, the oxide comprises crystalline domains based on transmission electron microscopy (TEM) analysis. In certain embodiments, the oxide is selected from $LiZr_2(PO_4)_3$, $Li_3PO_4$, $Li_2ZrO_3$, $Li_3ZrPO_6$, $Li_5PZrO_7$, $Li_7ZrPO_8$, and combinations thereof. In other embodiments, the oxide is selected from $LiZr_2(PO_4)_3$, $Li_3PO_4$, $Li_2ZrO_3$, $Li_3ZrPO_6$, $Li_5PZrO_7$, $Li_7ZrPO_8$, $Li_{24}Zr_3P_{14}O_{53}$ and combinations thereof. In one embodiment, the oxide is selected from $LiZr_2(PO_4)_3$. In one embodiment, the oxide bonded to the cathode active material is a coating on the cathode active material.

Set forth herein is a composition comprising: a cathode active material; and an oxide bonded to the cathode active material, wherein: the oxide comprises $LiZr_2(PO_4)_3$ and wherein the cathode active material comprises less than about 10 weight % of lithium, less than about 1.0 weight % of zirconium, less than about 0.5 weight % of phosphorus, and about 60 weight % of manganese, cobalt, and nickel combined as measured by inductively coupled plasma (ICP); and wherein the atomic percent ratio of Zr:Ni is about 0.55 as measured by X-ray photoelectron spectroscopy (XPS). Also set forth herein is a composition comprising: a cathode active material; and an oxide bonded to the cathode active material, wherein: the oxide comprises LiZr2(PO4)3 and wherein the atomic percent ratio of Zr:Ni is about 0.75 as measured by X-ray photoelectron spectroscopy (XPS).

Also set forth herein is a composition comprising: a cathode active material having a surface and an oxide on the surface wherein the oxide is selected from the group consisting of amorphous lithium zirconium oxide; amorphous lithium zirconium phosphorus oxide; and combinations thereof; wherein the composition has a ratio of Zr:Ni, as measured by x-ray photoelectron spectroscopy (XPS) of 0.3 to 3.2. In one embodiment, the composition comprises a cathode active material having a surface and an oxide on the surface wherein the oxide is selected from the group consisting of $LiZr_2(PO_4)_3$, $Li_2ZrO_3$, $Li_3ZrPO_6$, $Li_5PZrO_7$, $Li_7ZrPO_8$, $Li_{24}Zr_3P_{14}O_{53}$, and combinations thereof; wherein the composition has a ratio of Zr:Ni, as measured by x-ray photoelectron spectroscopy (XPS) of 0.3 to 3.2.

Set forth herein is an oxide having the following formula, $Li_xZr_yP_aO_d$, wherein $0.05 \leq x \leq 25.0$, $0 \leq y \leq 5.0$, $0 \leq a \leq 16.0$; and $2.0 \leq d \leq 55.0$ and wherein the formula is charge neutral, and wherein the compound is bonded to cathode active material selected from $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, $x+y+z=1$, $0 \leq x \leq 1$, $0 \leq y \leq 1$, and $0 \leq z \leq 1$; and $LiNi_xCo_yAl_zO_2$, wherein $x+y+z=1$, and $0 \leq x \leq 1$, $0 \leq y \leq 1$, and $0 \leq z \leq 1$. In one embodiment, the oxide has the following formula, $Li_xZr_yP_aO_d$, wherein $0.05 \leq x \leq 8.0$, $0 \leq y \leq 3.0$, $0 \leq a \leq 6.0$; and $2.0 \leq d \leq 20.0$ and the formula is charge neutral, and the compound is bonded to cathode active material selected from $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, $x+y+z=1$, $0 \leq x \leq 1$, $0 \leq y \leq 1$, and $0 \leq z \leq 1$; and $LiNi_xCo_yAl_zO_2$, wherein $x+y+z=1$, and $0 \leq x \leq 1$, $0 \leq y \leq 1$, and $0 \leq z \leq 1$. In certain embodiments, the cathode active material is selected from lithium cobalt oxide (LCO), lithium nickel cobalt aluminum oxide (NCA), lithium nickel manganese cobalt oxide (NMC), lithium iron phosphate (LFP), and combinations thereof. In one embodiment, the cathode active material is lithium nickel manganese cobalt oxide (NMC). In alternative embodiments, the cathode active material is a member selected from the NMC class of cathode active materials; LFP class of cathode active materials; LNMO class of cathode active materials; NCA class of cathode active materials; LMO class of cathode active materials; and, LCO class of cathode active materials.

Set forth herein is also a solid-state battery comprising 1) cathode active material selected from $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, $x+y+z=1$, $0 \leq x \leq 1$, $0 \leq y \leq 1$, and $0 \leq z \leq 1$; and $LiNi_xCo_yAl_zO_2$, wherein $x+y+z=1$, and $0 \leq x \leq 1$, $0 \leq y \leq 1$, and $0 \leq z \leq 1$; 2) an oxide bonded to the cathode active material, wherein: the oxide comprises a compound of the formula $Li_xZr_yP_aO_d$, wherein $0.05 \leq x \leq 25.0$, $0 \leq y \leq 5.0$, $0 \leq a \leq 16.0$; and $2.0 \leq d \leq 55.0$ and wherein the formula is charge neutral; 3) a solid-state electrolyte; and, 4) an anode active material selected from lithium metal, lithium titanate ($Li_2TiO_3$, LTO), carbon/graphite (C), silicon (Si)/silicon oxide ($SiO_x$), lithium (Li), zinc (Zn), aluminum (Al), magnesium (Mg), alloys thereof, and combinations thereof.

In one embodiment, the solid-state battery comprises 1) cathode active material selected from $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, $x+y+z=1$, $0 \leq x \leq 1$, $0 \leq y \leq 1$, and $0 \leq z \leq 1$; and $LiNi_xCo_yAl_zO_2$, wherein $x+y+z=1$, and $0 \leq x \leq 1$, $0 \leq y \leq 1$, and $0 \leq z \leq 1$; 2) an oxide bonded to the cathode active material, wherein: the oxide comprises a compound of the formula $Li_xZr_yP_aO_d$, wherein $0.05 \leq x \leq 7.0$, $0 \leq y \leq 3.0$, $0 \leq a \leq 6.0$; and $2.0 \leq d \leq 20.0$ and wherein the formula is charge neutral; 3) a solid-state electrolyte; and, 4) an anode active material selected from lithium metal, lithium titanate ($Li_2TiO_3$, LTO), carbon/graphite (C), silicon (Si)/silicon oxide ($SiO_x$), lithium (Li), zinc (Zn), aluminum (Al), magnesium (Mg), alloys thereof, and combinations thereof.

Also set forth herein is a process for making a coated cathode active material wherein an oxide comprising a compound of the formula $Li_xZr_yP_aO_d$ is bonded to the cathode active material, wherein $0.05 \leq x \leq 25.0$, $0 \leq y \leq 5.0$, $0 \leq a \leq 16.0$; and $2.0 \leq d \leq 55.0$ and wherein the formula is charge neutral; comprising the following steps: 1) coating a cathode active material with a solution of a) LiOH and b) a zirconium precursor and/or a phosphorus precursor; 2) removing the solvent from the solution to provide a cathode active material bonded to the oxide of formula $Li_xZr_yP_aO_d$; and, 3) heating the cathode active material under dry air conditions to form a coated cathode active material. In one embodiment, the zirconium precursor is $Zr(OBu)_4$. In one embodiment, the phosphorus precursor is $P_2O_5$. In one embodiment, the process for making a coated cathode active material wherein an oxide comprises a compound of the formula $Li_xZr_yP_aO_d$ bonded to the cathode active material, wherein $0.05 \leq x \leq 8.0$, $0 \leq y \leq 3.0$, $0 \leq a \leq 6.0$; and $2.0 \leq d \leq 0.0$ and wherein the formula is charge neutral; comprises the following steps: 1) coating a cathode active material with a solution of a) LiOH and b) a zirconium precursor and/or a phosphorus precursor; 2) removing the solvent from the solution to provide a cathode active material bonded to the oxide of formula $Li_xZr_yP_aO_d$; and, 3) heating the cathode active material under dry air conditions to form a coated cathode active material. In one embodiment, the zirconium precursor is $Zr(OBu)_4$. In one embodiment, the phosphorus precursor is $P_2O_5$.

DETAILED DESCRIPTION

Figure 1:
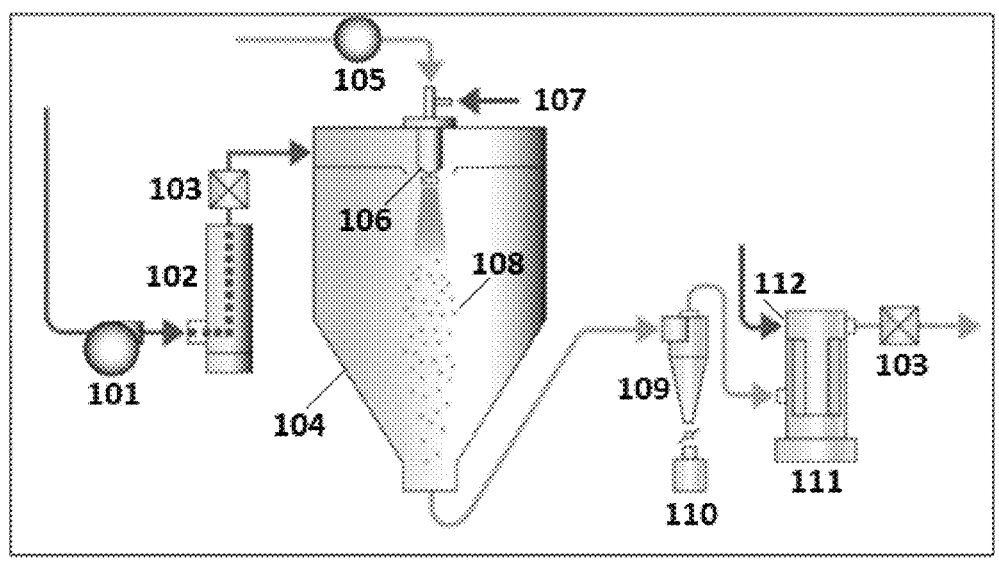
FIG. 1 is a schematic of the spray coating process, one non-limiting method for producing the coated active materials described herein.

Set forth herein are oxides for cathode active materials wherein the oxide comprises a compound of the formula $Li_xZr_yP_aO_d$, wherein $0.05 \leq x \leq 8.0$, $0 \leq y \leq 3.0$, $0 \leq a \leq 6.0$; and $2.0 \leq d \leq 20.0$ and wherein the formula is charge neutral. Also set forth herein are oxides for cathode active materials wherein the oxide comprises a compound of the formula $Li_xZr_yP_aO_d$, wherein $0.05 \leq x \leq 25.0$, $0 \leq y \leq 5.0$, $0 \leq a \leq 16.0$; and $2.0 \leq d \leq 55.0$ and wherein the formula is charge neutral. In certain embodiments, the oxide is selected from $LiZr_2(PO_4)_3$, $Li_3ZrPO_6$, $Li_5PZrO_7$, and $Li_7ZrPO_8$. In certain embodiments, the oxide is $Li_3PO_4$ or $Li_2ZrO_3$. In one embodiment, the oxide is $LiZr_2(PO_4)_3$. In an alternative embodiment, the oxide is $Li_{24}Zr_3P_{14}O_{53}$. In certain embodiments, including any of the foregoing, the oxide is a coating on the cathode active material.

In one embodiment, the coating is a discontinuous layer. In one embodiment, the coating is a continuous layer. In one embodiment, the coating comprises crystalline domains as determined by TEM analysis. In one embodiment, the coating comprises amorphous domains as determined by TEM analysis. In one embodiment, the coating comprises crystalline domains and amorphous domains as determined by TEM analysis.

Certain of these oxides and coatings may prevent, or delay, the aforementioned oxidation reactions which were noted as a reason for battery performance degradation. When used in batteries, the newly disclosed coated cathode active materials set forth herein result in more stable batteries.

DEFINITIONS

As used herein, the term "about," when qualifying a number, e.g., about 15% w/w, refers to the number qualified and optionally the numbers included in a range about that qualified number that includes±10% of the number. For example, about 15% w/w includes 15% w/w as well as 13.5% w/w, 14% w/w, 14.5% w/w, 15.5% w/w, 16% w/w, or 16.5% w/w. For example, "about 75° C." includes 75° C. as well 68° C., 69° C., 70° C., 71° C., 72° C., 73° C., 74° C., 75° C., 76° C., 77° C., 78° C., 79° C., 80° C., 81° C., 82° C., or 83° C.

As used herein, "selected from the group consisting of" refers to a single member from the group, more than one member from the group, or a combination of members from the group. A member selected from the group consisting of A, B, and C includes, for example, A only, B only, or C only, as well as A and B, A and C, B and C, as well as A, B, and C.

As used herein the phrase "dry air," refers to air with a reduced amount of humidity. Dry air may be supplied in a clean room. Dry air is characterized as having a dew point less than −70° C.

As used herein the phrase "cathode active material," refers to a material which can intercalate lithium ions or react with lithium ions in a reversible manner. Examples include $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, x+y+z=1, 0≤x≤1, 0≤y≤1, and 0≤z≤1; and $LiNi_xCo_yAl_zO_2$, wherein x+y+z=1, 0≤x≤1, 0≤y≤1, and 0≤z≤1. In these formula, x, y, and z are chosen so that the formula is charge neutral. Additional examples include a cathode active material selected from a member of the NMC class of cathode active materials (including, but not limited to, $LiNiCoMnO_2$); the LFP class of cathode active materials (including, but not limited to, $LiFePO_4/C$); the LNMO class of cathode active materials (including, but not limited to, $LiNi_{0.5}Mn_{1.5}O_4$); the NCA class of cathode active materials (inlcuding, but not limited to, $LiMn_2O_4$ and $LiMn_2O_2$); the LMO class of cathode active materials (including, but not limited to, $LiMn_2O_4$); the LCO class of cathode active materials (including, but not limited to, $LiCoO_2$), or any cathode active material described in Minnmann et al. *Advanced Energy Materials*, 2022, 12, 2201425).

As used herein the phrase "characterized as having an x-ray powder diffraction (XRD) pattern having peaks at least at," means that when the material is analyzed using x-ray powder diffraction, according to the techniques in the Examples, the sample will be observed to have at least the recited XRD peaks and possibly other peaks. Peaks are places of high intensity in the XRD pattern which are indicative of d-spacing (lattice spacing) of the crystalline unit cell which is inducing the observed XRD pattern when x-rays are incident upon the material being analyzed by XRD.

As used herein the phrase "as measured by inductively coupled plasma (ICP) analysis" means that when the material is analyzed using ICP, according to the techniques in the Examples, the material will be observed to comprise the weight % of the recited element.

As used herein the phrase "as determined by XPS" means that when the material is analyzed by XPS as a loose powder, or X-ray photoelectron spectroscopy, according to the techniques in the Examples, the material will be observed to have the atomic percent ratio of element to element or functional group to functional group on the surface of the sample.

As used herein the phrase "solid-state cathode refers to a cathode which does not include any liquid-phase electrolytes. As used herein, the terms "cathode" and "anode" refer to the electrodes of a battery. The cathode and anode are often referred to in the relevant field as the positive electrode and negative electrode, respectively. During a charge cycle in a Li-secondary battery, Li ions leave the cathode and move through an electrolyte, to the anode. During a charge cycle, electrons leave the cathode and move through an external circuit to the anode. During a discharge cycle in a Li-secondary battery, Li ions migrate towards the cathode through an electrolyte and from the anode. During a discharge cycle, electrons leave the anode and move through an external circuit to the cathode. As used herein, the phrase "positive electrode" refers to the electrode in a secondary battery towards which positive ions, e.g., $Li^+$, conduct, flow or move during discharge of the battery. As used herein, the phrase "negative electrode" refers to the electrode in a secondary battery from where positive ions, e.g., $Li^+$, flow or move during discharge of the battery. In a battery comprised of a Li-metal electrode and a conversion chemistry, intercalation chemistry, or combination conversion/intercalation chemistry-including electrode (i.e., cathode active material; e.g., $NiF_x$, NCA, $LiNi_xMn_yCo_zO_2$ [NMC] or $LiNi_xAl_yCo_zO_2$ [NCA], wherein x+y+z=1), the electrode having the conversion chemistry, intercalation chemistry, or combination conversion/intercalation chemistry material is referred to as the positive electrode. In some usages, cathode is used in place of positive electrode, and anode is used in place of negative electrode. When a Li-secondary battery is charged, Li ions move from the positive electrode (e.g., $NiF_x$, NMC, NCA) towards the negative electrode (e.g., Li-metal). When a Li-secondary battery is discharged, Li ions move towards the positive electrode and from the negative electrode.

As used herein the phrase "solid separator" refers to a $Li^+$ ion-conducting material that is substantially insulating to electrons (e.g., the lithium ion conductivity is at least $10^3$ times, and often $10^6$ times, greater than the electron conductivity), and which acts as a physical barrier or spacer between the positive and negative electrodes in an electrochemical cell.

As used herein, the term "LPSI" refers to a lithium conducting electrolyte comprising Li, P, S, and I. More generally, it is understood to include $_aLi_2S+_bP_2S_y+_cLiX$ where X=Cl, Br, and/or I and where y=3-5 and where a/b=2.5-4.5 and where (a+b)/c=0.5-15.

As used herein, "LSTPS" refers to a material characterized by the formula $Li_aMP_bS_c$, where M is Si, Ge, Sn, and/or Al, and where 2≤a≤8, 0.5≤b≤2.5, 4≤c≤12. "LSPS" refers to an electrolyte material characterized by the formula $L_aSiP_bS_c$, where 2≤a≤8, 0.5≤b≤2.5, 4≤c≤12. LSPS refers to an electrolyte material characterized by the formula $L_aSiP_bS_c$, wherein, where 2≤a≤8, 0.5≤b≤2.5, 4 ≤c≤12, d≤3. Exemplary LSTPS materials are found, for example, in International Patent Application No. PCT/US14/38283, SOLID STATE CATHOLYTE OR ELECTROLYTE FOR BATTERY USING $Li_4MP_bS_C$ (M=SI, GE, AND/OR SN), filed May 15, 2014, and published as WO 2014/186634, on Nov. 20, 2014, which is incorporated by reference herein in its entirety. Exemplary LSTPS materials are found, for example, in U.S. patent application Ser. No. 14/618,979, filed Feb. 10, 2015, and published as Patent Application Publication No. 2015/0171465, on Jun. 18, 2015, which is incorporated by reference herein in its entirety. When M is Sn and Si—both are present. As used herein, "LSTPSO" refers to LSTPS that is doped with, or has, O present. In one embodiment, "LSTPSO" is a LSTPS material with an oxygen content between 0.01 and 10 atomic %. "LSPS" refers to an electrolyte material having Li, Si, P, and S chemical constituents. As used herein "LSTPS" refers to an electrolyte material having Li, Si, P, Sn, and S chemical constituents. As used herein, "LSPSO" refers to LSPS that is doped with, or has, O present. In one embodiment, "LSPSO" is a LSPS material with an oxygen content between 0.01 and 10 atomic %. As used herein, "LATP," refers to an electrolyte material having Li, As, Sn, and P chemical constituents. As used herein "LAGP" refers to an electrolyte material having Li, As, Ge, and P chemical constituents. As used herein, "LSTPSO" refers to a catholyte material characterized by the formula $Li_aMP_bS_cO_d$, where M is Si, Ge, Sn, and/or Al, and where 2≤a ≤8, 0.5≤b≤2.5, 4≤c≤12, d≤3. LSTPSO refers to LSTPS, as defined above, and having oxygen doping at from 0.1 to about 10 atomic %. LPSO refers to LPS, as defined above, and having oxygen doping at from 0.1 to about 10 atomic %.

As used herein, "LTS" refers to a lithium tin sulfide compound which can be described as $Li_2S$—$SnS_2$, $Li_2S$—SnS, Li—S—Sn, and/or a catholyte consisting essentially of Li, S, and Sn. The composition may be $Li_xSn_yS_z$ where 0.25≤x≤0.65, 0.05≤y≤0.2, and 0.25≤z≤0.65. In certain embodiments, LTS is a mixture of $Li_2S$ and $SnS_2$ in the ratio of 80:20, 75:25, 70:30, 2:1, or 1:1 molar ratio. LTS may include up to 10 atomic % oxygen. LTS may be doped with Bi, Sb, As, P, B, Al, Ge, Ga, and/or In. As used herein, "LATS" refers to LTS, as used above, and further comprising Arsenic (As).

As used herein the phrase "annealing," refers heating a material, e.g., from 100° C. to 400° C., or e.g., 100° C., 150° C., 200° C., 250° C., 300° C., or 350° C. in a controlled and reducing atmosphere, e.g., dry air.

As used herein the phrase "stable at high voltage," refers to a material (e.g., a coated cathode active material) which does not react at high voltage (4.2 V or higher versus Li metal) in a way that materially or significantly degrades the ionic conductivity or resistance of the material when held at high voltage for at least three days. Herein, a material or significant degradation in ionic conductivity or resistance is a reduction in ionic conductivity, or an increase in resistance, by an order of magnitude or more. As used herein, the term "high voltage" means at least 4.2 V versus lithium metal (i.e., v. Li). High voltage may also refer to higher voltage, e.g., 4.3, 4.4, 4.5, 4.6, 4.7, 4.8. 4.9, 5.0 V or higher.

As used herein, high voltage means 4.2 V or larger versus a lithium metal reference electrode (which is at 0 V) unless specified to the contrary.

As used herein the phrase "stable at high temperature," refers to a material (e.g., a coated cathode active material) which does not react at high temperature (60° C. or higher) in a way that materially or significantly degrades the ionic conductivity or resistance of the material when held at high temperature for at least three days.

As used herein, area-specific resistance (ASR) is measured by electrochemical cycling using an Arbin or Biologic instrument unless otherwise specified to the contrary.

As used herein, ionic conductivity is measured by electrical impedance spectroscopy methods known in the art.

As used herein, the term "LZO" refers to $Li_2ZrO_3$, $ZrO_2$, or a combination thereof. LZO may be crystalline, amorphous, or a combination thereof. For example, LZO may include crystalline $ZrO_2$ and amorphous $Li_2ZrO_3$. For example, LZO may include $ZrO_2$. For example, LZO may include $Li_2ZrO_3$.

DETAILED DESCRIPTION

In one embodiment, set forth herein is a composition comprising: a cathode active material; and an oxide bonded to the cathode active material, wherein: the oxide comprises a compound of the formula $Li_xZr_yP_aO_d$, wherein 0.05≤x≤8.0, 0≤y≤3.0, 0≤a≤6.0; and 2.0≤d≤20.0; and, wherein the formula is charge neutral. In an alternative embodiment, the oxide comprises a compound of the formula $Li_xZr_yP_aO_d$, wherein 0.05≤x≤8.0, 0≤y≤3.0, 0≤a≤6.0; and 2.0≤d≤20.0; wherein y and a are not both zero and wherein the formula is charge neutral. In an alternative embodiment, the oxide comprises a compound of the formula $Li_xZr_yP_aO_d$, wherein 0.05≤x≤25.0, 0≤y≤5.0, 0≤a≤16.0; and 2.0≤d≤55.0; wherein y and a are not both zero and wherein the formula is charge neutral. In an alternative embodiment, the oxide comprises a compound of the formula $Li_xZr_yP_aO_d$, wherein 20.0≤x≤25.0, 2.0≤y≤5.0, 10.0≤a≤16.0; and 50.0≤d≤55.0 and wherein the formula is charge neutral. In a further embodiment, including any of the foregoing, the composition has a ratio of Zr:Ni, as measured by x-ray photoelectron spectroscopy (XPS) of 0.3 to 3.2.

In an alternative embodiment, set forth herein is a composition comprising: a cathode active material having a surface and an oxide on the surface; wherein the oxide is selected from the group consisting of: amorphous lithium zirconium oxide, amorphous lithium zirconium phosphorus oxide, and combinations thereof; wherein the composition has a ratio of Zr:Ni, as measured by x-ray photoelectron spectroscopy (XPS) of 0.3 to 3.2.

In an alternative embodiment, the composition comprises a cathode active material having a surface and an oxide on the surface; wherein the oxide is selected from the group consisting of: LiZr2(PO4)3, Li2ZrO3, Li3ZrPO6, Li5PZrO7, Li7ZrPO8, Li24Zr3P14O53, and combinations thereof; wherein the composition has a ratio of Zr:Ni, as measured by x-ray photoelectron spectroscopy (XPS) of 0.3 to 3.2. In one embodiment, the oxide is lattice matched with the cathode active material. In one embodiment, the oxide has a surface that is crystalline. In one embodiment, the oxide has a surface that is amorphous. In one embodiment, the composition has an interface substantially as shown in any one of FIGS. 2-6. In one embodiment, the oxide is a coating that is continuous. In one embodiment, the oxide is coating that is discontinuous.

Herein oxide refers to a material bonded to the cathode active material, and not the cathode active material itself, even when the cathode active material is an oxide, unless specified otherwise explicitly to the contrary herein. For example, NMC is an oxide. However, set forth herein are other oxides which bond to the NMC oxide. These other oxides, which are different from the oxide which is the cathode active material, are described above and below.

In one embodiment, the oxide comprises a compound of the formula $Li_xZr_yP_aO_d$, wherein $0.05 \leq x \leq 1.5$, $1.0 \leq y \leq 3.0$, $1.0 \leq a \leq 6.0$, and $2.0 \leq d \leq 20.0$ and wherein the formula is charge neutral.

In one embodiment, the oxide comprises a compound of the formula $Li_xZr_yP_aO_d$, wherein $0.5 \leq x \leq 7.0$, $1.0 \leq y \leq 3.0$, $1.0 \leq a \leq 4.0$, and $5.0 \leq d \leq 14.0$ and wherein the formula is charge neutral. In one embodiment, the oxide comprises a compound of the formula $Li_xZr_yP_aO_d$, wherein $0.5 \leq x \leq 7.0$, y is 1.0, a is 1.0, and $6.0 \leq d \leq 14.0$ and wherein the formula is charge neutral.

In certain embodiments, including any of the foregoing, the oxide comprises a compound of the formula $Li_xZr_yP_aO_d$ wherein x is selected from 1.0, 2.0, 3.0, 5.0, and 7.0. In certain embodiments, including any of the foregoing, the oxide comprises a compound of the formula $Li_xZr_yP_aO_d$ wherein y is selected from 0, 1.0, and 2.0. In certain embodiments, including any of the foregoing, the oxide comprises a compound of the formula $Li_xZr_yP_aO_d$ wherein a is selected from 0, 1.0, and 3.0. In certain embodiments, including any of the foregoing, the oxide comprises a compound of the formula $Li_xZr_yP_aO_d$ wherein x is selected from 3.0, 4.0, 6.0, 7.0, 8.0, and 12.0. In an alternative embodiment, including any of the foregoing, the oxide comprises a compound of the formula $Li_xZr_yP_aO_d$ wherein x is 24.0.

In one embodiment, the oxide comprises a compound of the formula $Li_xZr_yP_aO_d$, wherein $0.5 \leq x \leq 2.0$, $0 \leq y \leq 3.0$, $1.0 \leq a \leq 4.0$, and $10.0 \leq d \leq 13.0$ and wherein the formula is charge neutral. In one embodiment, the oxide comprises a compound of the formula $Li_xZr_yP_aO_d$, wherein $1.0 \leq x \leq 2.0$, $1.0 \leq y \leq 3.0$, $2.0 \leq a \leq 4.0$, and $11.0 \leq d \leq 13.0$ and wherein the formula is charge neutral. In one embodiment, the oxide comprises a compound of the formula $Li_xZr_yP_aO_d$, wherein $0.05 \leq x \leq 1.5$, $1 \leq y \leq 3$, $2.0 \leq a \leq 4.0$; and $10.0 \leq d \leq 14.0$ and wherein the formula is charge neutral.

In one embodiment, the oxide comprises a compound of the formula $Li_xZr_yP_aO_d$, wherein $1.0 \leq x \leq 4.0$, $0 \leq y \leq 2.0$, $1.0 \leq a \leq 3.0$, and $4.0 \leq d \leq 7.0$ and wherein the formula is charge neutral.

In one embodiment, the oxide comprises a compound of the formula $Li_xZr_yP_aO_d$, wherein $1.0 \leq x \leq 3.0$, $0 \leq y \leq 2.0$, $0 \leq a \leq 2.0$, and $5.0 \leq d \leq 8.0$ and wherein the formula is charge neutral.

In one embodiment, the oxide comprises a compound of the formula $Li_xZr_yP_aO_d$, wherein $5.0 \leq x \leq 8.0$, $0 \leq y \leq 2.0$, $0 \leq a \leq 2.0$, and $6.0 \leq d \leq 9.0$ and wherein the formula is charge neutral.

In one embodiment, the oxide comprises a compound of the formula $Li_xZr_yP_aO_d$, wherein $0.05 \leq x \leq 25.0$, $0 \leq y \leq 5.0$, $0 \leq a \leq 16.0$; and $2.0 \leq d \leq 55.0$ and wherein the formula is charge neutral. In one embodiment, the oxide comprises a compound of the formula $Li_xZr_yP_aO_d$, wherein $20.0 \leq x \leq 25.0$, $2.0 \leq y \leq 5.0$, $10.0 \leq a \leq 16.0$; and $50.0 \leq d \leq 55.0$ and wherein the formula is charge neutral.

In one embodiment, the oxide comprises a compound of the formula $Li_xZr_yO_d$, wherein $1.0 \leq x \leq 3$, $0 \leq y \leq 2$, and $2.0 \leq d \leq 5.0$ and wherein the formula is charge neutral.

In one embodiment, the oxide comprises a compound of the formula $Li_xP_aO_d$, wherein $2.0 \leq x \leq 4$, $0 \leq a \leq 2.0$, and $2.0 \leq d \leq 5.0$ and wherein the formula is charge neutral.

In some embodiments, including any of the foregoing, the oxide comprises a chemical formula selected from $LiZr_2(PO_4)_3$, $Li_3ZrPO_6$, $Li_5PZrO_7$, $Li_7ZrPO_8$, $Li_3PO_4$, and $LizZrO_3$.

In an alternative embodiment, including any of the foregoing, the oxide comprises a chemical formula selected from $LiZr_2(PO_4)_3$, $Li_3ZrPO_6$, $Li_5PZrO_7$, $Li_7ZrPO_8$, $Li_3PO_4$, $Li_2ZrO_3$, and $Li_{24}Zr_3P_{14}O_{53}$.

In one embodiment, the oxide comprises amorphous lithium zirconium oxide, amorphous lithium zirconium phosphorus oxide, or a combination thereof.

In one embodiment, the oxide comprises $LiZr_2(PO_4)_3$.
In one embodiment, the oxide comprises $Li_3ZrPO_6$.
In one embodiment, the oxide comprises $Li_5PZrO_7$.
In one embodiment, the oxide comprises $Li_7ZrPO_8$.
In one embodiment, the oxide comprises $Li_3PO_4$.
In one embodiment, the oxide comprises $Li_2ZrO$.

In an alternative embodiment, the oxide comprises $Li_{24}Zr_3Pi_4O_{53}$.

When the oxides are described as comprising a compound of a formula, the ratio of Li, Zr, and P is the nominal ratio based on the ratio of the precursors used to make the oxide. The ratio of Li, Zr, and P is the ratio of the precursors as batched in the process of making the oxide, unless specified otherwise. For example, in some embodiments, the ratio is specified otherwise by stating that a composition is characterized by an atomic ratio that is determined by XPS. That XPS-determined atomic ratio is measured on the product and not as batched. In other embodiments, if a compound is characterized as the oxide $Li_3PO_4$, then the oxide was made, or could have been made, using precursors that had a ratio of Li:P:O of about 3:1:4 by mole as batched.

In certain embodiments, the oxide is a product of a reaction mixture of 1) LiOH and 2) a zirconium precursor and/or a phosphorus precursor. In certain embodiments, the molar ratio of Li:Zr is a ratio selected from about 1:3, about 1:2, about 1:1, about 2:1, about 3:1, about 4:1, about 5:1, about 6:1, about 7:1, about 8:1 about 9:1, and about 10:1. In one embodiment, the molar ratio of Li:Zr (i.e., LiOH:the zirconium precursor) is a ratio in the range of about 1:3 to 1:1. In one embodiment, the molar ratio of Li:Zr is a ratio in the range of about 1:1 to 3:1. In one embodiment, the molar ratio of Li:Zr is a ratio in the range of about 2:1 to 4:1. In one embodiment, the molar ratio of Li:Zr is a ratio in the range of about 1:4 to 1:6. In one embodiment, the molar ratio of Li:Zr is a ratio in the range of about 1:6 to 1:8. In certain embodiments, the molar ratio of Li:Zr is a ratio selected from about 1:2, about 2:1, about 3:1 about 1:5, about 1:7. In an alternative embodiment, the molar ratio of Li:Zr is in the range of about 24:5 to 25:2. In an alternative embodiment, the molar ratio of Li:Zr is about 24:3.

In certain embodiments, including any of the foregoing, the molar ratio of Li:P (i.e., LiOH:the phosphorus precursor) in the reaction mixture is a ratio selected from about 1:2, about 2:3, about 1:1, about 2:1, about 4:1, about 5:1, about 6:1, about 8:1, about 10:1, about 12:1, about 14:1, and 16:1. In one embodiment, including any of the foregoing, the molar ratio of Li:P is a ratio in the range of about 1:2 to 1:1. In one embodiment, including any of the foregoing, the molar ratio of Li:P is a ratio in the range of about 5:1 to 7:1. In one embodiment, including any of the foregoing, the molar ratio of Li:P is a ratio in the range of about 8:1 to 10:1. In one embodiment, including any of the foregoing, the molar ratio of Li:P is a ratio in the range of about 13:1 to 15:1. In certain embodiments, including any of the foregoing, the molar ratio of Li:P is a ratio selected from about 2:3, about 6:1, about 10:1 and about 14:1. In alternative embodiments, including any of the foregoing, the molar ratio of Li:P is a ratio between about 24:16 and 24:10. In alternative embodiments, including any of the foregoing, the molar ratio of Li:P is about 24:14.

In certain embodiments, including any of the foregoing, the molar ratio of the Zr:P in the reaction mixture is a ratio selected from about 1:2, about 1:1, about 1.3:1, about 1.5:1, about 1.8:1, about 2:1, about 3:1, and about 4:1. In one embodiment, including any of the foregoing, the molar ratio of Zr:P (i.e., zirconium precursor:the phosphorus precursor) is a ratio in the range of about 1:1 to 1.5:1. In one embodiment, including any of the foregoing, the molar ratio of Zr: P is a ratio in the range of about 1.1 to 3:1. In certain embodiments, including any of the foregoing, the molar ratio of Zr:P is a ratio selected from about 1.3:1 or about 2:1. In alternative embodiments, including any of the foregoing, the molar ratio of Zr:P is a ratio selected from about 3:20 to about 3:10. In alternative embodiments, including any of the foregoing, the molar ratio of Zr:P is a ratio of about 3:14.

In certain embodiments, including any of the foregoing, the starting molar ratio of LiOH:Zr:P is between about 20:50:30 to 25:40:35. In one embodiment, including any of the foregoing, the starting molar ratio of LiOH:Zr:P is between about 20:40:40 to 30:50:20. In one embodiment, including any of the foregoing, the starting molar ratio of LiOH:Zr:P is between about 20:40:40 to 25:45:30.

In certain embodiments, including any of the foregoing, the starting molar ratio of LiOH:Zr:P is between about 40:35:25 to 60:20:20. In one embodiment, including any of the foregoing, the starting molar ratio of LiOH:Zr:P is between about 50:25:25 to 50:35:15.

In one embodiment, including any of the foregoing, the starting molar ratio of LiOH:Zr:P is between about 80:15:5 to 65:25:10. In one embodiment, including any of the foregoing, the starting molar ratio of LiOH:Zr:P is between about 70:25:5 to 80:10:10.

In one embodiment, including any of the foregoing, the starting molar ratio of LiOH:Zr:P is between about 80:10:10 to 85:10:5. In one embodiment, including any of the foregoing, the starting molar ratio of LiOH:Zr:P is between about 80:10:10 to 82.5:12.5:5.

In certain embodiments, including any of the foregoing, the starting molar ratio of LiOH and Zr:P is between about 70:30 to 65:35. In one embodiment, including any of the foregoing, the starting molar ratio of LiOH and Zr:P is between about 60:40 to 80:20. In one embodiment, including any of the foregoing, the starting molar ratio of LiOH and Zr:P is between about 60:40 to 70:30.

In certain embodiments, including any of the foregoing, the starting molar ratio of LiOH and Zr:P is between about 75:25 to 80:20. In one embodiment, including any of the foregoing, the starting molar ratio of LiOH and Zr:P is between about 75:25 to 85:15.

In one embodiment, including any of the foregoing, the starting molar ratio of LiOH and Zr:P is between about 95:5 to 90:10. In one embodiment, including any of the foregoing, the starting molar ratio of LiOH and Zr:P is between about 95:5 to 90:10.

In one embodiment, including any of the foregoing, the starting molar ratio of LiOH and Zr:P is between about 90:10 to 95:5. In one embodiment, including any of the foregoing, the starting molar ratio of LiOH and Zr:P is between about 90:10 to 95:5.

In one embodiment, including any of the foregoing, the oxide comprises $LiZr_2(PO_4)_3$ and is a product of a reaction mixture of 1) LiOH; 2) a zirconium precursor; and, 3) a phosphorus precursor wherein the ratio of Li:Zr is about 1:2; the ratio of Li:P is about 2:3; and, the ratio of the Zr:P is about 1.3:1. In a further embodiment, the product is a reaction mixture of 1) LiOH; 2) $Zr(OBu)_4$; and, 3) $P_2O_5$.

In one embodiment, including any of the foregoing, the oxide comprises $Li_3ZrPO_6$ and is a product of a reaction mixture of 1) LiOH; 2) a zirconium precursor; and, 3) a phosphorus precursor wherein the ratio of Li:Zr is about 3:1; the ratio of Li:P is about 6:1; and, the ratio of Zr:P is about 2:1. In a further embodiment, the product is a reaction mixture of 1) LiOH; 2) $Zr(OBu)_4$; and, 3) $P_2O_5$.

In one embodiment, including any of the foregoing, the oxide comprises $Li_5PZrO_7$ and is a product of a reaction mixture of 1) LiOH; 2) a zirconium precursor; and, 3) a phosphorus precursor wherein the ratio of Li:Zr is about 5:1; the ratio of Li:P is about 10:1; and, the ratio of Zr:P is about 2:1. In a further embodiment, the product is a reaction mixture of 1) LiOH; 2) $Zr(OBu)_4$; and, 3) $P_2O_5$.

In one embodiment, including any of the foregoing, the oxide comprises $Li_7ZrPO_8$ and is a product of a reaction mixture of 1) LiOH; 2) a zirconium precursor; and, 3) a phosphorus precursor wherein the ratio of Li:Zr is about 7:1; the ratio of Li:P is about 14:1; and, the ratio of Zr:P is about 2:1. In a further embodiment, the product is a reaction mixture of 1) LiOH; 2) $Zr(OBu)_4$; and, 3) $P_2O_5$.

In one embodiment, including any of the foregoing, the oxide comprises $Li_{24}Zr_3P_{14}O_{53}$ and is a product of a reaction mixture of 1) LiOH; 2) a zirconium precursor; and, 3) a phosphorus precursor wherein the ratio of Li:Zr is about 24:3; the ratio of Li:P is about 24:14; and, the ratio of Zr:P is about 3:14. In a further embodiment, the product is a reaction mixture of 1) LiOH; 2) $Zr(OBu)_4$; and, 3) $P_2O_5$.

In one embodiment, the oxide is a product of a reaction mixture of 1) LiOH and 2) a zirconium precursor. In certain embodiments, the starting molar ratio of Li:Zr is about 30:70, about 40:60, about 50:50, about 60:40, about 65:35, and about 70:30. In one embodiment, the starting molar ratio of Li:Zr is about 60:40 to 70:30. In one embodiment, the starting molar ratio of Li:Zr is about 55:45 to 65:35. In one embodiment, the starting molar ratio of Li:Zr is about 65:35 to 75:25. In one embodiment, the starting molar ratio of Li:Zr is about 66:33.

In certain embodiments, the oxide is a product of a reaction mixture of 1) LiOH and 2) a phosphorus precursor. In certain embodiments, the starting molar ratio of Li:P is about 80:20 to 90:10. In certain embodiments, the starting molar ratio of Li:P is about 75:25 to 85:15. In certain embodiments, the starting molar ratio of Li:P is about 85:25 to 95:5. In certain embodiments the starting molar ratio of Li:P is about 85:15.

In one embodiment, including any of the foregoing, the phosphorus precursor is selected from $P_2O_5$, $H_3PO_4$, $(NH_4)_3PO_4$, $(NH_3)_3PO_4$, and combinations thereof. In one embodiment, including any of the foregoing, the zirconium precursor is zirconium butoxide ($Zr(OBu)_4$), zirconium propoxide ($Zr(OPr)_4$), zirconium ethoxide ($Zr(OEt)_4$), zirconium methoxide ($Zr(OMe)_4$), and combinations thereof. In one embodiment, including any of the foregoing, the lithium precursor is selected from lithium hydroxide (LiOH), lithium ethoxide (LiOEt), lithium methoxide (LiOMe), metallic lithium, and combinations thereof. In one embodiment, including any of the foregoing, the zirconium precursor and/or phosphorus precursor is a sol-gel precursor, such as a zirconium alkoxide or a phosphorus alkoxide precursor. In one embodiment, the phosphorus precursor is $P_2O_5$. In one embodiment, the zirconium precursor is $Zr(OBu)_4$. In one embodiment, the lithium precursor is LiOH.

In one embodiment, including any of the foregoing, the oxide is a coating on the cathode active material.

In one embodiment, including any of the foregoing, the oxide or coating further comprises amorphous domains based on transmission electron microscopy (TEM) analysis. In one embodiment, including any of the foregoing, the oxide or coating further comprises crystalline domains based on transmission electron microscopy (TEM) analysis. In one embodiment, including any of the foregoing, the oxide or coating further comprises amorphous domains based on transmission electron microscopy (TEM) analysis in addition to the crystalline domains based on transmission electron microscopy analysis.

In one embodiment, including any of the foregoing, the crystalline domains are in contact with the cathode active material.

In one embodiment, including any of the foregoing, the amorphous domains are not in contact with the cathode active material.

In one embodiment, including any of the foregoing, the crystalline domains are in contact with the cathode active material and the amorphous domains are in contact with the crystalline domains.

In one embodiment, including any of the foregoing, the coating is continuous. In one embodiment, the coating is discontinuous.

In certain embodiments, including any of the foregoing, the coating has a thickness, T, as determined by TEM analysis, that is 1 nm≤T≤20 nm.

In certain embodiments, including any of the foregoing, the coating has a thickness, T, as determined by TEM analysis, that is less than 1 nm.

In certain embodiments, including any of the foregoing, the coating has a thickness, T, as determined by scanning electron microscopy (SEM) analysis, that is 1 nm≤T≤20 nm.

In certain embodiments, including any of the foregoing, T is about 1 nm, about 5 nm, or about 10 nm. In one embodiment, including any of the foregoing, T is about 1 nm. In one embodiment, including any of the foregoing, T is about 2 nm. In one embodiment, including any of the foregoing, T is about 3 nm. In one embodiment, including any of the foregoing, T is about 4 nm. In one embodiment, including any of the foregoing, T is about 5 nm. In certain embodiments, including any of the foregoing, T is about 6 nm. In one embodiment, including any of the foregoing, T is about 7 nm. In one embodiment, including any of the foregoing, T is about 8 nm. In one embodiment, including any of the foregoing, T is about 9 nm. In one embodiment, including any of the foregoing, T is about 10 nm. In another embodiment, including any of the foregoing, T is about 11 nm. In another embodiment, including any of the foregoing, T is about 12 nm.

In certain embodiments, including any of the foregoing, T is between about 0.8 nm and 10 nm. In one embodiment, including any of the foregoing, T is between about 0.8 nm and 5 nm. In one embodiment, including any of the foregoing, T is between about 0.8 nm and 2.5 nm. In one embodiment, including any of the foregoing, T is between about 0.8 nm and 1.5 nm. In one embodiment, including any of the foregoing, T is between about 1 nm and 4 nm. In one embodiment, including any of the foregoing, T is between about 1.5 nm and 3.5 nm. In other embodiments, including any of the foregoing, T is between about 5 nm and 10 nm. In one embodiment, including any of the foregoing, T is between about 7 nm and 10 nm.

In certain embodiments, including any of the foregoing, the coating is not an even layer and T can range in thicknesses from about 0.8 nm to 12 nm. In one embodiment, including any of the foregoing, T ranges in thickness from about 0.8 nm to 5 nm. In one embodiment, including any of the foregoing, T ranges in thickness from about 1 nm to 3.5 nm. In one embodiment, including any of the foregoing, T ranges in thickness from about 1.5 nm to 4 nm. In one embodiment, including any of the foregoing, T ranges in thickness from about 5 nm to 12 nm. In one embodiment, including any of the foregoing, T ranges in thickness from about 5 nm to 8 nm.

In certain embodiments, including any of the foregoing, T is less than about 12 nm. In certain embodiments, including any of the foregoing, T is less than about 11 nm. In certain embodiments, including any of the foregoing, T is less than about 10 nm. In certain embodiments, including any of the foregoing, T is less than about 9 nm. In certain embodiments, including any of the foregoing, T is less than about 8 nm. In certain embodiments, including any of the foregoing, T is less than about 7 nm. In certain embodiments, including any of the foregoing, T is less than about 6 nm. In certain embodiments, including any of the foregoing, T is less than about 5 nm. In certain embodiments, including any of the foregoing, T is less than about 4 nm. In certain embodiments, including any of the foregoing, T is less than about 3 nm. In certain embodiments, including any of the foregoing, T is less than about 2 nm. In certain embodiments, including any of the foregoing, T is less than about 1 nm.

In certain embodiments, including any of the foregoing, T is not thicker than the TEM can detect, for example as described herein.

In certain embodiments, including any of the forgoing, the coating comprises both crystalline and amorphous domains and the thickness of the crystalline domain is between about 0.8 nm and 5 nm and the thickness of the amorphous domain is between about 0.8 nm and 5 nm. In one embodiment, the thickness of the crystalline domain is between about 1 nm and 3 nm and the thickness of the amorphous domain is between about 1 nm and 4 nm. In one embodiment, the thickness of the crystalline domain is between about 1.5 nm and 2.5 nm and the thickness of the amorphous domain is between about 2 nm and 4 nm. In one embodiment, the thickness of the crystalline domain is less than the thickness of the amorphous domain. In another embodiment, the thickness of the crystalline domain is greater than the thickness of the amorphous domain. In certain embodiments, including any of the foregoing, the crystalline domain is in contact with the cathode active material and the amorphous domain is in contact with the crystalline domain.

In any of the foregoing embodiments, the thickness is ±20% of the described thickness. In any of the foregoing embodiments, the thickness is ±10% of the described thickness.

In one embodiment, including any of the foregoing, the oxide or coating crystalline domains do not lattice match the crystalline domains of the cathode active material, as determined by TEM analysis.

In one embodiment, including any of the foregoing, the oxide or coating crystalline domains do not lattice match the crystalline domains of the cathode active material, as determined by SEM analysis.

In one embodiment, including any of the foregoing, the oxide or coating crystalline domains do lattice match the crystalline domains of the cathode active material, as determined by TEM analysis.

In one embodiment, including any of the foregoing, the oxide or coating crystalline domains do lattice match the crystalline domains of the cathode active material, as determined by SEM analysis.

In one embodiment, including any of the foregoing, the coating further comprises carbonate.

In one embodiment, including any of the foregoing, the composition further comprises a second coating in contact with the first coating wherein the first coating is in contact with the active cathode material.

In one embodiment, including any of the foregoing, the second coating has a chemical formula which is not the same as the chemical formula of the coating.

In certain embodiments, including any of the foregoing, the second coating comprises a compound of the chemical formula:
  $Li_xB_yO_z$, wherein $0.2 \leq x \leq 0.75$, $0.5 \leq y \leq 1.6$, and $1.5 \leq z \leq 2.6$;
  $Li_xC_yO_z$, wherein $0.4 \leq x \leq 1.8$, $0.1 \leq y \leq 1$, and $1 \leq z \leq 1.8$;
  $Li_xZr_yO_z$, wherein $0 \leq x \leq 1.6$, $0.2 \leq y \leq 1.0$, and $2 \leq z \leq 1.2$;
  $Li_xP_yO_z$, wherein $0.6 \leq x \leq 1.5$, $0.5 \leq y \leq 1.4$, and $2.0 \leq z \leq 3.7$;
  $Li_xZr_y(PO4)_z$, wherein $0.05 \leq x \leq 1.5$, $1 \leq y \leq 3$, and $2.0 \leq z \leq 4.0$;
  $Li_xNb_yO_z$, wherein $0.5 \leq x \leq 1.5$, $0.5 \leq y \leq 1.5$, and $2 \leq z \leq 4$;
  $Li_xTi_yO_z$, wherein $0 \leq x \leq 1.6$, $0.2 \leq y \leq 1.0$, and $2 \leq z \leq 1.2$;
  $Li_xTi_yP_wO_z$, wherein $0 \leq x \leq 2$, $1 \leq y \leq 3$, $1 \leq w \leq 4$, and $2 \leq z \leq 20$;
  $Li_xZr_yP_wO_z$, wherein $0 \leq x \leq 2$, $1 \leq y \leq 3$, $1 \leq w \leq 4$, and $2 \leq z \leq 20$;
  $Li_xZr_yF_z$, wherein $0.2 \leq x \leq 0.75$, $0.25 \leq y \leq 0.8$, and $1.75 \leq z \leq 3.4$;
  $Li_xTi_yF_z$, wherein $0.2 \leq x \leq 0.75$, $0.25 \leq y \leq 0.8$, and $1.75 \leq z \leq 3.4$;
  $Li_xAl_yF_z$, wherein $0.4 \leq x \leq 0.8$, $0.2 \leq y \leq 0.6$, and $1.4 \leq z \leq 2.2$;
  $Li_xY_yF_z$, wherein $0.4 \leq x \leq 0.8$, $0.2 \leq y \leq 0.6$, and $1.4 \leq z \leq 2.2$;
  $Li_xNb_yF_z$, wherein $0.2 \leq x \leq 0.8$, $0.2 \leq y \leq 0.8$, and $1.8 \leq z \leq 4.2$; or
  a combination thereof. Subscripts x, y, and z, are selected so the compound is charge neutral.

In certain embodiments, including any of the foregoing, the second coating comprises a compound of the formula: $Li_2CO_3$; $Li_3BO_3$; $Li_3B_{11}O_{18}$; $Li_2ZrO_3$; $Li_3PO_4$; $Li_2SO_4$; $LiNbO_3$; $Li_4Ti_5O_{12}$; $LiTi_2(PO_4)_3$; $LiZr_2(PO_4)_3$; $LiOH$; $LiF$; $Li_4ZrF_8$; $Li_3Zr_4F_{19}$; $Li_3TiF_6$; $LiAlF_4$; $LiYF_4$; $LiNbF_6$; $ZrO_2$; $Al_2O_3$; $TiO_2$; $ZrF_4$; $AlF_3$; $TiF_4$; $YF_3$; $NbF_5$; or a combination thereof In one embodiment, the second coating comprises $Li_2CO_3$. In one embodiment, the second coating comprises $Li_3BO_3$. In one embodiment, the second coating comprises $Li_3B_{11}O_{18}$. In one embodiment, the second coating comprises $Li_2ZrO_3$. In one embodiment, the second coating comprises $Li_3PO_4$. In one embodiment, the second coating comprises $Li_2SO_4$. In one embodiment, the second coating comprises $LiNbO_3$. In one embodiment, the second coating comprises $Li_4Ti_5O_{12}$. In one embodiment, the second coating comprises $LiTi_2(PO_4)_3$. In one embodiment, the second coating comprises $LiZr_2(PO_4)_3$. In one embodiment, the second coating comprises $LiOH$. In one embodiment, the second coating comprises $LiF$. In one embodiment, the second coating comprises $Li_4ZrF_8$. In one embodiment, the second coating comprises $Li_3Zr_4F_{19}$. In one embodiment, the second coating comprises $Li_3TiF_6$. In one embodiment, the second coating comprises $LiAlF_4$. In one embodiment, the second coating comprises $LiYF_4$. In one embodiment, the second coating comprises $LiNbF_6$. In one embodiment, the second coating comprises $ZrO_2$. In one embodiment, the second coating comprises $Al_2O_3$. In one embodiment, the second coating comprises $TiO_2$. In one embodiment, the second coating comprises $ZrF_4$. In one embodiment, the second coating comprises $AlF_3$. In one embodiment, the second coating comprises $TiF_4$. In certain examples, the second coating comprises $YF_3$. In one embodiment, the second coating comprises $NbF_5$.

In one embodiment, including any of the foregoing, the second coating is amorphous as determined by TEM analysis.

In one embodiment, including any of the foregoing, the second coating is crystalline as determined by TEM analysis.

In one embodiment, including any of the foregoing, the second coating has a chemical formula which is not the same as the chemical formula of the coating.

In one embodiment, including any of the foregoing, the second coating comprises $Li_3BO_3$.

In one embodiment, including any of the foregoing, the second coating comprises $Li_xB_yO_z$, wherein $0.2 \leq x \leq 0.75$, $0.5 \leq y \leq 1.6$, and $1.5 \leq z \leq 2.6$.

In one embodiment, including any of the foregoing, the coating comprises $Li_2CO_3$, $Li_3BO_3$, $Li_3B_{11}O_{18}$, $Li_xB_yO_z$, or a combination thereof. In the formula, $Li_xB_yO_z$, $0.2 \leq x \leq 0.75$, $0.5 \leq y \leq 1.6$, and $1.5 \leq z \leq 2.6$.

In one embodiment, including any of the foregoing the second coating comprises $Li_xZr_yO_z$, wherein $0 \leq x \leq 1.6$, $0.2 \leq y \leq 1.0$, and $2 \leq z \leq 1.2$.

In one embodiment, including any of the foregoing, the second coating comprises $Li_xP_yO_z$, wherein $0.6 \leq x \leq 1.5$, $0.5 \leq y \leq 1.4$, and $2.0 \leq z \leq 3.7$.

In one embodiment, including any of the foregoing, the second coating comprises $Li_3InCl_6$.

In one embodiment, the first coating comprises a compound of the formula $Li_xZr_yP_aO_d$, wherein $0.05 \leq x \leq 1.5$, $1.0 \leq y \leq 3.0$, $1.0 \leq a \leq 6.0$, and $2.0 \leq d \leq 20.0$ and wherein the formula is charge neutral.

In one embodiment, the first coating comprises a compound of the formula $Li_xZr_yP_aO_d$, wherein $0.5 \leq x \leq 7.0$, $1.0 \leq y \leq 3.0$, $1.0 \leq a \leq 4.0$, and $5.0 \leq d \leq 14.0$ and wherein the formula is charge neutral.

In one embodiment, the first coating comprises a compound of the formula $Li_xZr_yP_aO_d$, wherein $0.5 \leq x \leq 2.0$, $0 \leq y \leq 3.0$, $1.0 \leq a \leq 4.0$, and $10.0 \leq d \leq 13.0$ and wherein the formula is charge neutral.

In one embodiment, the first coating comprises a compound of the formula $Li_xZr_yP_aO_d$, wherein $1.0 \leq x \leq 4.0$, $0 \leq y \leq 2.0$, $1.0 \leq a \leq 3.0$, and $4.0 \leq d \leq 7.0$ and wherein the formula is charge neutral.

In one embodiment, the first coating comprises a compound of the formula $Li_xZr_yP_aO_d$, wherein $1.0 \leq x \leq 3.0$, $0 \leq y \leq 2.0$, $0 \leq a \leq 2.0$, and $5.0 \leq d \leq 8.0$ and wherein the formula is charge neutral.

In one embodiment, the first coating comprises a compound of the formula $Li_xZr_yP_aO_d$, wherein $5.0 \leq x \leq 8.0$, $0 \leq y \leq 2.0$, $0 \leq a \leq 2.0$, and $6.0 \leq d \leq 9.0$ and wherein the formula is charge neutral.

In one embodiment, the first coating comprises a compound of the formula $Li_xZr_yO_d$, wherein $1.0 \leq x \leq 3$, $0 \leq y \leq 2$, and $2.0 \leq d \leq 5.0$ and wherein the formula is charge neutral.

In one embodiment, the first coating comprises a compound of the formula $Li_xP_aO_d$, wherein $2.0 \leq x \leq 4$, $0 \leq a \leq 2.0$, and $2.0 \leq d \leq 5.0$ and wherein the formula is charge neutral.

In certain embodiments, including any of the foregoing, the first coating comprises a chemical formula selected from $LiZr_2(PO_4)_3$, $Li_3ZrPO_6$, $Li_5PZrO_7$, $Li_7ZrPO_8$, $Li_3PO_4$, $Li_2ZrO_3$, and $Li_{24}Zr_3P_{14}O_{53}$.

In one embodiment, the first coating comprises $LiZr_2(PO_4)_3$.

In certain embodiments, the first coating comprises $LiZr_2(PO_4)_3$ and the second coating comprises a chemical formula selected from $Li_3ZrPO_6$, $Li_5PZrO_7$, $Li_7ZrPO_8$, $Li_3PO_4$, $Li_2ZrO_3$, and $Li_{24}Zr_3P_{14}O_{53}$.

In one embodiment, the first coating comprises $LiZr_2(PO_4)_3$ and the second coating comprises a chemical formula of the formula $Li_xZr_yP_aO_d$, wherein $0.05 \leq x \leq 8.0$, $0 \leq y \leq 3.0$, $0 \leq a \leq 6.0$; and $2.0 \leq d \leq 20.0$ and wherein the formula is charge neutral and second coating is not $LiZr_2(PO_4)_3$.

In one embodiment, the first coating comprises crystalline domains as measured by TEM and the second coating comprises crystalline or amorphous domains as measured by TEM.

In one embodiment, the first coating comprises amorphous domains as measured by TEM and the second coating comprises crystalline or amorphous domains as measured by TEM.

In one embodiment, the first coating comprises crystalline and amorphous domains as measured by TEM and the second coating comprises crystalline or amorphous domains as measured by TEM.

Also set forth herein is a coated cathode active material, comprising: a cathode active material; wherein: the cathode active material comprises a first coating and a second coating; the first coating comprises $LiZr_2(PO_4)_3$; the second coating comprises $Li_3BO_3$, $Li_3B_{11}O_{18}$, $Li_xB_yO_z$, wherein $0.2 \leq x \leq 0.75$, $0.5 \leq y \leq 1.6$, and $1.5 \leq z \leq 2.6$, or a combination thereof; and wherein: the first coating contacts the cathode active material; and the second coating contacts the first coating.

Also set forth herein is a coated cathode active material, comprising: a cathode active material; wherein: the cathode active material comprises a first coating and a second coating; the first coating comprises $LiZr_2(PO_4)_3$; the second coating comprises $Li_xB_yO_z$, wherein $0.2 \leq x \leq 0.75$, $0.5 \leq y \leq 1.6$, and $1.5 \leq z \leq 2.6$, or a combination thereof; and wherein: the first coating contacts the cathode active material; and the second coating contacts the first coating.

Also set forth herein is a coated cathode active material, comprising: a cathode active material; wherein: the cathode active material comprises a first coating and a second coating; the first coating comprises $LiZr_2(PO_4)_3$ the second coating comprises $Li_3BO_3$, $Li_3B_{11}O_{18}$, or a combination thereof; and wherein: the first coating contacts the cathode active material; and the second coating contacts the first coating.

Also set forth herein is a coated cathode active material, comprising: a cathode active material; wherein: the cathode active material comprises a first coating and a second coating; the first coating comprises $LiZr_2(PO_4)_3$; the second coating comprises $Li_xB_yO_z$, wherein $0.2 \leq x \leq 0.75$, $0.5 \leq y \leq 1.6$, and $1.5 \leq z \leq 2.6$; $Li_xZr_yO_z$, wherein $0 \leq x \leq 1.6$, $0.2 \leq y \leq 1.0$, and $2 \leq z \leq 1.2$; $Li_xP_yO_z$, wherein $0.6 \leq x \leq 1.5$, $0.5 \leq y \leq 1.4$, and $2.0 \leq z \leq 3.7$; or a combination thereof; and wherein: the first coating contacts the cathode active material; and the second coating contacts the first coating.

Also set forth herein is a coated cathode active material, comprising: a cathode active material; wherein: the cathode active material comprises a first coating and a second coating; the first coating comprises $LiZr_2(PO_4)_3$; the second coating comprises $Li_3BO_3$, $Li_3B_{11}O_{18}$, $Li_2ZrO_3$, $Li_3PO_4$, $Li_2SO_4$, $Li_xB_yO_z$, wherein $0.2 \leq x \leq 0.75$, $0.5 \leq y \leq 1.6$, and $1.5 \leq z \leq 2.6$, or a combination thereof; and wherein: the first coating contacts the cathode active material; and the second coating contacts the first coating.

Also set forth herein is a coated cathode active material, comprising: a cathode active material; wherein: the cathode active material comprises a first coating and a second coating; the first coating comprises $LiZr_2(PO_4)_3$; the second coating comprises $Li_xB_yO_z$, wherein $0.2 \leq x \leq 0.75$, $0.5 \leq y \leq 1.6$, and $1.5 \leq z \leq 2.6$; $Li_xZr_yO_z$, wherein $0 \leq x \leq 1.6$, $0.2 \leq y \leq 1.0$, and $2 \leq z \leq 1.2$; $Li_xP_yO_z$, wherein $0.6 \leq x \leq 1.5$, $0.5 \leq y \leq 1.4$, and $2.0 \leq z \leq 3.7$; $Li_2SO_4$, or a combination thereof; and wherein: the first coating contacts the cathode active material; and the second coating contacts the first coating.

Also set forth herein is a coated cathode active material, comprising: a cathode active material; wherein: the cathode active material comprises a first coating and a second coating; the first coating comprises $LiZr_2(PO_4)_3$; the second coating comprises $Li_3BO_3$, $Li_3B_{11}O_{18}$, LZO, $Li_3PO_4$, $Li_2SO_4$, or a combination thereof; and wherein: the first coating contacts the cathode active material; and the second coating contacts the first coating.

Also set forth herein is a coated cathode active material, comprising: a cathode active material; wherein: the cathode active material comprises a first coating and a second coating; the first coating comprises $LiZr_2(PO_4)_3$; the second coating comprises $Li_2CO_3$, $Li_3BO_3$, $Li_3B_{11}O_{18}$, $Li_3PO_4$, $Li_2SO_4$, or a combination thereof; and wherein: the first coating contacts the cathode active material; and the second coating contacts the first coating.

Also set forth herein is a coated cathode active material, comprising: a cathode active material; wherein: the cathode active material comprises a first coating and a second coating; the first coating comprises $LiZr_2(PO_4)_3$; the second coating comprises $Li_3BO_3$; and wherein: the first coating contacts the cathode active material; and the second coating contacts the first coating.

Also set forth herein is a coated cathode active material, comprising: a cathode active material; wherein: the cathode active material comprises a first coating and a second coating; the first coating comprises $LiZr_2(PO_4)_3$; the second coating comprises $Li_3PO_4$; and wherein: the first coating contacts the cathode active material; and the second coating contacts the first coating.

Also set forth herein is a coated cathode active material, comprising: a cathode active material; wherein: the cathode active material comprises a first coating and a second coating; the first coating comprises $LiZr_2(PO_4)_3$; the second coating comprises $Li_2SO_4$; and wherein: the first coating contacts the cathode active material; and the second coating contacts the first coating.

In certain embodiments, including any of the foregoing, the thickness of each coating is about 1 nm to 50 nm. This means that in those examples where a cathode active material has two coatings, each of the two coatings may have a thickness from 1 nm to 50 nm. Each coating may have the same or different thickness as the other coating. In one embodiment, one of the two coatings has a thickness of about 1 nm. In one embodiment, one of the two coatings has a thickness of about 2 nm. In one embodiment, one of the two coatings has a thickness of about 3 nm. In one embodiment, one of the two coatings has a thickness of about 4 nm. In one embodiment, one of the two coatings has a thickness of about 5 nm. In one embodiment, one of the two coatings has a thickness of about 6 nm. In one embodiment, one of the two coatings has a thickness of about 7 nm. In one embodiment, one of the two coatings has a thickness of about 8 nm. In one embodiment, one of the two coatings has a thickness of about 9 nm. In one embodiment, one of the two coatings has a thickness of about 10 nm. In one embodiment, one of the two coatings has a thickness of about 11 nm. In one embodiment, one of the two coatings has a thickness of about 12 nm. In one embodiment, one of the two coatings has a thickness of about 13 nm. In one embodiment, one of the two coatings has a thickness of about 14 nm. In one embodiment, one of the two coatings has a thickness of about 15 nm. In one embodiment, one of the two coatings has a thickness of about16 nm. In one embodiment, one of the two coatings has a thickness of about 17 nm. In one embodiment, one of the two coatings has a thickness of about 18 nm. In one embodiment, one of the two coatings has a thickness of about 19 nm. In one embodiment, one of the two coatings has a thickness of about 20 nm. In one embodiment, one of the two coatings has a thickness of about 21 nm. In one embodiment, one of the two coatings has a thickness of about 22 nm. In one embodiment, one of the two coatings has a thickness of 2about 3 nm. In one embodiment, one of the two coatings has a thickness of about 24 nm. In one embodiment, one of the two coatings has a thickness of about 25 nm. In one embodiment, one of the two coatings has a thickness of about 26 nm. In one embodiment, one of the two coatings has a thickness of about 27 nm. In one embodiment, one of the two coatings has a thickness of about 28 nm. In one embodiment, one of the two coatings has a thickness of about 29 nm. In one embodiment, one of the two coatings has a thickness of about 30 nm. In one embodiment, one of the two coatings has a thickness of about 31 nm. In one embodiment, one of the two coatings has a thickness of about 32 nm. In one embodiment, one of the two coatings has a thickness of about 33 nm. In one embodiment, one of the two coatings has a thickness of about 34 nm. In one embodiment, one of the two coatings has a thickness of about 35 nm. In one embodiment, one of the two coatings has a thickness of about 36 nm. In one embodiment, one of the two coatings has a thickness of about 37 nm. In one embodiment, one of the two coatings has a thickness of about 38 nm. In one embodiment, one of the two coatings has a thickness of about 39 nm. In one embodiment, one of the two coatings has a thickness of about 40 nm. In one embodiment, one of the two coatings has a thickness of about 41 nm. In one embodiment, one of the two coatings has a thickness of about 42 nm. In one embodiment, one of the two coatings has a thickness of about 43 nm. In one embodiment, one of the two coatings has a thickness of about 44 nm. In one embodiment, one of the two coatings has a thickness of about 45 nm. In one embodiment, one of the two coatings has a thickness of about 46 nm. In one embodiment, one of the two coatings has a thickness of about 47 nm. In one embodiment, one of the two coatings has a thickness of about 48 nm. In one embodiment, one of the two coatings has a thickness of about 49 nm. In one embodiment, one of the two coatings has a thickness of about 50 nm. In one embodiment, the second of the two coatings has a thickness of about 1 nm. In one embodiment, the second of the two coatings has a thickness of about 2 nm. In one embodiment, the second of the two coatings has a thickness of about 3 nm. In one embodiment, the second of the two coatings has a thickness of about 4 nm. In one embodiment, the second of the two coatings has a thickness of about 5 nm. In one embodiment, the second of the two coatings has a thickness of about 6 nm. In one embodiment, the second of the two coatings has a thickness of about 7 nm. In one embodiment, the second of the two coatings has a thickness of about 8 nm. In one embodiment, the second of the two coatings has a thickness of about 9 nm. In one embodiment, the second of the two coatings has a thickness of about 10 nm. In one embodiment, the second of the two coatings has a thickness of about 11 nm. In one embodiment, the second of the two coatings has a thickness of about 12 nm. In one embodiment, the second of the two coatings has a thickness of about 13 nm. In one embodiment, the second of the two coatings has a thickness of about 14 nm. In one embodiment, the second of the two coatings has a thickness of about 15 nm. In one embodiment, the second of the two coatings has a thickness of about 16 nm. In one embodiment, the second of the two coatings has a thickness of about 17 nm. In one embodiment, the second of the two coatings has a thickness of about 18 nm. In one embodiment, the second of the two coatings has a thickness of about 19 nm. In one embodiment, the second of the two coatings has a thickness of about 20 nm. In one embodiment, the second of the two coatings has a thickness of about 21 nm. In one embodiment, the second of the two coatings has a thickness of about 22 nm. In one embodiment, the second of the two coatings has a thickness of about 23 nm. In one embodiment, the second of the two coatings has a thickness of about 24 nm. In one embodiment, the second of the two coatings has a thickness of about 25 nm. In one embodiment, the second of the two coatings has a thickness of about 26 nm. In one embodiment, the second of the two coatings has a thickness of about 27 nm. In one embodiment, the second of the two coatings has a thickness of about 28 nm. In one embodiment, the second of the two coatings has a thickness of about 29 nm. In one embodiment, the second of the two coatings has a thickness of about 30 nm. In one embodiment, the second of the two coatings has a thickness of about 31 nm. In one embodiment, the second of the two coatings has a thickness of about 32 nm. In one embodiment, the second of the two coatings has a thickness of about 33 nm. In one embodiment, the second of the two coatings has a thickness of about 34 nm. In one embodiment, the second of the two coatings has a thickness of about 35 nm. In one embodiment, the second of the two coatings has a thickness of about 36 nm. In one embodiment, the second of the two coatings has a thickness of about 37 nm. In one embodiment, the second of the two coatings has a thickness of about 38 nm. In one embodiment, the second of the two coatings has a thickness of about 39 nm. In one embodiment, the second of the two coatings has a thickness of about 40 nm. In one embodiment, the second of the two coatings has a thickness of about 41 nm. In one embodiment, the second of the two coatings has a thickness of about 42 nm. In one embodiment, the second of the two coatings has a thickness of about 43 nm. In one embodiment, the second of the two coatings has a thickness of about 44 nm. In one embodiment, the second of the two coatings has a thickness of about 45 nm. In one embodiment, the second of the two coatings has a thickness of about 46 nm. In one embodiment, the second of the two coatings has a thickness of about 47 nm. In one embodiment, the second of the two coatings has a thickness of about 48 nm. In one embodiment, the second of the two coatings has a thickness of about 49 nm. In one embodiment, the second of the two coatings has a thickness of about 50 nm.

In certain embodiments, including any of the foregoing, the cathode active material is selected from $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, $x+y+z=1$, $0 \leq x \leq 1$, $0 \leq y \leq 1$, and $0 \leq z \leq 1$; and $LiNi_xCo_yAl_zO_2$, wherein $x+y+z=1$, and $0 \leq x \leq 1$, $0 \leq y \leq 1$, and $0 \leq z \leq 1$.

In certain embodiments, including any of the foregoing, the cathode active material is selected from lithium cobalt oxide (LCO), lithium nickel cobalt aluminum oxide (NCA), lithium nickel manganese cobalt oxide (NMC), lithium iron phosphate (LFP), and combinations thereof.

In certain embodiments, including any of the foregoing, the cathode active material is a member of the NMC class of cathode active materials, for example, $LiNiCoMnO_2$. In certain embodiments, including any of the foregoing, the cathode active material is a member of the LFP class of cathode active materials, for example, $LiFePO_4/C$. In certain embodiments, including any of the foregoing, the cathode active material is a member of the LNMO class of cathode active materials, for example, $LiNi_{0.5}Mn_{1.5}O_4$ or $LiNi_{0.5}Mn_{1.5}O_2$. In certain embodiments, including any of the foregoing, the cathode active material is a member of the NCA class of cathode active materials, for example, $LiMn_2O_4$. In certain embodiments, including any of the foregoing, the cathode active material is a member of the LMO class of cathode active materials, for example, $LiMn_2O_4$. In certain embodiments, including any of the foregoing, the cathode active material is a member of the LCO class of cathode active materials, for example, $LiCoO_2$. In one embodiment, the cathode active material is $LiNiO_2$. In one embodiment, the cathode active material is $LiNi_{1-x}Co_xO_2$ (0.2<x<0.5). The cathode active material can be any useful known cathode that is similar to the cathode active materials described herein, even if the molar ratio of the composition changes. For example, the cathode active material can be any cathode active material described in Minnmann et al. *Advanced Energy Materials*, 2022, 12, 2201425.

In certain embodiments, including any of the foregoing, the cathode active material is selected from $LiMPO_4$ (M=Fe, Ni, Co, Mn), $Li_xTi_yO_z$, wherein x is from 0 to 8, y is from 1 to 12, z is from 1 to 24, $LiMn_2O_4$, $LiMn_{2a}Ni_aO_4$, wherein a is from 0 to 2, $LiCoO_2$, $Li(NiCoMn)O_2$, $Li(NiCoAl)O_2$, and a nickel cobalt aluminum oxide.

In certain embodiments, including any of the foregoing, the cathode active material is selected from $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, x+y+z=1, 0≤x≤1, 0≤y≤1, and 0≤z≤1; and, $LiNi_xCo_yAl_zO_2$, wherein x+y+z=1, and 0≤x≤1, 0≤y≤1, and 0≤z≤1.

In certain embodiments, including any of the foregoing, the cathode active material is $LiNi_xMn_yCo_zO_2$, x+y+z=1, 0≤x≤1, 0≤y≤1, and 0≤z≤1. In one embodiment, the cathode active material is $LiNi_xMn_yCo_zO_2$, x is 0.8, y is 0.1, and z is 0.1. In certain other examples, the coated cathode active material is $LiNi_xMn_yCo_zO_2$, x is 0.6, y is 0.2, and z is 0.2. In one embodiment, the coated cathode active material is $LiNi_xMn_yCo_zO_2$, x is 0.5, y is 0.3, and z is 0.2. In some other examples, the coated cathode active material is $LiNi_xMn_yCo_zO_2$, x is ⅓, y is ⅓, and z is ⅓. In certain embodiments, the coated cathode active material is selected from $LiMn_2O_4$, $LiCoO_2$, $Li(NiCoMn)O_2$, and $Li(NiCoAl)O_2$.

In one embodiment, including any of the foregoing, the cathode active material is $LiNi_xMn_yCo_zO_2$, x+y+z=1, 0≤x≤1, 0≤y≤1, and 0≤z≤1. In certain examples, the amount of lithium in the cathode active material will vary depending on the state-of-charge of the battery. For example, the amount of lithium may range from $Li_{0.95-1.1}(Ni_xMn_yCo_z)O_2$, wherein x, y, and z, are as defined above. In certain other examples, the amount of lithium may range from $Li_{0.2-1.1}(Ni_xMn_yCo_z)O_2$, wherein x, y, and z, are as defined above. Other ranges of lithium are contemplated herein.

In certain embodiments, including any of the foregoing, the cathode active material is $LiNi_xMn_yCo_zO_2$, x+y+z=1, 0.8≤x≤0.97, 0≤y≤0.2, and 0≤z≤0.2. In certain embodiments, including any of the foregoing, the cathode active material is $LiNi_xMn_yCo_zO_2$, x+y+z=1, 0.8≤x≤0.95, 0≤y≤0.2, and 0≤z≤0.2. In certain embodiments, including any of the foregoing, the cathode active material is $LiNi_xMn_yCo_zO_2$, x+y+z=1, 0.8≤x≤0.9, 0≤y≤0.2, and In certain embodiments, including any of the foregoing, the cathode active material is $LiNi_xMn_yCo_zO_2$, x+y+z=1, 0.8≤x≤0.85, 0≤y≤0.2, and 0≤z≤0.2. In certain embodiments, including any of the foregoing, the cathode active material is $LiNi_xMn_yCo_zO_2$, x+y+z=1, 0≤y≤0.2, and 0≤z≤0.2. In one embodiment, the cathode active material has high nickel content, for example, $LiNi_xMn_yCo_zO_2$, x+y+z=1, 0.8≤x≤0.97, 0≤y≤0.2, and 0≤z≤0.2.

As set forth herein, is a composition comprising: a cathode active material; and an oxide bonded to the cathode active material, wherein: the oxide comprises amorphous lithium zirconium oxide, amorphous lithium zirconium phosphorus oxide, or a combination thereof; and wherein the cathode active material is selected from lithium cobalt oxide (LCO), lithium nickel cobalt aluminum oxide (NCA), lithium nickel manganese cobalt oxide (NMC), lithium iron phosphate (LFP), and combinations thereof.

As set forth herein, is a composition comprising: a cathode active material; and an oxide bonded to the cathode active material, wherein: the oxide is selected from the group consisting of $LiZr_2(PO_4)_3$, $Li_2ZrO_3$, $Li_3ZrPO_6$, $Li_5PZrO_7$, $Li_7ZrPO_8$, $Li_{24}Zr_3P_{14}O_{53}$, and combinations thereof; and wherein the cathode active material is selected from lithium cobalt oxide (LCO), lithium nickel cobalt aluminum oxide (NCA), lithium nickel manganese cobalt oxide (NMC), lithium iron phosphate (LFP), and combinations thereof.

As set forth herein, is a composition comprising: a cathode active material; and an oxide bonded to the cathode active material, wherein: the oxide comprises a compound of the formula $Li_xZr_yP_aO_d$, wherein 0.05≤x≤8.0, 0≤y≤3.0, 0≤a≤6.0; and 2.0≤d≤20.0; and, wherein the formula is charge neutral; and wherein the cathode active material is selected from lithium cobalt oxide (LCO), lithium nickel cobalt aluminum oxide (NCA), lithium nickel manganese cobalt oxide (NMC), lithium iron phosphate (LFP), and combinations thereof. In one embodiment, the cathode active material is lithium nickel manganese cobalt oxide (NMC).

As set forth herein, is a composition comprising: a cathode active material; and an oxide bonded to the cathode active material, wherein: the oxide comprises a compound of the formula $Li_xZr_yP_aO_d$, wherein 0.05≤x≤25.0, 0≤y≤5.0, 0≤a≤16.0; and 2.0≤d≤55.0; and, wherein the formula is charge neutral; and wherein the cathode active material is selected from lithium cobalt oxide (LCO), lithium nickel cobalt aluminum oxide (NCA), lithium nickel manganese cobalt oxide (NMC), lithium iron phosphate (LFP), and combinations thereof. In one embodiment, the cathode active material is lithium nickel manganese cobalt oxide (NMC).

As set forth herein, is a composition comprising: a cathode active material; and an oxide bonded to the cathode active material, wherein: the oxide comprises a compound of the formula $Li_xZr_yP_aO_d$, wherein 0.5≤x≤7.0, 1.0≤y≤3.0, 1.0≤a≤4.0, and 5.0≤d≤14.0; and, wherein the formula is charge neutral; and wherein the cathode active material is selected from lithium cobalt oxide (LCO), lithium nickel cobalt aluminum oxide (NCA), lithium nickel manganese cobalt oxide (NMC), lithium iron phosphate (LFP), and combinations thereof. In one embodiment, the cathode active material is lithium nickel manganese cobalt oxide (NMC).

As set forth herein, is a composition comprising: a cathode active material; and an oxide bonded to the cathode active material, wherein: the oxide comprises a compound of the formula $Li_xZr_yP_aO_d$, wherein $0.5 \leq x \leq 2.0$, $0 \leq y \leq 3.0$, $1.0 \leq a \leq 4.0$, and $10.0 \leq d \leq 13.0$; and, wherein the formula is charge neutral; and wherein the cathode active material is selected from lithium cobalt oxide (LCO), lithium nickel cobalt aluminum oxide (NCA), lithium nickel manganese cobalt oxide (NMC), lithium iron phosphate (LFP), and combinations thereof. In one embodiment, the cathode active material is lithium nickel manganese cobalt oxide (NMC).

As set forth herein, is a composition comprising: a cathode active material; and an oxide bonded to the cathode active material, wherein: the oxide comprises a compound of the formula $Li_xZr_yP_aO_d$, wherein $20.0 \leq x \leq 25.0$, $2.0 \leq y \leq 5.0$, $10.0 \leq a \leq 16.0$; and $50.0 \leq d \leq 55.0$; and, wherein the formula is charge neutral; and wherein the cathode active material is selected from lithium cobalt oxide (LCO), lithium nickel cobalt aluminum oxide (NCA), lithium nickel manganese cobalt oxide (NMC), lithium iron phosphate (LFP), and combinations thereof. In one embodiment, the cathode active material is lithium nickel manganese cobalt oxide (NMC).

As set forth herein, is a composition comprising: a cathode active material; and an oxide bonded to the cathode active material, wherein: the oxide comprises a compound selected from $LiZr_2(PO_4)_3$, $Li_3ZrPO_6$, $Li_5PZrO_7$, $Li_7ZrPO_8$, $Li_3PO_4$, $Li_2ZrO_3$, and $Li_{24}Zr_3P_{14}O_{53}$; and wherein the cathode active material is selected from lithium cobalt oxide (LCO), lithium nickel cobalt aluminum oxide (NCA), lithium nickel manganese cobalt oxide (NMC), lithium iron phosphate (LFP), and combinations thereof. In one embodiment, the cathode active material is lithium nickel manganese cobalt oxide (NMC).

As set forth herein, is a composition comprising: a cathode active material; and an oxide bonded to the cathode active material, wherein: the oxide comprises $LiZr_2(PO_4)_3$; and wherein the cathode active material selected from lithium cobalt oxide (LCO), lithium nickel cobalt aluminum oxide (NCA), lithium nickel manganese cobalt oxide (NMC), lithium iron phosphate (LFP), and combinations thereof. In one embodiment, the cathode active material is lithium nickel manganese cobalt oxide (NMC).

In one embodiment, including any of the foregoing, the cathode active material is $LiNi_xMn_yCo_zO_2$, $x+y+z=1$, $0 \leq x \leq 1$, $0 \leq y \leq 1$, and $0 \leq z \leq 1$.

In one embodiment, including any of the foregoing, the cathode active material is $LiNi_xMn_yCo_zO_2$, x is 0.8, y is 0.1, and z is 0.1.

In one embodiment, including any of the foregoing, the cathode active material is $LiNi_xMn_yCo_zO_2$, x is 0.6, y is 0.2, and z is 0.2.

In one embodiment, including any of the foregoing, the cathode active material is $LiNi_xMn_yCo_zO_2$, x is 0.5, y is 0.3, and z is 0.2.

In one embodiment, including any of the foregoing, the cathode active material is $LiNi_xMn_yCo_zO_2$, x is ⅓, y is ⅓, and z is ⅓.

In one embodiment, including any of the foregoing, the cathode active material is $LiNi_xMn_yCo_zO_2$, $x+y+z=1$, $0.8 \leq x \leq 0.97$, $0 \leq y \leq 0.2$, and $0 \leq z \leq 0.2$. In one embodiment, including any of the foregoing, the cathode active material is $LiNi_xMn_yCo_zO_2$, $x+y+z=1$, $0.8 \leq x \leq 0.95$, $0 \leq y \leq 0.2$, and $0 \leq z \leq 0.2$. In one embodiment, including any of the foregoing, the cathode active material is $LiNi_xMn_yCo_zO_2$, $x+y+z=1$, $0.8 \leq x \leq 0.9$, $0 \leq y \leq 0.2$, and $0 \leq z \leq 0.2$. In one embodiment, including any of the foregoing, the cathode active material is $LiNi_xMn_yCo_zO_2$, $x+y+z=1$, $0.8 \leq x \leq 0.85$, $0 \leq y \leq 0.2$, and $0 \leq z \leq 0.2$. In one embodiment, including any of the foregoing, the cathode active material is $LiNi_xMn_yCo_zO_2$, $x+y+z=1$, $0.8 \leq x \leq 0.83$, $0 \leq y \leq 0.2$, and $0 \leq z \leq 0.2$.

In one embodiment, including any of the foregoing, the cathode active material is selected from $LiMn_2O_4$, $LiCoO_2$, $Li(NiCoMn)O_2$, and $Li(NiCoAl)O_2$.

Unless explicitly stated otherwise, the variables herein are chosen so that the chemical formula is charge neutral.

In certain embodiments, set forth herein is a solid-state cathode comprising a coated cathode active material set forth herein.

In one embodiment, the composition comprising the cathode active material and the oxide bonded to the cathode active material as set forth herein comprises between about 1.0 weight % and 20 weight % of lithium as measured by inductively coupled plasma (ICP) analysis. In one embodiment, the composition comprising the cathode active material and the oxide bonded to the cathode active material as set forth herein comprises between about 5.0 weight % and 10 weight % of lithium as measured by ICP analysis. In one embodiment, the composition comprising the cathode active material and the oxide bonded to the cathode active material as set forth herein comprises between about 7.0 weight % and 8 weight % of lithium as measured by ICP analysis. In one embodiment, the composition comprising the cathode active material and the oxide bonded to the cathode active material as set forth herein comprises at least 5 weight % of lithium as measured by ICP analysis. In one embodiment, the composition comprising the cathode active material and the oxide bonded to the cathode active material as set forth herein comprises less than 10 weight % of lithium as measured by ICP analysis. In one embodiment, the composition comprising the cathode active material and the oxide bonded to the cathode active material as set forth herein comprises about 7.0 weight % of lithium as measured by ICP analysis. In one embodiment, the composition comprising the cathode active material and the oxide bonded to the cathode active material as set forth herein comprises about 7.5 weight % of lithium as measured by ICP analysis.

In one embodiment, the composition comprising the cathode active material and the oxide bonded to the cathode active material as set forth herein is characterized by a ratio of lithium : manganese, cobalt, and nickel (Li/(Mn+Co+Ni) of between about 0.05-0.5 by weight percent as measured by ICP analysis. In one embodiment, the composition comprising the cathode active material and the oxide bonded to the cathode active material as set forth herein is characterized by a ratio of lithium : manganese, cobalt, and nickel (Li/(Mn+Co+Ni) of between about 0.1-0.3 by weight percent as measured by ICP analysis. In one embodiment, the composition comprising the cathode active material and the oxide bonded to the cathode active material as set forth herein is characterized by a ratio of lithium : manganese, cobalt, and nickel (Li/(Mn+Co+Ni) of less than about 0.5 by weight percent as measured by ICP analysis. In one embodiment, the composition comprising the cathode active material and the oxide bonded to the cathode active material as set forth herein is characterized by a ratio of lithium:manganese, cobalt, and nickel (Li/(Mn+Co+Ni) of at least about 0.1 by weight percent as measured by ICP analysis. In one embodiment, the composition comprising the cathode active material and the oxide bonded to the cathode active material as set forth herein is characterized by a ratio of lithium : manganese, cobalt, and nickel (Li/(Mn+Co+Ni) of about 0.12 or 0.13 by weight percent as measured by ICP analysis.

In one embodiment, the composition comprising the cathode active material and the oxide bonded to the cathode active material as set forth herein comprises between about 0.1 weight % and 1 weight % of zirconium as measured by ICP analysis. In one embodiment, the composition comprising the cathode active material and the oxide bonded to the cathode active material as set forth herein comprises between about 0.1 weight % and 0.7 weight % of zirconium as measured by ICP analysis. In one embodiment, the composition comprising the cathode active material and the oxide bonded to the cathode active material comprises as set forth herein comprises at least 0.1 weight % of zirconium as measured by ICP analysis. In one embodiment, the composition comprising the cathode active material and the oxide bonded to the cathode active material as set forth herein comprises less than 1 weight % of zirconium as measured by ICP analysis. In one embodiment, the composition comprising the cathode active material and the oxide bonded to the cathode active material as set forth herein comprises about 0.2 weight % of zirconium as measured by ICP analysis. In one embodiment, the composition comprising the cathode active material and the oxide bonded to the cathode active material comprises as set forth herein about 0.3 weight % of zirconium as measured by ICP analysis. In one embodiment, the composition comprising the cathode active material and the oxide bonded to the cathode active material as set forth herein comprises about 0.5 weight % of zirconium as measured by ICP analysis.

In one embodiment, the composition comprising the cathode active material and the oxide bonded to the cathode active material as set forth herein is characterized by a ratio of zirconium:manganese, cobalt, and nickel (Zr/(Mn+Co+Ni) of between about 0.001 and 0.01 by weight percent as measured by ICP analysis. In one embodiment, the composition comprising the cathode active material and the oxide bonded to the cathode active material as set forth herein is characterized by a ratio of zirconium:manganese, cobalt, and nickel (Zr/(Mn+Co+Ni) of between about 0.003-0.009 by weight percent as measured by ICP analysis. In one embodiment, the composition comprising the cathode active material and the oxide bonded to the cathode active material as set forth herein is characterized by a ratio of zirconium: manganese, cobalt, and nickel (Zr/(Mn+Co+Ni) of at least about 0.001 by weight percent as measured by ICP analysis. In one embodiment, the composition comprising the cathode active material and the oxide bonded to the cathode active material as set forth herein is characterized by a ratio of zirconium:manganese, cobalt, and nickel (Zr/(Mn+Co+Ni) of at least about 0.003 by weight percent as measured by ICP analysis. In one embodiment, the composition comprising the cathode active material and the oxide bonded to the cathode active material as set forth herein is characterized by a ratio of zirconium:manganese, cobalt, and nickel (Zr/(Mn+Co+Ni) less than about 0.01 by weight percent as measured by ICP analysis. In one embodiment, the composition comprising the cathode active material and the oxide bonded to the cathode active material as set forth herein is characterized by a ratio of zirconium:manganese, cobalt, and nickel (Zr/(Mn+Co+Ni) selected from about 0.0034, 0.0036, 0.0039, 0.006, and 0.009 by weight percent as measured by ICP analysis. In an alternative embodiment, the composition comprising the cathode active material and the oxide bonded to the cathode active material as set forth herein is characterized by a ratio of zirconium : manganese, cobalt, and nickel (Zr/(Mn+Co+Ni) of about 0.0030 by weight percent as measured by ICP analysis.

In one embodiment, the composition comprising the cathode active material and the oxide bonded to the cathode active material as set forth herein comprises between about 0.1 weight % and 0.5 weight % of phosphorus as measured by ICP analysis. In one embodiment, the composition comprising the cathode active material and the oxide bonded to the cathode active material as set forth herein comprises between about 0.08 weight % and 0.4 weight % of phosphorus as measured by ICP analysis. In one embodiment, the composition comprising the cathode active material and the oxide bonded to the cathode active material as set forth herein comprises at least 0.1 weight % of phosphorus as measured by ICP analysis. In one embodiment, the composition comprising the cathode active material and the oxide bonded to the cathode active material as set forth herein comprises less than 0.5 weight % of phosphorus as measured by ICP analysis. In one embodiment, the composition comprising the cathode active material and the oxide bonded to the cathode active material as set forth herein comprises about 0.15 weight % of phosphorus as measured by ICP analysis. In one embodiment, the composition comprising the cathode active material and the oxide bonded to the cathode active material as set forth herein comprises about 0.3 weight % of phosphorus as measured by ICP analysis.

In one embodiment, the composition comprising the cathode active material and the oxide bonded to the cathode active material as set forth herein is characterized by a ratio of phosphorus:manganese, cobalt, and nickel (P/(Mn+Co+Ni) of between about 0.001 and 0.01 by weight percent as measured by ICP analysis. In one embodiment, the composition comprising the cathode active material and the oxide bonded to the cathode active material as set forth herein is characterized by a ratio of phosphorus:manganese, cobalt, and nickel (P/(Mn+Co+Ni) of between about 0.002 and 0.06 by weight percent as measured by ICP analysis. In one embodiment, the composition comprising the cathode active material and the oxide bonded to the cathode active material as set forth herein is characterized by a ratio of phosphorus: manganese, cobalt, and nickel (P/(Mn+Co+Ni) of less than about 0.005 by weight percent as measured by ICP analysis. In one embodiment, the composition comprising the cathode active material and the oxide bonded to the cathode active material as set forth herein is characterized by a ratio of phosphorus:manganese, cobalt, and nickel (P/(Mn+Co+Ni) of less than about 0.003 by weight percent as measured by ICP analysis. In one embodiment, the composition comprising the cathode active material and the oxide bonded to the cathode active material as set forth herein is characterized by a ratio of phosphorus:manganese, cobalt, and nickel (P/(Mn+Co+Ni) of less than about 0.002 by weight percent as measured by ICP analysis. In one embodiment, the composition comprising the cathode active material and the oxide bonded to the cathode active material as set forth herein is characterized by a ratio of phosphorus:manganese, cobalt, and nickel (P/(Mn+Co+Ni) of at least about 0.001 by weight percent as measured by ICP analysis. In one embodiment, the composition comprising the cathode active material and the oxide bonded to the cathode active material as set forth herein is characterized by a ratio of phosphorus:manganese, cobalt, and nickel (P/(Mn+Co+Ni) of about 0.0025, 0.0026, and 0.0044 as measured by ICP analysis. In an alternative embodiment, the composition comprising the cathode active material and the oxide bonded to the cathode active material as set forth herein is characterized by a ratio of phosphorus:

manganese, cobalt, and nickel (P/(Mn+Co+Ni) of about 0.0043 as measured by ICP analysis.

In one embodiment, the composition comprising the cathode active material and the oxide bonded to the cathode active material as set forth herein comprises between about 5 weight % and 10 weight % of lithium; between about 0.2 weight % and 0.6 weight % of zirconium; and, between about 0.1 weight % and 0.5 weight % of phosphorus as measured by ICP analysis.

In an alternative embodiment, the composition comprising the cathode active material and the oxide bonded to the cathode active material as set forth herein comprises between about 5 weight % and 10 weight % of lithium; between about 0.1 weight % and 0.6 weight % of zirconium; and, between about 0.1 weight % and 0.5 weight % of phosphorus as measured by ICP analysis.

In one embodiment, the composition comprising the cathode active material and the oxide bonded to the cathode active material as set forth herein is characterized by a ratio of lithium:manganese, cobalt, and nickel (Li/(Mn+Co+Ni) of between about 0.1-0.3 by weight percent; a ratio of zirconium:manganese, cobalt, and nickel (Zr/(Mn+Co+Ni) of between about 0.003-0.009 by weight percent; and, a ratio of phosphorus:manganese, cobalt, and nickel (P/(Mn+Co+Ni) of between about 0.002 and 0.06 by weight percent.

In one embodiment, the composition comprising the cathode active material and the oxide bonded to the cathode active material as set forth herein is characterized by a ratio of lithium:manganese, cobalt, and nickel (Li/(Mn+Co+Ni) of between about 0.1-0.3 by weight percent; a ratio of zirconium:manganese, cobalt, and nickel (Zr/(Mn+Co+Ni) of between about 0.0025-0.006 by weight percent; and, a ratio of phosphorus:manganese, cobalt, and nickel (P/(Mn+Co+Ni) of between about 0.002 and 0.06 by weight percent.

In one embodiment, the composition comprising the cathode active material and the oxide bonded to the cathode active material as set forth herein comprises less than about 65 weight % of manganese, cobalt, and nickel. In one embodiment, the composition comprising the cathode active material and the oxide bonded to the cathode active material as set forth herein comprises about 60 weight % of manganese, cobalt, and nickel.

Set forth herein is a composition comprising: a cathode active material; and an oxide bonded to the cathode active material, wherein: the oxide comprises $LiZr_2(PO_4)_3$ and wherein the composition comprises about 7.5 weight % of lithium, about 0.5 weight % of zirconium, about 0.3 weight % of phosphorus, and about 60 weight % of manganese, cobalt and nickel (Mn+Co+Ni) as measured by ICP analysis.

Set forth herein is a composition comprising: a cathode active material; and an oxide bonded to the cathode active material, wherein: the oxide comprises $Li_2ZrO_3$ and wherein the composition comprises about 7.5 weight % of lithium about 0.3 weight % of zirconium, and about 60 weight % of manganese, cobalt and nickel (Mn+Co+Ni) as measured by ICP analysis.

Set forth herein is a composition comprising: a cathode active material; and an oxide bonded to the cathode active material, wherein: the oxide comprises $Li_3ZrPO_6$ and wherein the composition comprises about 7.3 weight % of lithium, about 0.2 weight % of zirconium, about 0.15 weight % of phosphorus, and about 60 weight % of manganese, cobalt and nickel (Mn+Co+Ni) as measured by ICP analysis.

Set forth herein is a composition comprising: a cathode active material; and an oxide bonded to the cathode active material, wherein: the oxide comprises $Li_5PZrO_7$ and wherein the composition comprises about 7.3 weight % of lithium, about 0.2 weight % of zirconium, about 0.15 weight % of phosphorus, and about 58 weight % of manganese, cobalt and nickel (Mn+Co+Ni) as measured by ICP analysis.

Set forth herein is a composition comprising: a cathode active material; and an oxide bonded to the cathode active material, wherein: the oxide comprises $Li_7ZrPO_8$ and wherein the composition comprises about 7.5 weight % of lithium, about 0.2 weight % of zirconium, and 0.15 weight % of phosphorus, and about 60 weight % of manganese, cobalt and nickel (Mn+Co+Ni) as measured by ICP analysis.

Set forth herein is a composition comprising: a cathode active material; and an oxide bonded to the cathode active material, wherein: the oxide comprises $Li_{24}Zr_3P_{14}O_{53}$ and wherein the composition comprises about 7.5 weight % of lithium, about 0.18 weight % of zirconium, and 0.26 weight % of phosphorus, and about 60 weight % of manganese, cobalt and nickel (Mn+Co+Ni) as measured by ICP analysis.

In one embodiment, the composition comprising the cathode active material and the oxide bonded to the cathode active material as set forth herein is characterized by an atomic percent ratio of Zr:Ni between about 0.4 and 4.0 as determined by XPS. In certain embodiments, the composition comprising the cathode active material and the oxide bonded to the cathode active material as set forth herein is characterized by an atomic percent ratio of Zr:Ni in a range selected from between about 0.4 and 1.0, between about 1.0 and 1.5, between about 1.5 and 2.0, between about 2.0 and 2.5, between about 2.5 and 3.0, and between about 3.0 and 3.5 as determined by XPS. In certain embodiments, the composition comprising the cathode active material and the oxide bonded to the cathode active material as set forth herein is characterized by an atomic percent ratio of Zr:Ni of about 0.55, about 1.0, about 1.2, about 3.0, or about 3.2. In an alternative embodiment, the composition comprising the cathode active material and the oxide bonded to the cathode active material as set forth herein is characterized by an atomic percent ratio of Zr:Ni between about 0.2 and 3.0, between about 0.2 and 2.5, between about 0.2 and 2, between about 0.2 and 1.5, between about 0.2 and 1, or between about 0.2 and 0.5 as determined by XPS. In an alternative embodiment, the composition comprising the cathode active material and the oxide bonded to the cathode active material as set forth herein is characterized by an atomic percent ratio of Zr:Ni of about 0.38.

In one embodiment, the composition comprising the cathode active material and the oxide bonded to the cathode active material as set forth herein is characterized by an atomic percent ratio of Zr:Ni between about 0.1 and 3.2 as determined by XPS. In one embodiment, the composition comprising the cathode active material and the oxide bonded to the cathode active material as set forth herein is characterized by an atomic percent ratio of Zr:Ni between about 0.5 and 2.5 as determined by XPS. In one embodiment, the composition comprising the cathode active material and the oxide bonded to the cathode active material as set forth herein is characterized by an atomic percent ratio of Zr:Ni between about 0.7 and 2.5 as determined by XPS. In one embodiment, the composition comprising the cathode active material and the oxide bonded to the cathode active material as set forth herein is characterized by an atomic percent ratio of Zr:Ni between about 1.5 and 2.5 as determined by XPS. In certain embodiments, the composition comprising the cathode active material and the oxide bonded to the cathode active material as set forth herein is characterized by an atomic percent ratio of Zr:Ni of about 0.75, about 1.09, about 1.37, about 1,61, or about 2.35.

In one embodiment, the composition comprising the cathode active material and the oxide bonded to the cathode active material as set forth herein is characterized by an atomic percent ratio of the functional group C—CO$_3$:Ni between about 0.3 and 20.0 as determined by XPS. In certain embodiments, the composition comprising the cathode active material and the oxide bonded to the cathode active material as set forth herein is characterized by an atomic percent ratio of the functional group C—CO$_3$:Ni in a range selected from between about 0.4 and 2.0, between about 2.0 and 5.0, between about 5.0 and 10.0, between about 10.0 and 15.0, and between about 15.0 and 20.0 as determined by XPS. In certain embodiments, the composition comprising the cathode active material and the oxide bonded to the cathode active material as set forth herein is characterized by an atomic percent ratio of the functional group C—CO$_3$:Ni of about 0.40, about 6.8, about 7.0, about 8.2, or about 17.2. In an alternative embodiment, the composition comprising the cathode active material and the oxide bonded to the cathode active material as set forth herein is characterized by an atomic percent ratio of the functional group C—CO$_3$:Ni of about 1.6.

In one embodiment, the composition comprising the cathode active material and the oxide bonded to the cathode active material as set forth herein is characterized by an atomic percent ratio of the functional group O-Me:total oxygen between about 0.04 and 0.4 as determined by XPS. In certain embodiments, the composition comprising the cathode active material and the oxide bonded to the cathode active material as set forth herein is characterized by an atomic percent ratio of the functional group O-Me:total oxygen in a range selected from between about 0.04 and 0.08, between about 0.08 and 0.1, between about 0.1 and 0.3, and between about 0.3 and 0.5 as determined by XPS. Herein "Me" refers to methyl and "O-Me" refers to methoxy. In certain embodiments, the composition comprising the cathode active material and the oxide bonded to the cathode active material as set forth herein is characterized by an atomic percent ratio of the functional group O-Me:total oxygen of about 0.057, about 0.08, about 0.18, or about 0.38. In certain embodiments, the composition comprising the cathode active material and the oxide bonded to the cathode active material as set forth herein is characterized by an atomic percent ratio of the functional group O-Me:total oxygen of about 0.21.

Set forth herein is a composition comprising: a cathode active material; and an oxide bonded to the cathode active material, wherein: the oxide comprises LiZr$_2$(PO$_4$)$_3$ and wherein the composition is characterized by an atomic percent ratio of Zr:Ni of about 0.55, an atomic percent ratio of the functional group C—CO$_3$:Ni of about 0.40, and an atomic percent ratio of the functional group O-Me:total oxygen of about 0.4 as measured by XPS.

Set forth herein is a composition comprising: a cathode active material; and an oxide bonded to the cathode active material, wherein: the oxide comprises Li$_3$ZrPO$_6$ and wherein the composition is characterized by an atomic percent ratio of Zr:Ni of about 1.3, an atomic percent ratio of the functional group C—CO$_3$:Ni of about 6.9, and an atomic percent ratio of the functional group O-Me:total oxygen of about 0.08 as measured by XPS.

Set forth herein is a composition comprising: a cathode active material; and an oxide bonded to the cathode active material, wherein: the oxide comprises Li$_5$ZrPO$_7$ and wherein the composition is characterized by an atomic percent ratio of Zr:Ni of about 1.1, an atomic percent ratio of the functional group C—CO$_3$:Ni of about 8.2, and an atomic percent ratio of the functional group O-Me:total oxygen of about 0.08 as measured by XPS.

Set forth herein is a composition comprising: a cathode active material; and an oxide bonded to the cathode active material, wherein: the oxide comprises Li$_7$ZrPO$_8$ and wherein the composition is characterized by an atomic percent ratio of Zr:Ni of about 3.0, an atomic percent ratio of the functional group C—CO$_3$:Ni of about 17.2, and an atomic percent ratio of the functional group O-Me:total oxygen of about 0.06 as measured by XPS.

Set forth herein is a composition comprising: a cathode active material; and an oxide bonded to the cathode active material, wherein: the oxide comprises Li$_2$ZrO$_3$ and wherein the composition is characterized by an atomic percent ratio of Zr:Ni of about 3.2, an atomic percent ratio of the functional group C—CO$_3$:Ni of about 7.0, and an atomic percent ratio of the functional group O-Me:total oxygen of about 0.2 as measured by XPS.

Set forth herein is a composition comprising: a cathode active material; and an oxide bonded to the cathode active material, wherein: the oxide comprises Li$_{24}$Zr$_3$P$_{14}$O$_{53}$ and wherein the composition is characterized by an atomic percent ratio of Zr:Ni of about 0.38, an atomic percent ratio of the functional group C—CO$_3$:Ni of about 1.6, and an atomic percent ratio of the functional group O-Me:total oxygen of about 0.21 as measured by XPS.

Set forth herein is a composition comprising: a cathode active material; and an oxide bonded to the cathode active material, wherein: the oxide comprises LiZr$_2$(PO$_4$)O$_3$ and wherein the composition is characterized by an atomic percent ratio of Zr:Ni between about 0.1 and 2, In one embodiment, the atomic percent ratio of Zr:Ni is about 0.75.

Set forth herein is a composition comprising: a cathode active material; and an oxide bonded to the cathode active material, wherein: the oxide comprises Li$_2$ZrO$_3$ and wherein the composition is characterized by an atomic percent ratio of Zr:Ni between about 1.40 and 4.5, In one embodiment, the atomic percent ratio of Zr:Ni is about 2.4.

Set forth herein is a composition comprising: a cathode active material; and an oxide bonded to the cathode active material, wherein: the oxide comprises Li$_3$ZrPO$_6$ and wherein the composition is characterized by an atomic percent ratio of Zr:Ni between about 0.15 and 2.2, In one embodiment, the atomic percent ratio of Zr:Ni is about 1.4.

Set forth herein is a composition comprising: a cathode active material; and an oxide bonded to the cathode active material, wherein: the oxide comprises Li$_5$PZrO$_7$ and wherein the composition is characterized by an atomic percent ratio of Zr:Ni between about 0.1 and 2.0, In one embodiment, the atomic percent ratio of Zr:Ni is about 1.1.

Set forth herein is a composition comprising: a cathode active material; and an oxide bonded to the cathode active material, wherein: the oxide comprises Li$_7$ZrO$_8$ and wherein the composition is characterized by an atomic percent ratio of Zr:Ni between about 0.14 and 3.2, In one embodiment, the atomic percent ratio of Zr:Ni is about 1.6.

Set forth herein is a composition comprising: a cathode active material; and an oxide bonded to the cathode active material, wherein: the oxide comprises LiZr$_2$(PO$_4$)$_3$ and wherein the composition comprises about 7.5 weight % of lithium, about 0.5 weight % of zirconium, and about 0.3 weight % of phosphorus as measured by ICP analysis and wherein the composition is characterized by an atomic percent ratio of Zr:Ni of about 0.55, an atomic percent ratio of the functional group C—CO$_3$:Ni of about 0.40, and an atomic percent ratio of the functional group O-Me:total oxygen of about 0.4 as measured by XPS.

Set forth herein is a composition comprising: a cathode active material; and an oxide bonded to the cathode active material, wherein: the oxide comprises $Li_2ZrO_3$ and wherein the composition comprises about 7.5 weight % of lithium and about 0.3 weight % of zirconium as measured by ICP analysis and wherein the composition is characterized by an atomic percent ratio of Zr:Ni of about 3.2, an atomic percent ratio of the functional group C—$CO_3$:Ni of about 7.0, and an atomic percent ratio of the functional group O-Me:total oxygen of about 0.2 as measured by XPS.

Set forth herein is a composition comprising: a cathode active material; and an oxide bonded to the cathode active material, wherein: the oxide comprises $Li_3ZrPO_6$ and wherein the composition comprises about 7.3 weight % of lithium, about 0.2 weight % of zirconium, and about 0.15 weight % of phosphorus as measured by ICP analysis and wherein the composition is characterized by an atomic percent ratio of Zr:Ni of about 1.3, an atomic percent ratio of the functional group C—$CO_3$:Ni of about 6.9, and an atomic percent ratio of the functional group O-Me:total oxygen of about 0.08 as measured by XPS.

Set forth herein is a composition comprising: a cathode active material; and an oxide bonded to the cathode active material, wherein: the oxide comprises $Li_5PZrO_7$ and wherein the composition comprises about 7.3 weight % of lithium, about 0.2 weight % of zirconium, and about 0.15 weight % of phosphorus as measured by ICP analysis and wherein the composition is characterized by an atomic percent ratio of Zr:Ni of about 1.1, an atomic percent ratio of the functional group C—$CO_3$:Ni of about 8.2, and an atomic percent ratio of the functional group O-Me:total oxygen of about 0.08 as measured by XPS.

Set forth herein is a composition comprising: a cathode active material; and an oxide bonded to the cathode active material, wherein: the oxide comprises $Li_7ZrPO_8$ and wherein the composition comprises about 7.5 weight % of lithium, about 0.2 weight % of zirconium, and about 0.15 weight % of phosphorus as measured by ICP analysis and wherein the composition is characterized by an atomic percent ratio of Zr:Ni of about 3.0, an atomic percent ratio of the functional group C—$CO_3$:Ni of about 17.2, and an atomic percent ratio of the functional group O-Me:total oxygen of about 0.06 as measured by XPS.

Set forth herein is a composition comprising: a cathode active material; and an oxide bonded to the cathode active material, wherein: the oxide comprises $Li_{24}Zr_3P_{14}O_{53}$ and wherein the composition comprises about 7.5 weight % of lithium, about 0.18 weight % of zirconium, and about 0.26 weight % of phosphorus as measured by ICP analysis and wherein the composition is characterized by an atomic percent ratio of Zr:Ni of about 0.38, an atomic percent ratio of the functional group C—$CO_3$:Ni of about 1.62, and an atomic percent ratio of the functional group O-Me:total oxygen of about 0.21 as measured by XPS.

In one embodiment, including any of the foregoing, the XPS is taken of a loose powder of the composition and the scanned area diameter of the powder taken during the XPS is about 400 μm.

In some other examples, set forth herein is a solid-state cathode comprising a cathode active material and oxide as set forth herein bonded to the cathode active material.

In certain embodiments, including any of the foregoing, the solid-state cathode comprises a solid-state electrolyte selected from the group consisting of $Li_2S$—$SiS_2$, $Li_2S$—$SiS_2$—LiI, $Li_2S$—$SiS_2$—$Li_3MO_4$, $Li_2S$—$SiS_2$—$Li_3MO_3$, $Li_2S$—$P_2S_5$—LiI, and LATS, where M is a member selected from the group consisting of Si, P, Ge, B, Al, Ga, and In.

In certain embodiments, including any of the foregoing, the solid-state cathode comprises LSTPS or LPSI.

In some other examples, set forth herein is a battery comprising a solid-state cathode set forth herein, a solid separator and an anode.

In certain embodiments, including any of the foregoing, the cathode active material in the battery is selected from $LiMPO_4$ (M=Fe, Ni, Co, Mn), $Li_xTi_yO_z$, wherein x is from 0 to 8, y is from 1 to 12, z is from 1 to 24, $LiMn_2O_4$, $LiMn_{2a}Ni_aO_4$, wherein a is from 0 to 2, $LiCoO_2$, $Li(NiCoMn)O_2$, $Li(NiCoAl)O_2$, and a nickel cobalt aluminum oxide.

In certain embodiments, including any of the foregoing, the cathode active material in the battery is selected from $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, x+y+z=1, 0≤x≤1, 0≤y≤1, and 0≤z≤1; and $LiNi_xCo_yAl_zO_2$, wherein x+y+z=1, and 0≤x≤1, 0≤y≤1, and 0≤z≤1. In certain embodiments, including any of the foregoing, the cathode active material is $LiNi_xMn_yCo_zO_2$, x+y+z=1, 0≤x≤1, 0≤y≤1, and 0≤z≤1. In certain examples, the cathode active material is $LiNi_xMn_yCo_zO_2$, x is 0.8, y is 0.1, and z is 0.1. In certain other examples, the coated cathode active material is $LiNi_xMn_yCo_zO_2$, x is 0.6, y is 0.2, and z is 0.2. In some other examples, the coated cathode active material is $LiNi_xMn_yCo_zO_2$, x is 0.5, y is 0.3, and z is 0.2. In other examples, the coated cathode active material is $LiNi_xMn_yCo_zO_2$, x is ⅓, y is ⅓, and z is ⅓. In certain embodiments, the coated cathode active material is selected from $LiMn_2O_4$, $LiCoO_2$, $Li(NiCoMn)O_2$, and $Li(NiCoAl)O_2$.

In certain embodiments, including any of the foregoing, the cathode active material in the battery is selected from $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, x+y+z=1, 0≤x≤1, 0≤y≤1, and 0≤z≤1; and $LiNi_xCo_yAl_zO_2$, wherein x+y+z=1, and 0≤x≤1, 0≤y≤1, and 0≤z≤1.

In one embodiment, including any of the foregoing, the cathode active material in the battery is $LiNi_xMn_yCo_zO_2$, x+y+z=1, 0≤x≤1, 0≤y≤1, and 0≤z≤1.

In one embodiment, including any of the foregoing, the cathode active material in the battery is $LiNi_xMn_yCo_zO_2$, x is 0.8, y is 0.1, and z is 0.1.

In one embodiment, including any of the foregoing, the cathode active material in the battery is $LiNi_xMn_yCo_zO_2$, x is 0.6, y is 0.2, and z is 0.2.

In one embodiment, including any of the foregoing, the cathode active material in the battery is $LiNi_xMn_yCo_zO_2$, x is 0.5, y is 0.3, and z is 0.2.

In certain embodiments, including any of the foregoing, the cathode active material in the battery is $LiNi_xMn_yCo_zO_2$, x+y+z=1, 0.8≤x≤0.97, 0≤y≤0.2, and 0≤z≤0.2. In certain embodiments, including any of the foregoing, the cathode active material in the battery is $LiNi_xMn_yCo_zO_2$, x+y+z=1, 0.8≤x≤0.95, 0≤y≤0.2, and 0≤z≤0.2. In certain embodiments, including any of the foregoing, the cathode active material in the battery is $LiNi_xMn_yCo_zO_2$, x+y+z=1, 0.8≤x≤0.9, 0≤y≤0.2, and 0≤z≤0.2. In certain embodiments, including any of the foregoing, the cathode active material in the battery is $LiNi_xMn_yCo_zO_2$, x+y+z=1, 0.8≤x≤0.85, 0≤y≤0.2, and 0≤z≤0.2. In certain embodiments, including any of the foregoing, the cathode active material in the battery is $LiNi_xMn_yCo_zO_2$, x+y+z=1, 0.8≤x≤0.83, 0≤y≤0.2, and 0≤z≤0.2.

In certain embodiments, including any of the foregoing, the cathode active material is a member of the NMC class of cathode active materials, for example, LiNiCoMnO$_2$. In certain embodiments, including any of the foregoing, the cathode active material is a member of the LFP class of cathode active materials, for example, LiFePO$_4$/C. In certain embodiments, including any of the foregoing, the cathode active material is a member of the LNMO class of cathode active materials, for example, LiNi$_{0.5}$Mn$_{1.5}$O$_4$ or LiNi$_{0.5}$Mn$_{1.5}$O$_2$. In certain embodiments, including any of the foregoing, the cathode active material is a member of the NCA class of cathode active materials, for example, LiMn$_2$O$_4$. In certain embodiments, including any of the foregoing, the cathode active material is a member of the LMO class of cathode active materials, for example, LiMn$_2$O$_4$. In certain embodiments, including any of the foregoing, the cathode active material is a member of the LCO class of cathode active materials, for example, LiCoO$_2$.

In one embodiment, including any of the foregoing, the cathode active material in the battery is LiNi$_x$Mn$_y$Co$_z$O$_2$, x is ⅓, y is ⅓, and z is ⅓.

In one embodiment, including any of the foregoing, the cathode active material in the battery is selected from LiMn$_2$O$_4$, LiCoO$_2$, Li(NiCoMn)O$_2$, and Li(NiCoAl)O$_2$.

In certain embodiments, including any of the foregoing, the cathode active material in the battery is selected from LiMPO$_4$ (M=Fe, Ni, Co, Mn), Li$_x$Ti$_y$O$_z$, wherein x is from 0 to 8, y is from 1 to 12, z is from 1 to 24, LiMn$_{2a}$Ni$_a$O$_4$, wherein a is from 0 to 2, and nickel cobalt aluminum oxides.

Non-Limiting Embodiments

The present disclosure provides at least the following non-limiting embodiments:

(a) A composition comprising:
  a cathode active material; and
  at least one oxide bonded to the cathode active material;
  wherein the at least one oxide bonded to the cathode active material comprises lithium (Li), oxygen (O), and at least one of zirconium (Zr) and phosphorus (P);
  wherein the molar ratios of Li, Zr, P, and O are represented by the formula Li$_x$Zr$_y$P$_a$O$_d$, wherein 0.05≤x≤25.0, 0≤y≤5.0, 0≤a≤16.0; and 2.0≤d≤55.0; and
  wherein subscripts x, y, a, and d, are selected so the at least one oxide is charge neutral and y and a are not both zero; and
  wherein the composition has a ratio of Zr:Ni, as measured by x-ray photoelectron spectroscopy (XPS) of 0.3 to 3.2.

(b) The composition of (a) wherein the molar ratios of Li, Zr, P, and O are represented by the formula Li$_x$Zr$_y$P$_a$O$_d$, wherein 0.05≤x≤7.0, 0≤y≤3.0, 0≤a≤6.0; and 2.0≤d≤20.0;

(c) A composition comprising:
  a cathode active material having a surface and an oxide bonded to the surface;
  wherein the oxide is selected from the group consisting of:
  amorphous lithium zirconium oxide;
  amorphous lithium zirconium phosphorus oxide; and combinations thereof;
  wherein the composition has a ratio of Zr:Ni, as measured by x-ray photoelectron spectroscopy (XPS) of 0.3 to 3.2.

(d) The composition of claim (c) comprising:
  a cathode active material having a surface and an oxide bonded to the surface;
  wherein the oxide is selected from the group consisting of:
  LiZr$_2$(PO$_4$)$_3$;
  Li$_2$ZrO$_3$;
  Li$_3$ZrPO$_6$;
  Li$_5$PZrO$_7$;
  Li$_7$ZrPO$_8$;
  Li$_{24}$Zr$_3$P$_{14}$O$_{53}$; and
  combinations thereof;
  wherein the composition has a ratio of Zr:Ni, as measured by x-ray photoelectron spectroscopy (XPS) of 0.3 to 3.2.

(e) The composition of any one of embodiments (a)-(d), wherein the oxide is amorphous.

(f) The composition of any one of embodiments (a)-(e), wherein the oxide is crystalline.

(g) The composition of any one of embodiments (a)-(b) and (e)-(f), wherein at least subscript x and subscript d are not 0.

(h) The composition of any one of embodiments (a)-(b) and (e)-(g), wherein subscript y is not 0.

(i) The composition of embodiment any one of embodiments (a)-(b) and (e)-(g), wherein subscript y and subscript a are not 0.

(j) The composition of any one of embodiments (a)-(b) and (e)-(i), wherein at least one of subscript x or subscript a is not equal to 0.

(k) The composition of any one of embodiments (a)-(b) and (e)-(f), wherein the oxide comprises a compound of the formula Li$_x$Zr$_y$P$_a$O$_d$, wherein 0.05≤x≤1.5, 1≤y≤3, 1.0≤a≤6.0; and 2.0≤d≤20.0.

(l) The composition of any one of embodiments (a)-(b) and (e)-(f), wherein the oxide comprises a compound of the formula Li$_x$Zr$_y$P$_a$O$_d$, wherein 0.05≤x≤1.5, 1≤y≤3, 2.0≤a≤4.0; and 10.0≤d≤14.0.

(m) The composition of any one of embodiments (a)-(b) and (e)-(f), wherein the oxide comprises a compound of the formula Li$_x$Zr$_y$P$_a$O$_d$, wherein 20.0≤x≤25.0, 2.0≤y≤5.0, 10.0≤a≤16.0; and 50.0≤d ≤55.0.

(n) The composition of any one of embodiments (a)-(b) and (e)-(f), wherein the oxide a compound of the formula Li$_x$Zr$_y$O$_d$, wherein 1.0≤x≤3, 0≤y≤2, and 2.0≤d≤5.0.

(o) The composition of any one of embodiments (a)-(b) and (e)-(f), wherein the oxide a compound of the formula Li$_x$P$_a$O$_d$, wherein 2.0≤x≤4, 0≤a≤2.0, and 2.0≤d≤5.0.

(p) The composition of any one of embodiments (a)-(b) and (d)-(f), wherein the oxide comprises a compound selected from LiZr$_2$(PO$_4$)$_3$, Li$_3$ZrPO$_6$, Li$_5$PZrO$_7$, Li$_7$ZrPO$_8$, and Li$_{24}$Zr$_3$P$_{14}$O$_{53}$.

(q) The composition of embodiment (p), wherein the oxide comprises LiZr$_2$(PO$_4$)$_3$.

(r) The composition of any one of embodiments (a)-(b) and (d)-(f), wherein the oxide comprises Li$_3$PO$_4$.

(s) The composition of any one of embodiments (a)-(f), wherein the oxide comprises Li$_2$ZrO$_3$.

(t) The composition of any one of embodiments (a)-(s), wherein the oxide is a product of a reaction mixture of 1) LiOH; and 2) a zirconium precursor and/or a phosphorus precursor.

(u) The composition of embodiment (t), wherein the molar ratio of Li:Zr in the reaction mixture is a ratio in the range of about 1:3 to 1:1.

(v) The composition of embodiment (t), wherein the molar ratio of Li:Zr in the reaction mixture is in the range of about 1:1 to 3:1.

(w) The composition of embodiment (t), wherein the molar ratio of Li:Zr in the reaction mixture is a ratio in the range of about 4:1 to 6:1.

(x) The composition of embodiment (t), wherein the molar ratio of Li:Zr in the reaction mixture is in the range of about 6:1 to 8:1.

(y) The composition of embodiment (t), wherein the molar ratio of Li:Zr in the reaction mixture is in the range of about 8:1 to 10:1.

(z) The composition of any one of embodiments (t)-(y), wherein the molar ratio of Li:P in the reaction mixture is a ratio in the range of about 3:1 to 1:1.

(aa) The composition of any one of embodiments (t)-(y), wherein the molar ratio of Li:P in the reaction mixture is a ratio in the range of about 1:3 to 1:1.

(bb) The composition of any one of embodiments (t)-(y), wherein the molar ratio of Li:P in the reaction mixture is in the range of about 5:1 to 7:1.

(cc) The composition of any one of embodiments (t)-(y), wherein the molar ratio of Li:P in the reaction mixture is a ratio in the range of about 9:1 to 11:1.

(dd) The composition of any one of embodiments (t)-(y), wherein the molar ratio of Li:P in the reaction mixture is about 13:1 to 15:1.

(ee) The composition of any one of embodiments (t)-(dd), wherein the molar ratio of Zr:P in the reaction mixture is a ratio in the range of about 3:16 to 3:10.

(ff) The composition of any one of embodiments (t)-(dd), wherein the molar ratio of Zr:P in the reaction mixture is a ratio in the range of about 1.3:1 to 1:1.

(gg) The composition of any one of embodiments (t)-(dd), wherein the molar ratio of Zr:P in the reaction mixture is in the range of about 1:1 to 3:1.

(hh) The composition of any one of embodiments (t)-(dd), wherein the molar ratio of Zr:P in the reaction mixture is a ratio of about 1.3:1.

(ii) The composition of any one of embodiments (t)-(dd), wherein the molar ratio of Zr:P in the reaction mixture is a ratio of 2.0.

(jj) The composition of embodiment (t), wherein the molar ratio in the reaction mixture of Li and Zr:P is about 70:30 to 65:35.

(kk) The composition of embodiment (t), wherein the molar ratio in the reaction mixture of Li and Zr:P is about 75:25 to 80:20.

(ll) The composition of embodiment (t), wherein the molar ratio in the reaction mixture of Li and Zr:P is about 80:20 to 90:10.

(mm) The composition of embodiment (t), wherein the molar ratio in the reaction mixture of Li and Zr:P is about 90:10 to 85:15.

(nn) The composition of embodiment (t), wherein the molar ratio in the reaction mixture of Li and Zr:P is about 95:5 to 90:10.

(oo) The composition of embodiment (t), wherein the molar ratio in the reaction mixture of Li and Zr:P is about 90:10 to 95:5.

(pp) The composition of any one of embodiments (a)-(b), (e)-(m), (o)-(r), and (t)-(oo), wherein the oxide is a product of a reaction mixture of LiOH and a phosphorus precursor.

(qq) The composition of any one of embodiments (a)-(n), (p)-(q), and (s)-(oo), wherein the oxide is a product of a reaction mixture of LiOH and a zirconium precursor.

(rr) The composition of any one of embodiments (r)-(oo) and (qq), wherein the zirconium precursor is selected from zirconium propoxide, zirconium ethoxide, zirconium methoxide, and zirconium butoxide.

(ss) The composition of embodiment (rr), wherein the zirconium precursor is zirconium butoxide.

(tt) The composition of any one of embodiment (r)-(pp), wherein the phosphorus precursor is selected from $P_2O_5$, $H_3PO_4$, $(NH_4)_3PO_4$.

(uu) The composition of embodiment (tt), wherein the phosphorus precursor is $P_2O_5$.

(vv) The composition of any one of embodiment (a)-(uu), wherein the oxide is lattice-matched with the cathode active material.

(ww) The composition of embodiment (vv), wherein the oxide has a surface which is amorphous.

(xx) The composition of embodiment (vv) or (ww), wherein the oxide has a surface which is crystalline.

(yy) The composition of any one of embodiment (a)-(e) and (f)-(ww), having an interface substantially as show in FIG. 3, FIG. 4, FIG. 5, or FIG. 6.

(zz) The composition of any one of embodiment (a)-(d), (f)-(vv) and (xx), having an interface substantially as show in FIG. 2, FIG. 4, FIG. 5, or FIG. 6.

(aaa) The composition of any one of embodiments (a)-(zz), wherein the cathode active material is selected from $LiMPO_4$ (M=Fe, Ni, Co, Mn); $Li_xTi_yO_z$, wherein x is from 0 to 8, y is from 1 to 12, z is from 1 to 24; $LiMn_{2a}Ni_aO_4$, wherein a is from 0 to 2; a nickel cobalt aluminum oxide; $LiNi_xMn_yCo_zO_2$, $x+y+z=1$, $0 \leq x \leq 1$, $0 \leq y \leq 1$, and $0 \leq z \leq 1$; and $LiNi_xCo_yAl_zO_2$, wherein $x+y+z=1$, and $0 \leq x \leq 1$, $0 \leq y \leq 1$, and $0 \leq z \leq 1$.

(bbb) The composition of any one of embodiments (a)-(aaa), wherein the cathode active material is $LiNi_xMn_yCo_zO_2$, $x+y+z=1$, $0 \leq x \leq 1$, $0 \leq y \leq 1$, and $0 \leq z \leq 1$ and wherein $x+y+z=1$.

(ccc) The composition of embodiment (bbb), wherein the cathode active material is $LiNi_xMn_yCo_zO_2$, x is 0.8, y is 0.1, and z is 0.1.

(ddd) The composition of embodiment (bbb), wherein the cathode active material is $LiNi_xMn_yCo_zO_2$, x is 0.6, y is 0.2, and z is 0.2.

(eee) The composition of embodiment (bbb), wherein the cathode active material is $LiNi_xMn_yCo_zO_2$, x is 0.5, y is 0.3, and z is 0.2.

(fff) The composition of embodiment (bbb), wherein the cathode active material is $LiNi_xMn_yCo_zO_2$, x is ⅓, y is ⅓, and z is ⅓.

(ggg) The composition of embodiment (bbb), wherein the cathode active material is $LiNi_xMn_yCo_zO_2$, $x+y+z=1$, $0.8 \leq x \leq 0.97$, $0 \leq y \leq 0.2$, and $0 \leq z \leq 0.2$.

(hhh) The composition of embodiment (bbb), wherein the cathode active material is $LiNi_xMn_yCo_zO_2$, $x+y+z=1$, $0.8 \leq x \leq 0.90$, $0 \leq y \leq 0.2$, and $0 \leq z \leq 0.2$.

(iii) The composition of embodiment (bbb), wherein the cathode active material is $LiNi_xMn_yCo_zO_2$, $x+y+z=1$, $0.8 \leq x \leq 0.85$, $0 \leq y \leq 0.2$, and $0 \leq z \leq 0.2$.

(jjj) The composition of embodiment (bbb), wherein the cathode active material is $LiNi_xMn_yCo_zO_2$, $x+y+z=1$, $0.8 \leq x \leq 0.83$, $0 \leq y \leq 0.2$, and $0 \leq z \leq 0.2$.

(kkk) The composition of embodiment (bbb), wherein the cathode active material is $Li(NiCoMn)O_2$.

(lll) The composition of any one of embodiments (a)-(zz), wherein the cathode active material is selected from a member from the NMC class of cathode active materials; LFP class of cathode active materials; LNMO class of cathode active materials; NCA class of cathode active materials; LMO class of cathode active materials; LCO class of cathode active materials.
(mmm) The composition of any one of embodiments (a)-(n), (p)-(q), (s)-(oo) and (qq)-(lll), characterized by an atomic percent ratio of Zr:Ni as determined by XPS between about 0.4 to 4.
(nnn) The composition of any one of embodiments (a)-(n), (p)-(q), (s)-(oo) and (qq)-(lll), characterized by an atomic percent ratio of Zr:Ni as determined by XPS between about 0.2 to 2.
(ooo) The composition of embodiment (mmm), characterized by an atomic percent ratio of Zr:Ni of about 0.55, about 1.1, about 1.3, about 3.0, or about 3.2.
(ppp) The composition of embodiment (nnn), characterized by an atomic percent ratio of Zr:Ni of about 0.38.
(qqq) The composition of embodiment (mmm), characterized by an atomic percent ratio of Zr:Ni between about 0.5 and 2.5.
(rrr) The composition of embodiment (mmm), characterized by an atomic percent ratio of Zr:Ni between about 0.7 and 1.5.
(sss) The composition of embodiment (mmm), characterized by an atomic percent ratio of Zr:Ni between about 1.5 and 2.5.
(ttt) The composition of embodiment (mmm), characterized by an atomic percent ratio of Zr:Ni of about 0.75, 1.09, 1.37, 1.61, and 2.35.
(uuu) The composition of any one of embodiments (a)-(ttt), characterized by an atomic percent ratio of C—$CO_3$:Ni as determined by XPS of about 0.3 to 20.
(vvv) The composition of embodiment (uuu), characterized by an atomic percent ratio of C—$CO_3$:Ni as determined by XPS of about 0.4, about 6.8, about 7.0, about 8.2, or about 17.2.
(www) The composition of embodiment (uuu), characterized by an atomic percent ratio of C—$CO_3$:Ni as determined by XPS of about 1.6.
(xxx) The composition of any one of embodiments (a)-(www), characterized by an atomic percent ratio of oxygen in O—$CH_3$:total oxygen in the oxide bonded to the cathode active materials determined by XPS of about 0.04 to 0.4.
(yyy) The composition of embodiment (xxx), characterized by an atomic percent ratio of oxygen in O—$CH_3$:total oxygen as determined by XPS of about 0.057, about 0.080, about 0.19, or about 0.39.
(zzz) The composition of embodiment (xxx), characterized by an atomic percent ratio of oxygen in O—$CH_3$:total oxygen as determined by XPS of about 0.21.
(aaaa) The composition of any one of embodiments (a)-(zzz), wherein the composition comprises between about 5 weight % and 10 weight % of lithium as measured by inductively coupled plasma (ICP) analysis.
(bbbb) The composition of any one of embodiments (a)-(n), (p)-(q), (s)-(oo) and (qq)-(aaaa), wherein the composition comprises less than about 1 weight % of zirconium as measured by inductively coupled plasma (ICP) analysis.
(cccc) The composition of any one of embodiments (a)-(n), (p)-(q), (s)-(oo) and (qq)-(aaaa), wherein the composition comprises at least about 0.1 weight % of zirconium as measured by inductively coupled plasma (ICP) analysis.
(dddd) The composition of any one of embodiments (a)-(n), (p)-(q), (s)-(oo) and (qq)-(aaaa), wherein the composition comprises between about 0.1 weight % and 0.7% of zirconium as measured by inductively coupled plasma (ICP) analysis.
(eeee) The composition of any one of embodiments (a)-(m), (o)-(r), (t)-(pp), and (rr)-(dddd), wherein the composition comprises less than about 0.5 weight % of phosphorus as measured by inductively coupled plasma (ICP) analysis.
(ffff) The composition of any one of embodiments (a)-(m), (o)-(r), (t)-(pp), and (rr)-(dddd), wherein the composition comprises at least 0.1 weight % of phosphorus as measured by inductively coupled plasma (ICP) analysis.
(gggg) The composition of any one of embodiments (a)-(m), (o)-(r), (t)-(pp), and (rr)-(dddd), wherein the composition comprises between about 0.08 weight % and 0.4% of phosphorus as measured by inductively coupled plasma (ICP) analysis.
(hhhh) The composition of any one of embodiments (a)-(gggg), wherein the composition comprises less than about 65 weight % of manganese, cobalt, and nickel as measured by inductively coupled plasma (ICP) analysis.
(iiii) The composition of any one of embodiments (a)-(gggg), wherein the composition comprises at least about 55 weight % of manganese, cobalt, and nickel as measured by inductively coupled plasma (ICP) analysis.
(jjjj) The composition of any one of claims embodiments (a)-(m), (o)-(r), (t)-(pp), and (rr)-(iiii), wherein the ratio of phosphorus to manganese, cobalt, and nickel (P:Mn+Co+Ni) is at least about 0.001 by weight percent as measured by inductively coupled plasma (ICP) analysis.
(kkkk) The composition of any one of claims (a)-(m), (o)-(r), (t)-(pp), and (rr)-(jjjj), wherein the ratio of zirconium to manganese, cobalt, and nickel (Zr:Mn+Co+Ni) is at least about 0.002 by weight percent as measured by inductively coupled plasma (ICP) analysis.
(llll) The composition of any one of embodiments (a)-(kkkk), wherein the ratio of lithium to manganese, cobalt, and nickel (Li:Mn+Co+Ni) is at least about 0.08 by weight percent as measured by inductively coupled plasma (ICP) analysis.
(mmmm) An oxide having the following formula, $Li_xZr_yP_aO_d$, wherein $0.05 \le x \le 25.0$, $0 \le y \le 5.0$, $0 \le a \le 16.0$; and $2.0 \le d \le 55.0$; wherein the formula is charge neutral and wherein the oxide is bonded to cathode active material selected from lithium cobalt oxide (LCO), lithium nickel cobalt aluminum oxide (NCA), lithium nickel manganese cobalt oxide (NMC), lithium iron phosphate (LFP), and combinations thereof.
(nnnn) The oxide of embodiment (mmmm), wherein the compound has the formula $Li_xZr_yP_aO_d$, wherein $20.0 \le x \le 25.0$, $2.0 \le y \le 5.0$, $10.0 \le a \le 16.0$; and $50.0 \le d \le 55.0$.
(oooo) An oxide having the following formula, $Li_xZr_yP_aO_d$, wherein $0.5 \le x \le 7$, $0 \le y \le 3$, $0 \le a \le 6$; and $2.0 \le d \le 20$; wherein the formula is charge neutral and wherein the oxide is bonded to cathode active material selected from lithium cobalt oxide (LCO), lithium nickel cobalt aluminum oxide (NCA), lithium nickel manganese cobalt oxide (NMC), lithium iron phosphate (LFP), and combinations thereof.
(pppp) The oxide of embodiment (oooo), wherein the oxide comprises a compound of formula $Li_xZr_yP_aO_d$, wherein $0.05 \le x \le 1.5$, $1 \le y \le 3$, $1.0 \le a \le 6.0$; and $2.0 \le d \le 20$.

(qqqq) The oxide of embodiment (mmmm), wherein the compound is $Li_{24}Zr_3Pi_4O_{53}$.
(rrrr) The oxide of embodiment (oooo), wherein the compound is selected from $LiZr_2(PO_4)_3$, $Li_3ZrPO_6$, $Li_5PZrO_7$, and $Li_7ZrPO_8$.
(ssss) The oxide of embodiment (rrrr), wherein the compound is $LiZr_2(PO_4)_3$.
(tttt) The oxide of embodiment (rrrr), wherein the compound is $Li_3PO_4$.
(uuuu) The oxide of embodiment (rrrr), wherein the compound is $Li_2ZrO_3$.
(vvvv) The oxide of any one of embodiments (mmmm)-(uuuu), wherein the cathode active material is lithium nickel manganese cobalt oxide (NMC).
(wwww) The composition of any one of embodiments (a)-(llll) or the oxide of any one of embodiments (mmmm)-(vvvv), wherein the oxide bonded to the cathode active material is a coating on the cathode active material.
(xxxx) A solid-state cathode comprising the composition of any one of embodiments (a)-(llll) or the oxide of any one of embodiments (mmmm)-(vvvv).
(yyyy) A solid-state battery comprising the solid-state cathode of embodiment (xxxx), a solid-state electrolyte, and an anode active material is selected from lithium metal, lithium titanate ($Li_2TiO_3$, LTO), carbon/graphite (C), silicon (Si)/silicon oxide, lithium (Li), zinc (Zn), aluminum (Al), magnesium (Mg), alloys thereof, and combinations thereof.
(zzzz) The composition of any one of embodiments (a)-(llll), wherein the oxide bonded to the cathode active material is a coating on the cathode active material.
(aaaaa) The composition of embodiment (zzzz), wherein the coating is continuous.
(bbbbb) The composition of embodiment (zzzz), wherein the coating is discontinuous.
(ccccc) The composition of any one of embodiments (zzzz-(bbbbb) wherein the coating comprises crystalline domains as determined by TEM analysis.
(ddddd) The composition of any one of embodiments (zzzz)-(ccccc) wherein the coating comprises amorphous domains as determined by TEM analysis.
(eeeee) The composition of any one of embodiments (zzzz)-(ddddd), wherein the coating comprises crystalline domains and amorphous domains as determined by TEM analysis.
(fffff) The composition of embodiment (eeeee), wherein the crystalline domains are in contact with the cathode and the amorphous domains are in contact with the crystalline domains.
(ggggg) The composition of any one of embodiments (zzzz)-(fffff), wherein the coating has a thickness, T, as determined by TEM analysis, that is 0.7 nm≤T≤20 nm.
(hhhhh) The composition of any one of embodiments (zzzz)-(fffff), wherein the coating has a thickness, T, as determined by TEM analysis, that is 1 nm≤T≤20 nm.
(iiiii) The composition of any one of embodiments (zzzz)-(fffff), wherein the coating has a thickness, T, as determined by TEM analysis, that is less than 1 nm.
(jjjjj) The composition of embodiment (ggggg), wherein T is about 1 nm, about 5 nm, or about 10 nm.
(kkkkk) The composition of embodiment (ggggg), wherein T is between about 0.8 nm and 10 nm.
(lllll) The composition of embodiment (ggggg), wherein T is between about 0.8 nm and 5 nm.
(mmmmm) The composition of embodiment (ggggg), wherein T is between about 0.8 nm and 2.5 nm.
(nnnnn) The composition of any one of embodiments (eeeee)-(mmmmm) wherein the thickness of the crystalline domain is between about 0.8 nm and 5 nm and the thickness of the amorphous domain is between about 0.8 nm and 5 nm.
(ooooo) The composition of any one of embodiments (eeeee)-(mmmmm) wherein the thickness of the crystalline domain is between about 1 nm and 3 nm and the thickness of the amorphous domain is between about 1 nm and 4 nm.
(ppppp) The composition of any one of embodiments (eeeee)-(ooooo) wherein the thickness of the crystalline domain is less than the thickness of the amorphous domain.
(qqqqq) The composition of any one of any one of embodiments (zzzz)-(ppppp) wherein the coating is not thicker than the TEM can detect.
(rrrrr) The composition of any one of embodiments (zzzz)-(qqqqq), wherein the coating crystalline domains lattice match the crystalline domains of the cathode active material, as determined by TEM analysis.
(sssss) The composition of any one of embodiments (zzzz)-(qqqqq), wherein the coating crystalline domains do not lattice match the crystalline domains of the cathode active material, as determined by TEM analysis.
(ttttt) The composition of any one of embodiments (zzzz)-(sssss), wherein the coating further comprises carbonate.
(uuuuu) The composition of any one of embodiments (zzzz)-(ttttt), further comprising a second coating in contact with the coating.
(vvvvv) The composition of embodiment (uuuuu), wherein the second coating has a chemical formula which is not the same as the chemical formula of the coating.
(wwwww) The composition of embodiment (vvvvv), wherein the second coating has the chemical formula:
$Li_xZr_yO_z$, wherein 0≤x≤1.6, 0.2≤y≤1.0, and 2≤z≤1.2;
$Li_xP_yO_z$, wherein 0.6≤x≤1.5, 0.5≤y≤1.4, and 2.0≤z≤3.7;
$Li_xZr_y(PO_4)_z$, wherein 0.05≤x≤1.5, 1≤y≤3, and 2.0≤z≤4.0;
$Li_xC_yO_z$, wherein 0.4≤x≤1.8, 0.1≤y≤1, and 1≤z≤1.8;
$Li_xB_yO_z$, wherein 0.2≤x≤0.75, 0.5≤y≤1.6, and 1.5≤z≤2.6;
$Li_xIn_yCl_z$, wherein 2≤x≤4, 0≤y≤2, and 5≤z≤7;
$Li_xZr_y(PO_4)_z$, wherein 0.05≤x≤1.5, 1≤y≤3, and 2.0≤z≤4.0;
$Li_2CO_3$; $Li_3BO_3$; $Li_3B_{11}O_{18}$; $Li_2ZrO_3$; $Li_3PO_4$; $Li_2SO_4$; $LiNbO_3$; $Li_4Ti_5O_{12}$; $LiTi_2(PO_4)_3$;
$LiZr_2(PO_4)_3$; LiOH; LiF; $Li_4ZrF_8$; $Li_3Zr_4F_{19}$; $Li_3TiF_6$; $LiAlF_4$; $LiYF_4$; $LiNbF_6$; $ZrO_2$;
$Al_2O_3$; $TiO_2$; $ZrF_4$; $AlF_3$; $TiF_4$; $YF_3$; $NbF_5$; and combinations thereof.
(xxxxx) A process for making a composition of any one of embodiments (a)-(llll), (wwww), and (zzzz)-(wwwww); comprising the following steps: 1) coating a cathode active material with a solution of a) LiOH and b) a zirconium precursor and/or a phosphorus precursor; 2) removing the solvent from the solution to provide a cathode active material bonded to the oxide of formula $Li_xZr_yP_AO_D$; and, 3) heating the cathode active material under dry air conditions to form a coated cathode active material.

(yyyyy) The process of embodiment (xxxxx), wherein the zirconium precursor is $Zr(OBu)_4$ and the phosphorus precursor is $P_2O_5$.

(zzzzz) The process of (xxxxx) and (yyyyy), wherein the heating is at a temperature of about 375° C. for about 1 hour.

Process for Making

Set forth herein is a process for making a coated cathode active material wherein an oxide is selected from amorphous lithium zirconium oxide, amorphous lithium zirconium phosphorus oxide, and a combination thereof; comprising the following steps: 1) coating a cathode active material with a solution of a) LiOH and b) a zirconium precursor and/or a phosphorus precursor; 2) removing the solvent from the solution to provide a cathode active material bonded to the oxide selected from amorphous lithium zirconium oxide, amorphous lithium zirconium phosphorus oxide, and a combination thereof; and, 3) heating the cathode active material under dry air conditions to form a coated cathode active material.

Also set forth herein is a process for making a coated cathode active material wherein an oxide comprising a compound of the formula $Li_xZr_yP_AO_D$ is bonded to the cathode active material, wherein $0.05 \leq x \leq 25.0$, $0 \leq y \leq 5.0$, $0 \leq a \leq 16.0$; and $2.0 \leq d \leq 55.0$ and wherein the formula is charge neutral; comprising the following steps: 1) coating a cathode active material with a solution of a) LiOH and b) a zirconium precursor and/or a phosphorus precursor; 2) removing the solvent from the solution to provide a cathode active material bonded to the oxide of formula $Li_xZr_yP_AO_D$; and, 3) heating the cathode active material under dry air conditions to form a coated cathode active material.

Also set forth herein is a process for making a coated cathode active material wherein an oxide comprising a compound of the formula $Li_xZr_yP_AO_D$ is bonded to the cathode active material, wherein $0.5 \leq x \leq 7$, $0 \leq y \leq 2$, $0 \leq a \leq 3$; and $2.0 \leq D \leq 20$ and wherein the formula is charge neutral; comprising the following steps: 1) coating a cathode active material with a solution of a) LiOH and b) a zirconium precursor and/or a phosphorus precursor; 2) removing the solvent from the solution to provide a cathode active material bonded to the oxide of formula $Li_xZr_yP_AO_D$; and, 3) heating the cathode active material under dry air conditions to form a coated cathode active material.

In some examples, including any of the foregoing, the heating includes annealing in a controlled atmosphere. In some examples, that controlled atmosphere comprises Ar, $N_2$, $H_2$, $H_2O$, or a combination thereof.

In one embodiment, including any of the foregoing, the phosphorus precursor is selected from $P_2O_5$, $H_3PO_4$, and $(NH_4)_3PO_4$, $(NH_3)_3PO_4$. In one embodiment, including any of the foregoing, the zirconium precursor is zirconium butoxide ($Zr(OBu)_4$), zirconium propoxide ($Zr(OPr)_4$), zirconium ethoxide ($Zr(OEt)_4$), and zirconium methoxide ($Zr(OMe)_4$). In one embodiment, including any of the foregoing, the lithium precursor is selected from lithium hydroxide (LiOH) lithium ethoxide (LiOEt), lithium methoxide (LiOMe), metallic lithium. In one embodiment, including any of the foregoing, the zirconium precursor and/or phosphorus precursor is a sol-gel precursor, such as a zirconium alkoxide or a phosphorus alkoxide precursor. In one embodiment, the phosphorus precursor is $P_2O_5$. In one embodiment, the zirconium precursor is $Zr(OBu)_4$. In one embodiment, the lithium precursor is LiOH.

In one embodiment, the zirconium precursor is $Zr(OBu)_4$, the phosphorus precursor is $P_2O_5$, and the lithium precursor is LiOH.

In certain embodiments, a source of LiOH includes, but is not limited to LiOH. In certain embodiments, a source of LiOH includes, but is not limited to a lithium-containing compound which is soluble in an alcohol, for example methanol or ethanol.

In certain embodiments, including any of the foregoing, the heating is at a temperature of at most 350° C. for at least 10 minutes.

In certain embodiments, including any of the foregoing, the heating is at a temperature of at most 350° C. for at least 30 minutes.

In certain embodiments, including any of the foregoing, the heating is at a temperature of at most 375° C. for at least 30 minutes.

In certain embodiments, including any of the foregoing, the heating is at a temperature of about 375° C. for about 1 hour.

In certain embodiments, including any of the foregoing, the annealing is at a temperature of at most 350° C. for at least 10 minutes.

In certain embodiments, including any of the foregoing, the annealing is at a temperature of at most 350° C. for at least 30 minutes.

In certain embodiments, including any of the foregoing, the annealing is at a temperature of at most 375° C. for at least 30 minutes.

In certain embodiments, including any of the foregoing, the annealing is at a temperature of about 375° C. for about 1 hour.

In certain embodiments, including any of the foregoing, the solvent is an alcohol, including but not limited to, methanol or ethanol.

Additionally, the coated active materials can be formed using any suitable method for the formation of a coating on an active materials known in the art. Common techniques for the preparation of coated active materials include, but are not limited to, a wet process wherein a rotary evaporator is used to remove a solvent from a coating solution which includes active material particles; spray drying wherein a solution of coating precursors and active material is atomized through a spray nozzle by a flow of compressed gas and the resulting aerosol is dried; dry coating wherein solid powders of the coating precursors are combined with active materials to form a combination of the two; mechano fusion mixer in which high energy milling is used to coat an active material with a coating; and, atomic layer deposition (ALD), a vapor phase coating deposition technique; or a fluidized bed reactor. Other techniques for forming coated active materials include sputter deposition and laser ablation.

For example, one way to coat active materials is shown in FIG. 1. As shown in FIG. 1, a fan 101 is used to process air through a heater 102 and a HEPA filter 103. This processed air enters a drying chamber 104. The drying chamber is also connected to a feed pump 105. A liquid solution comprising active material and coating precursors is pumped through the feed pump 105 to the drying chamber 104 where it is atomized through a spray nozzle 106 using a carrier gas that is pumped into the drying chamber through inlet 107. The resulting droplets 108 are dried in the drying chamber 104. The dried material then passes into a cyclone 109 where the coated active materials are collected in vessel 110. The dry powder product is filtered through a Fines filter 111. In some examples, air pulses are used via input 112. The air is filtered through a second HEPA filter 103.

EXAMPLES

Reagents, chemicals, and materials were commercially purchased unless specified otherwise to the contrary.

The Lithium Nickel Cobalt Manganese Oxide (NMC) used in the Examples was $LiNi_{0.85}Co_{0.1}Mn_{0.05}O_2$ unless specified otherwise.

Example 1: Preparation of NMC with LZP Bonded to the Surface of the NMC

Six NMC cathode active materials with different LZP oxides attached thereto were prepared by the process described below. The starting material molar ratios for each synthesized oxide and the resulting molar ratio for each synthesized oxide are described in Table 1. The synthesis conditions, including the amount of each reagent and the reaction conditions are provided in Table 2 and Table 3.

TABLE 1

Starting Material and Molar Ratio LZP Coatings

| | | Starting Material Molar Ratio | | | Molar Ratio | | | |
|---|---|---|---|---|---|---|---|---|
| | | LiOH | Zr(OBu)$_4$ | P$_2$O$_5$ | Li | Zr | P | O |
| 1 | LiZr$_2$(PO$_4$)$_3$ | 22.22 | 44.44 | 33.34 | 1 | 2 | 3 | 12 |
| 2 | Li$_3$PO$_4$ | 85.71 | 0 | 14.29 | 3 | 0 | 1 | 4 |
| 3 | Li$_2$ZrO$_3$ | 66.67 | 33.33 | 0 | 2 | 1 | 0 | 3 |
| 4 | Li$_3$ZrPO$_6$ | 66.66 | 22.22 | 11.12 | 3 | 1 | 1 | 6 |
| 5 | Li$_5$PZrO$_7$ | 76.92 | 15.38 | 7.7 | 5 | 1 | 1 | 7 |
| 6 | Li$_7$ZrPO$_8$ | 82.35 | 11.76 | 5.89 | 7 | 1 | 1 | 8 |
| 7 | Li$_{24}$Zr$_3$P$_{14}$O$_{53}$ | 70.6 | 8.82 | 20.6 | 24 | 3 | 14 | 56 |

TABLE 2

Starting Material and Solvent Amounts

| | LiOH (g) | Zr(OBu)$_4$ (mL) | P$_2$O$_5$ (g) | Ethanol (g) | NMC (g) |
|---|---|---|---|---|---|
| 1 | 0.031 | 1.175 | 0.274 | 333 | 50 |
| 2 | 0.552 | 0 | 0.547 | 700 | 100 |
| 3 | 0.375 | 3.6 | 0 | 789 | 150 |
| 4 | 0.185 | 0.588 | 0.182 | 666 | 50 |
| 5 | 0.246 | 0.588 | 0.182 | 666 | 50 |
| 6 | 0.308 | 0.588 | 0.182 | 666 | 50 |
| 7 | 0.118 | 0.281 | 0.204 | 179 | 35 |

TABLE 3

Reaction Conditions

| | Stirring temperature (° C) | Stirring time (h) | Drying temperature (° C.) | Annealing Temperature (° C.) |
|---|---|---|---|---|
| 1 | 45 | 24 | 65 | 375 |
| 2 | 45 | 24 | 65 | 375 |
| 3 | 45 | 24 | 65 | 375 |
| 4 | 45 | 24 | 65 | 375 |
| 5 | 45 | 24 | 65 | 375 |
| 6 | 45 | 24 | 65 | 375 |
| 7 | 45 | 24 | 65 | 375 |

Step 1: LZP Solution Preparation

A solution was prepared by placing LiOH (Spectrum Chemical), zirconium butoxide 80% solution (Sigma) and P$_2$O$_5$ (Sigma) in ethanol (Sigma). This mixture was stirred for 24 hours at 45° C. in an argon filled glovebox (H$_2$O<0.1 ppm, O$_2$<0.1 ppm). The amount of LiOH, zirconium butoxide 80% solution, and P$_2$O$_5$ is described in Table 1.

Step 2: Coating Step

Lithium Nickel Cobalt Manganese Oxide (NMC) powder (purchased from BASF) was put into the solution prepared in step 1 and stirred for 24 hours. After stirring, the powder was dried using a rotary evaporator at 65° C. to remove the solution.

Step 3: Annealing Step

The powder obtained from step 2 was heated under dry air at 375° C. for 1 hour under clean dry air (dew point<−80° C.). This resulted in the coated cathode material. Coated cathodes were stored under dry atmosphere (dp<−50° C.)

Example 2: ICP (Inductively Coupled Plasma)

The elemental composition of the NMCs with coatings 1, 3, 4, 5, and 6 was analyzed by ICP-OES analysis using Perkin Elmer Optima 8000. Prior to the analysis, the samples were dissolved into solution by microwave digestion with a mixture of hydrochloric acid, sulfuric acid, and nitric acid. The results are shown in Table 4 and 5.

TABLE 4

ICP (wt %) Analysis of Li, Zr, P, Mn, Co, and Ni

| | | Li | Zr | P | Mn | Co | Ni |
|---|---|---|---|---|---|---|---|
| 1 | LiZr$_2$(PO$_4$)$_3$ | 7.466 | 0.542 | 0.265 | 2.573 | 6.018 | 51.47 |
| 3 | Li$_2$ZrO$_3$ | 7.46 | 0.363 | 0 | 2.67 | 6.04 | 51.8 |
| 4 | Li$_3$ZrPO$_6$ | 7.36 | 0.237 | 0.154 | 2.643 | 5.972 | 51.52 |
| 5 | Li$_5$PZrO$_7$ | 7.354 | 0.2 | 0.153 | 0.662 | 5.981 | 51.39 |
| 6 | Li$_7$ZrPO$_8$ | 7.45 | 0.216 | 0.156 | 2.655 | 6.008 | 51.55 |
| 7 | Li$_{24}$Zr$_3$P$_{14}$O$_{53}$ | 7.483 | 0.177 | 0.256 | 2.468 | 5.916 | 51.6 |

TABLE 5

ICP (wt %) Analysis of Mn + Co + Ni and P/Mn + Co + Ni

| | | Mn + Co + Ni | P/(Mn + Co + Ni) |
|---|---|---|---|
| 1 | LiZr$_2$(PO$_4$)$_3$ | 60.061 | 0.004412181 |
| 3 | Li$_2$ZrO$_3$ | 60.51 | 0 |
| 4 | Li$_3$ZrPO$_6$ | 60.135 | 0.002560905 |
| 5 | Li$_5$PZrO$_7$ | 58.033 | 0.002636431 |
| 6 | Li$_7$ZrPO$_8$ | 60.213 | 0.002590803 |
| 7 | Li$_{24}$Zr$_3$P$_{14}$O$_{53}$ | 59.984 | 0.004267805 |

Example 3: XPS (X-Ray Photoelectron Spectroscopy)

NMCs with coatings 1, 3, 4, 5, and 6 were transferred to the XPS system (ThermoFisher Scientific K-Alpha) under dry atmosphere (−50° C.). XPS analysis was performed with Monochromated, Micro-focused Al-Ka as X-ray source at a pressure of 10$^{-8}$ Torr. The diameter of the analyzed area was 400 mm.

The XPS spectra were fitted using Gaussian/Laurentzian product function peak shape model in combination with background. The results are shown in Table 6.

TABLE 6

| | | XPS ANALYSIS XPS (atomic %) | | |
|---|---|---|---|---|
| | | Zr/Ni | C—CO$_3$/Ni | O—MeO$_x$/O—total |
| 1 | LiZr$_2$(PO$_4$)$_3$ | 0.545 | 0.402 | 0.385 |
| 3 | Li$_2$ZrO$_3$ | 3.23 | 7.07 | 0.186 |
| 4 | Li$_3$ZrPO$_6$ | 1.2876 | 6.873984 | 0.080216 |
| 5 | Li$_5$PZrO$_7$ | 1.0663 | 8.259835 | 0.080494 |
| 6 | Li$_7$ZrPO$_8$ | 3.0429 | 17.24331 | 0.057046 |
| 7 | Li$_{24}$Zr$_3$P$_{14}$O$_{53}$ | 0.379 | 1.62 | 0.208 |

Example 5: Area-Specific Resistance (ASR) Testing

A first solid electrolyte was prepared. Li$_{10}$Si$_{0.5}$Sn$_{0.5}$P$_2$S$_{12}$ (hereinafter "LSTPS") was wet milled to produce LSTPS particles having a d50 particle diameter of about 50 nm to 500 nm. See U.S. Pat. Nos. 9,172,114 and 10,535,878, which are herein incorporated by reference in their entirety for all purposes.

A second solid electrolyte was prepared: Lithium sulfide (Li$_2$S), phosphorus pentasulfide (P$_2$S$_5$), and lithium iodide (LiI) were mixed in a predetermined ratio. In one sample, lithium sulfide (Li$_2$S), phosphorus pentasulfide (P$_2$S$_5$), and lithium iodide (LiI) were mixed. The molar ratio of LiI:Li$_2$S:P$_2$S$_5$ was (3 to 4):(0.1 to 1):(0.5 to 1.5). The mixture was placed in a 500 mL zirconia milling jar with 1 mm zirconia milling media at a milling media:powder mass ratio of >7.5. The mixture was agitated in a planetary mill (Retsch PM400, 150 mm revolution radius, 1:2 speed ratio) for sixteen to thirty-six 16-32 hours.

This procedure was performed in an Ar filled glovebox (H$_2$O<0.1 ppm, O$_2$<0.1 ppm). Battery cell fabrication was performed in an Ar filled glovebox (H$_2$O≤0.1 ppm, O$_2$<0.1 ppm).

A cathode layer was made by mixing the coated NMC material with the first solid electrolyte from above procedure.

An all-solid-state battery was made using a cathode layer mentioned in the preceding paragraph and a separator which was made of the second solid electrolyte.

The cathode layer and separator were pressed at 700 MPa to densify the two into a pellet type battery. An aluminum current collector was used adjacent to the cathode layer. A nickel current collector was used adjacent to an anode layer. Finally the stack of pellet and current collectors were vacuum sealed in Mylar bag to be a battery cell. The anode layer was made up of lithium metal. Metallic lithium as an anode was plated when the battery cell was charged.

Battery cells were charged and discharged at 30° C. at the intermittent current pulse with constant current density of 1.7 mA/cm$^2$ and within the operation voltage of 3 V to 4.25 V. The current pulse was applied for 9 minutes, the current was stopped, and the system was relaxed for 3 minutes. This intermittent pulse was repeated until the cell voltage reached to 4.25 V during charging and 3V during discharging. The area-specific resistance (ASR) of the battery cells was obtained by reading voltage drop during relaxation steps during discharging. The obtained ASR was named as R$_1$.

After cycling at 30° C., the battery cells were again charged to 4.25 V with a current density of 1.7 mA/cm$^2$. The temperature of the cells was then raised to 60° C. After the temperature stabilized at 60° C., the battery cells were held at 4.25 V for 7 days and the cells were discharged to 3 V.

The temperature of the battery cells was lowered to 30° C. The battery cells were charged and discharged between 3 V and 4.25 V and at a current density of 1.7 mA/cm$^2$. From this, an ASR (R$_2$) was determined.

The stability was evaluated by $\Delta R = R_2 - R_1$. The results are shown in Table 7.

TABLE 7

| | | ASR MEASURMENT | | |
|---|---|---|---|---|
| | | E testing (HVHT test) | | |
| | | Initial ASR (R$^1$)/Ω cm$^2$ | ASR after 7 days storage (R$^2$)/Ω cm$^2$ | Delta ASR (ΔR)/Ω cm$^2$ |
| 1 | LiZr$_2$(PO$_4$)$_3$ | 26.945 | 33.944 | 7.78 |
| 2 | Li$_3$PO$_4$ | 19.96 | 21.35 | 1.39 |
| 3 | Li$_2$ZrO$_3$ | 35.548 | 45.128 | 9.58 |
| 4 | Li$_3$ZrPO$_6$ | 25.749 | — | — |
| 5 | Li$_5$PZrO$_7$ | 20.929 | 24.88 | 3.95 |
| 6 | Li$_7$ZrPO$_8$ | 22.097 | 24.401 | 2.3 |
| 7 | Li$_{24}$Zr$_3$P$_{14}$O$_{53}$ | 26 | 29.4 | 4.44 |

Example 6: Li$_2$ZrO$_3$ Spray Coating

Coating Solution Preparation

The precursor solution was prepared as followed: for every 1 L of ethanol, 0.375 g of lithium hydroxide (LiOH) was dissolved, and the mixture was stirred overnight. This was followed by an addition of 3.6 mL of zirconium butoxide ((Zr(OBu)$_4$), 80% solution) and the mixture was then stirred for 2 hours. This process was conducted in nitrogen or argon-filled glovebox (H$_2$O<0.1 ppm, O$_2$<0.1 ppm).

Coating on Cathode Material

For every 1 L of ethanol, 150 g of lithium nickel manganese cobalt oxide (NMC) was added into the solution prepared in the above step and the mixture was stirred for 0.5 hour, followed by the addition of 0.425 mL of deionized water. The solution was then stirred for another 1.5 hours. This was done in a humidity-controlled environment (dew point<−50° C.).

Spray Drying

BUCHI Mini Spray Dryer B-290/295 was used in the procedure described below.

First, the spray dryer was turned on and nozzle temp was set to 120-130° C. The B-295 chiller, associated with the spray dryer, was set to a temperature of −20° C. After warming up the tool to the set temperature, a small amount (~50 mL) of ethanol was sprayed to clean the tool. This was followed by the solution, which was sprayed at around 45% of maximum peristaltic pump speed.

Annealing

The obtained powder via the process described above was annealed under clean dry air at 375° C. for one hour.

Example 7: LiZr$_2$(PO$_4$)$_3$ Spray Coating

Coating Solution Preparation

For every 1 L of ethanol, the following was added in order, and the mixture was then stirred overnight in a nitrogen or argon-filled glovebox:

Lithium hydroxide (LiOH): 0.093 g

80% zirconium butoxide (Zr(OBu)$_4$): 3.525 mL

Phosphorous pentoxide (P$_2$O$_5$): 0.822 g

Coating on Cathode Material

For every 1 L of ethanol, 150 g of lithium nickel manganese cobalt oxide (NMC) was added into the solution prepared in the above step and stirred for 1.5 hours. This was done in a humidity-controlled environment (dew point<-50° C.).

Spray Drying

BUCHI Mini Spray Dryer B-290/295 was used in the procedure described below.

First, BUCHI B-290 was turned on and nozzle temp is set to 120-130° C. The B-295 chiller was set to a temperature of -20° C. After warming up the tool to the set temperature, a small amount (~50 mL) of ethanol was sprayed to clean the tool. This was followed by the solution, which was sprayed at around 45% of maximum peristaltic pump speed.

Annealing

The obtained powder via the process described above was annealed under clean dry air at 375° C. for one hour.

Example 8: XPS (X-Ray Photoelectron Spectroscopy)

NMCs with coatings 1, 3, 4, 5, and 6 (as a loose powder) were transferred to the XPS system (ThermoFisher Scientific K-Alpha) under dry atmosphere (-50° C.).

The XPS measurements were carried out in an ultra-high vacuum (UHV) system Nexsa G2 (Thermo Fisher Scientific). The base pressure in the system was below $5 \times 10^{-10}$ mbar. The XPS spectra were acquired with a hemispherical analyzer with pass energies 50 eV and 200 eV for high resolution and survey spectra, respectively. The XPS spectra were generated by an Al monochromated and a twin Al/Mg anode nonmonochromated X-ray sources operated at 12 keV and power 120 W. The scanned area diameter was 400 μm. Charge was compensated using Flood gun with current set at 100 μA.

XPS spectra were peak-fitted using Avantage (Thermo Fisher Scientific) data processing software using Gaussian/Laurentzian product function peak shape model in combination with background. For peak fitting Smart-type background subtraction was used. Quantification has been done using sensitivity factors provided by Avantage library.

The results are shown in Table 8.

TABLE 8

| | | XPS ANALYSIS XPS (atomic %) | | |
|---|---|---|---|---|
| | | Zr/Ni min | Zr/Ni ave | Zr/Ni max |
| 1 | $LiZr_2(PO_4)_3$ | 0.1037 | 0.75 | 2.003 |
| 3 | $Li_2ZrO_3$ | 1.43 | 2.35 | 4.3 |
| 4 | $Li_3ZrPO_6$ | 0.168 | 1.367 | 2.12 |
| 5 | $Li_5PZrO_7$ | 0.12 | 1.0872 | 1.982 |
| 6 | $Li_7ZrPO_8$ | 0.1565 | 1.61447 | 3.143 |

Example 9: TEM Analysis

An NMC coated with $LiZr_2(PO_4)_3$ was prepared for TEM measurements using Ga ion sourced focused ion beam (nanoDUE'T NB5000, Hitachi High-Technologies). To protect the surface of material from the Ga ion beam, multiple protective layers were deposited in advance to the sampling; at first, metal layer was deposited by plasma coater and then carbon protective layer and tungsten layer were deposited by high vacuum evaporation and focused ion beam, respectively. The thin slice sampling was conducted by focused ion beam. The prepared sample was measured in TEM.

TEM images of the $LiZr_2(PO_4)_3$-coated NMC were obtained by field emission electron microscope (JEM-2100F, JEOL). The Acceleration voltage was set to 200 kV. The electron beam radius was set to about 0.7 to 1 nm. FIGS. 2-6 are different particles of the same sample.

Figure 2:
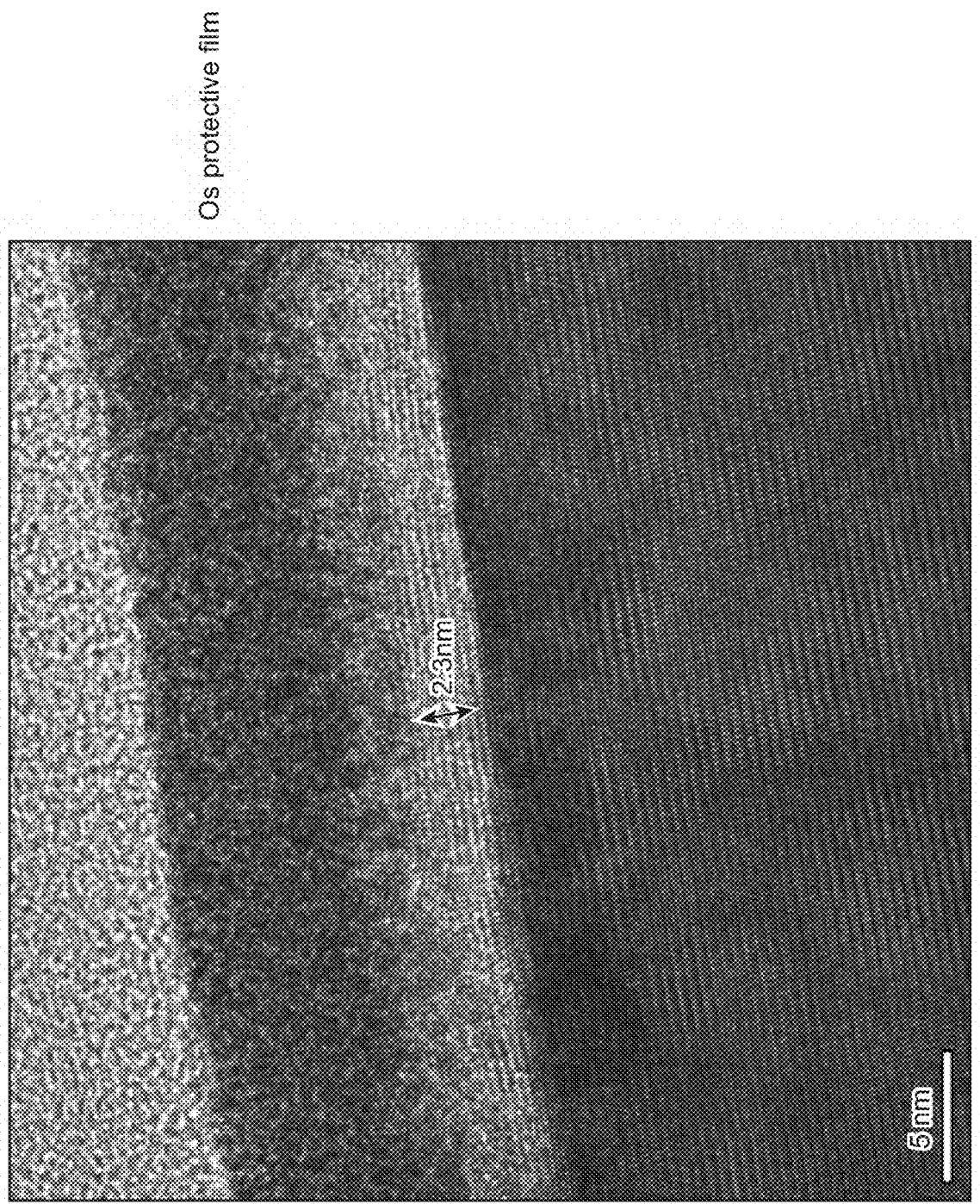
FIG. 2 is a transmission electron microscopy (TEM) image of an NMC coated with $LiZr_2(PO_4)_3$. The $LiZr_2(PO_4)_3$ coating has a thickness of about 2.0 nm to 2.5 nm. The scale of the image (5 nm) is shown in the bottom left.
Figure 3:
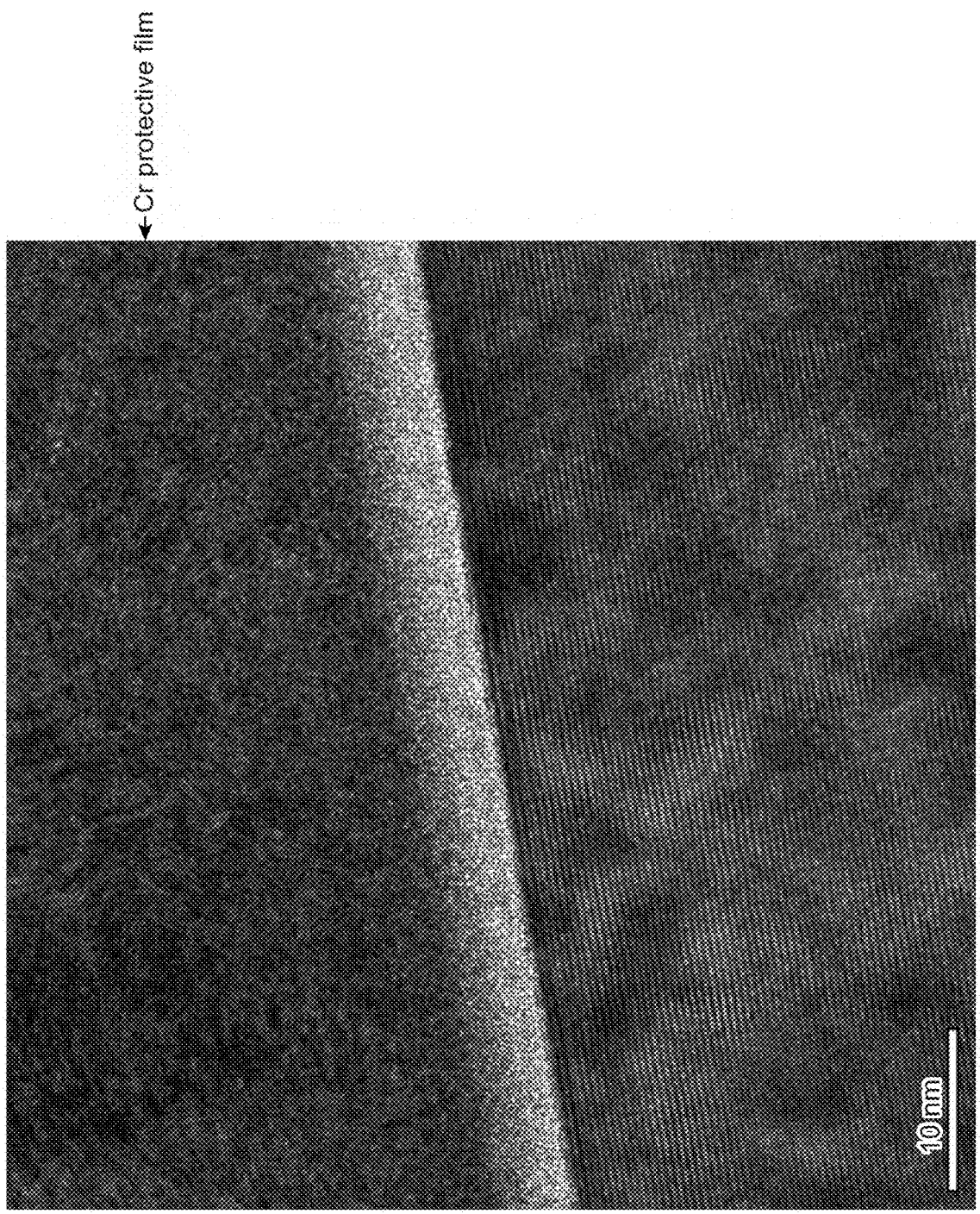
FIG. 3 is a TEM image of an NMC coated with $LiZr_2(PO_4)_3$. The $LiZr_2(PO_4)_3$ coating is amorphous, as determined by TEM. The scale of the image (10 nm) is shown in the bottom left.

FIGS. 2-6 are TEM images of the $LiZr_2(PO_4)_3$-coated NMC. In FIG. 2, the coating has a thickness of about 2.0 nm to 2.5 nm, while in FIG. 3, the $LiZr_2(PO_4)_3$ coating is amorphous.

Figure 4:
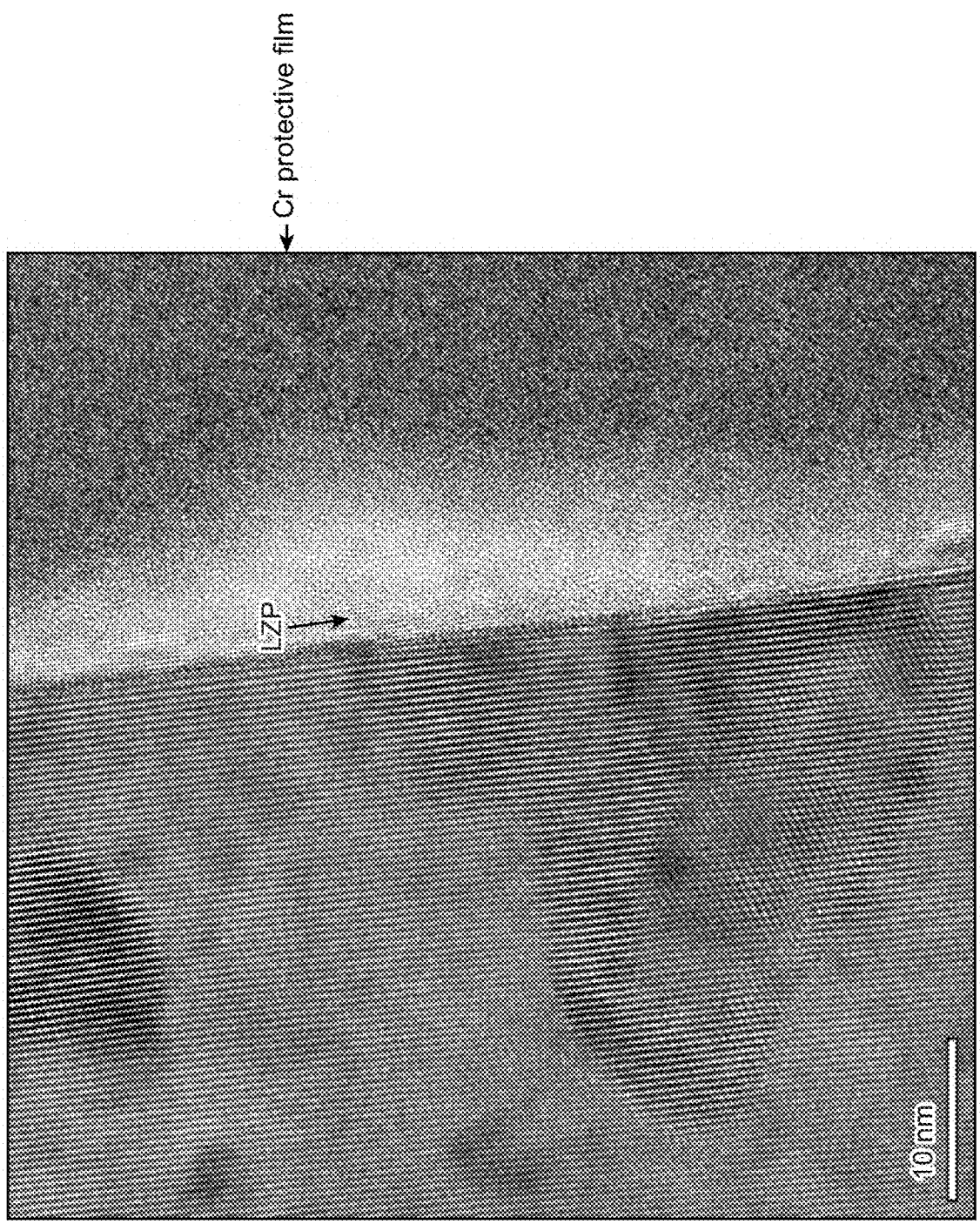
FIG. 4 is a TEM image of an NMC coated with $LiZr_2(PO_4)_3$. The $LiZr_2(PO_4)_3$ coating comprises crystalline domains and amorphous domains, as determined by TEM. The crystalline domain is at the interface of the cathode active material. The scale of the image (10 nm) is shown in the bottom left.
Figure 5:
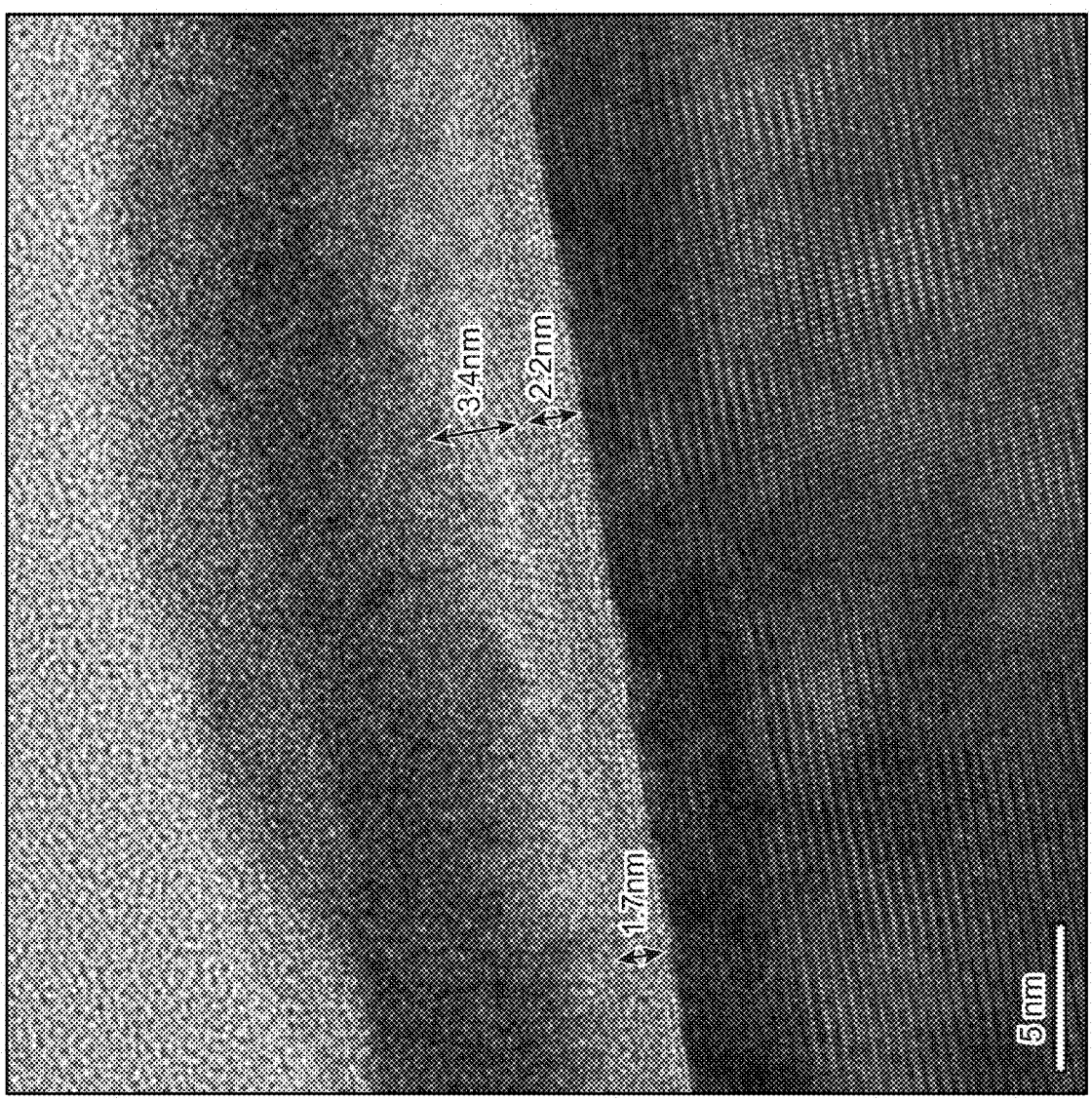
FIG. 5 is a TEM image of an NMC coated with $LiZr_2(PO_4)_3$. The $LiZr_2(PO_4)_3$ coating comprises crystalline domains and amorphous domains. The crystalline domain is at the interface of the cathode active material and has a thickness between 1.7 nm and 2.2 nm, while the amorphous domain has a thickness of 3.4 nm. The scale of the image (5 nm) is shown in the bottom left.

FIGS. 4 and 5 are TEM images of a $LiZr_2(PO_4)_3$-coated NMC where the $LiZr_2(PO_4)_3$ coating comprises crystalline domains and amorphous domains. In both images, the crystalline domain is at the interface of the cathode active material. In FIG. 4, the crystalline domain has a thickness between 1.5 and 2.5 nm, while the amorphous domain has a thickness of 3.4 nm.

Figure 6:
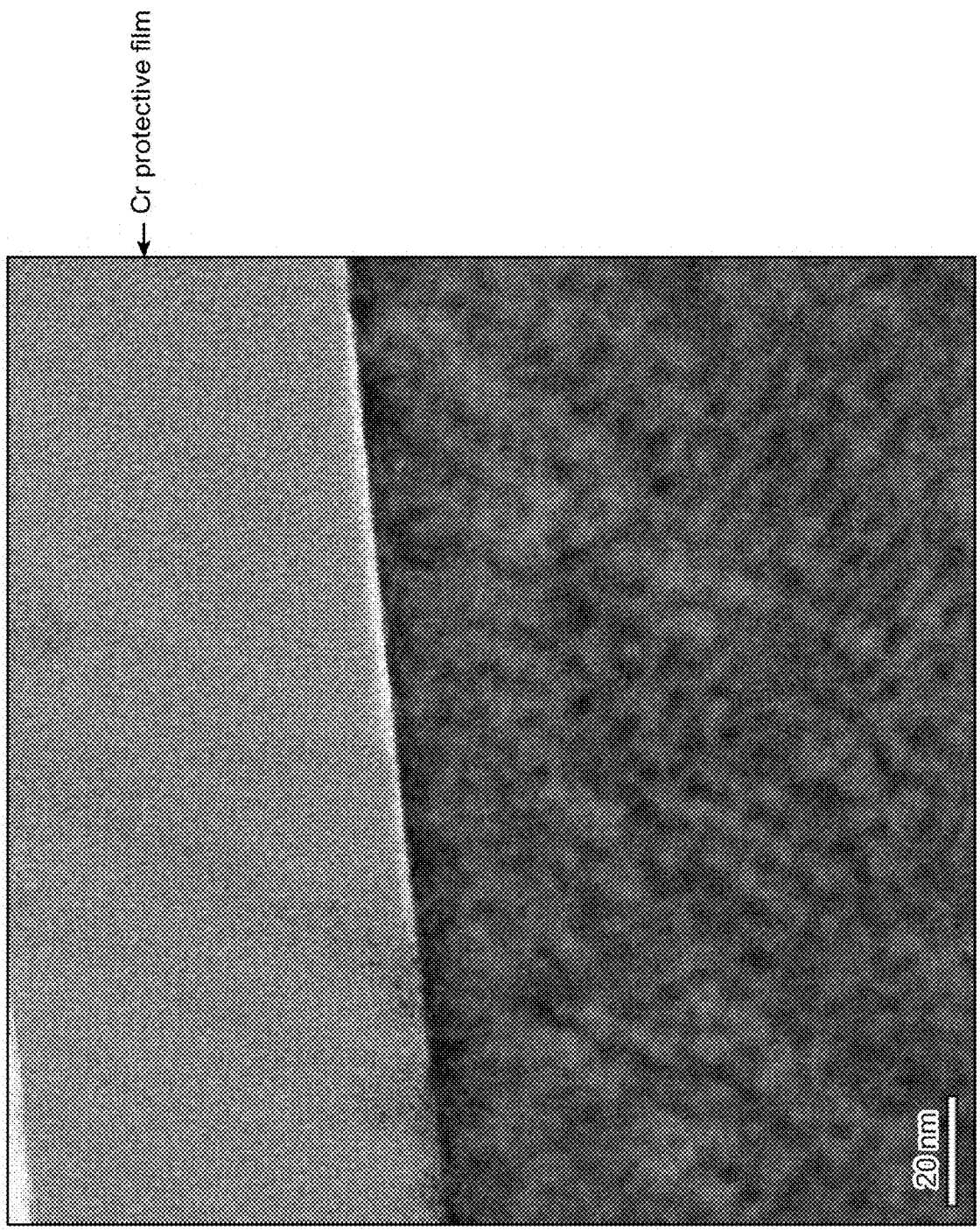
FIG. 6 is a TEM image of an NMC coated with $LiZr_2(PO_4)_3$ where the coating is discontinuous. The scale of the image (20 nm) is shown in the bottom left.

FIG. 6 is a TEM image of a $LiZr_2(PO_4)_3$-coated NMC where the coating is discontinuous.

The embodiments and examples described above are intended to be merely illustrative and non-limiting. Those skilled in the art will recognize or will be able to ascertain using no more than routine experimentation, numerous equivalents of specific compounds, materials and procedures. All such equivalents are considered to be within the scope and are encompassed by the appended claims.

What is claimed is:

1. A composition comprising:
a cathode active material; and
at least one oxide bonded to the cathode active material;
wherein the at least one oxide bonded to the cathode active material comprises lithium (Li), oxygen (O), and at least one of zirconium (Zr) and phosphorus (P);
wherein the molar ratios of Li, Zr, P, and O, are represented by the formula $Li_xZr_yP_aO_d$, wherein $0.05 \leq x \leq 25.0$, $0 \leq y \leq 5.0$, $0 \leq a \leq 16.0$; and $2.0 \leq d \leq 55.0$; and
wherein subscripts x, y, a, and d, are selected so the at least one oxide is charge neutral and y and a are not both zero;
wherein the composition has a ratio of Zr:Ni, as measured by x-ray photoelectron spectroscopy (XPS) of 0.3 to 3.2; and
wherein the cathode active material is $LiNi_xMn_yCo_zO_2$, $x+y+z=1$, $0 \leq x \leq 1$, $0 \leq y \leq 1$, and $0 \leq z \leq 1$; and
wherein the composition comprises between about 5 weight % and 10 weight % of lithium as measured by inductively coupled plasma (ICP) analysis, less than about 1 weight % of zirconium as measured by inductively coupled plasma (ICP) analysis, less than about 0.5 weight % of phosphorus as measured by inductively coupled plasma (ICP) analysis, less than about 65 weight % of manganese, cobalt, and nickel as measured by inductively coupled plasma (ICP) analysis, or a combination thereof.

2. The composition of claim 1, comprising:
a cathode active material having a surface and an oxide bonded to the surface;
wherein the oxide is selected from the group consisting of:
$LiZr_2(PO_4)_3$;
$Li_2ZrO_3$;
$Li_3ZrPO_6$;
$Li_5PZrO_7$;
$Li_7ZrPO_8$;
$Li_{24}Zr_3P_{14}O_{53}$; and
combinations thereof;

wherein the composition has a ratio of Zr:Ni, as measured by x-ray photoelectron spectroscopy (XPS) of 0.3 to 3.2.

3. The composition of claim 1, wherein the oxide is amorphous or crystalline.

4. The composition of claim 1, wherein the oxide comprises a compound of the formula:
   $Li_xZr_yP_aO_d$, wherein $0.05 \leq x \leq 7.0$, $0 \leq y \leq 3.0$, $0 \leq a \leq 6.0$; and $2.0 \leq d \leq 20.0$
   $Li_xZr_yP_aO_d$, wherein $0.05 \leq x \leq 1.5$, $1 \leq y \leq 3$, $1.0 \leq a \leq 6.0$; and $2.0 \leq d \leq 20.0$;
   $Li_xZr_yP_aO_d$, wherein $0.05 \leq x \leq 1.5$, $1 \leq y \leq 3$, $2.0 \leq a \leq 4.0$; and $10.0 \leq d \leq 14.0$;
   $Li_xZr_yP_aO_d$, wherein $20.0 \leq x \leq 25.0$, $2.0 \leq y \leq 5.0$, $10.0 \leq a \leq 16.0$; and $50.0 \leq d \leq 55.0$; or
   $Li_xZr_yO_d$, wherein $1.0 \leq x \leq 3$, $0 \leq y \leq 2$, and $2.0 \leq d \leq 5.0$.

5. The composition of claim 1, wherein the oxide comprises a compound selected from $LiZr_2(PO_4)_3$, $Li_3ZrPO_6$, $Li_5PZrO_7$, $Li_7ZrPO_8$, $Li_2ZrO_3$, and $Li_{24}Zr_3P_{14}O_{53}$.

6. The composition of claim 1, wherein the oxide is lattice-matched with the cathode active material.

7. The composition of claim 1, wherein the cathode active material is $LiNi_xMn_yCo_zO_2$ and either (a)-(h):
   (a) x is 0.8, y is 0.1, and z is 0.1;
   (b) x is 0.6, y is 0.2, and z is 0.2;
   (c) x is 0.5, y is 0.3, and z is 0.2;
   (d) x is ⅓, y is ⅓, and z is ⅓.
   (e) $0.8 \leq x \leq 0.97$, $0 \leq y \leq 0.2$, and $0 \leq z \leq 0.2$;
   (f) $0.8 \leq x \leq 0.90$, $0 \leq y \leq 0.2$, and $0 \leq z \leq 0.2$;
   (g) $0.8 \leq x \leq 0.85$, $0 \leq y \leq 0.2$, and $0 \leq z \leq 0.2$; or
   (h) $0.8 \leq x \leq 0.83$, $0 \leq y \leq 0.2$, and $0 \leq z \leq 0.2$.

8. The composition of claim 1, characterized by an atomic percent ratio of Zr:Ni as determined by XPS between about 0.5 to 2.5.

9. The composition of claim 1, characterized by an atomic percent ratio of Zr:Ni of about 0.38, about 0.55, about 1.1, about 1.3, about 3.0, or about 3.2.

10. The composition of claim 1, wherein the ratio of phosphorus to manganese, cobalt, and nickel (P:Mn+Co+Ni) is at least about 0.001 by weight percent as measured by inductively coupled plasma (ICP) analysis; at least about 0.002 by weight percent as measured by inductively coupled plasma (ICP) analysis; or at least about 0.08 by weight percent as measured by inductively coupled plasma (ICP) analysis.

11. The composition of claim 1, wherein the oxide bonded to the cathode active material is a coating on the cathode active material.

12. The composition of claim 11, wherein the coating is continuous.

13. The composition of claim 11, wherein the coating is discontinuous.

14. The composition of claim 11, wherein the coating comprises crystalline domains as determined by TEM analysis.

15. The composition of claim 11, wherein the coating comprises amorphous domains as determined by TEM analysis.

16. The composition of claim 11, wherein the coating comprises crystalline domains and amorphous domains as determined by TEM analysis and wherein the crystalline domains are in contact with the cathode and the amorphous domains are in contact with the crystalline domains.

17. The composition of claim 11, wherein the coating has a thickness, T, as determined by TEM analysis, that is between about 0.7 nm≤T≤20 nm.

18. An oxide having the following formula, $Li_xZr_yP_aO_d$, wherein $0.05 \leq x \leq 25.0$, $0 \leq y \leq 5.0$, $0 \leq a \leq 16.0$; and $2.0 \leq d \leq 55.0$; wherein the formula is charge neutral and wherein the oxide is bonded to cathode active material selected from lithium cobalt oxide (LCO), lithium nickel cobalt aluminum oxide (NCA), lithium nickel manganese cobalt oxide (NMC), lithium iron phosphate (LFP), and combinations thereof.

19. A cathode comprising the composition of claim 1.

* * * * *